US007880766B2

(12) United States Patent
Aoki et al.

(10) Patent No.: US 7,880,766 B2
(45) Date of Patent: Feb. 1, 2011

(54) DETECTION AREA ADJUSTMENT APPARATUS

(75) Inventors: Katsuji Aoki, Nara (JP); Atsushi Yoshida, Neyagawa (JP); Shouichi Araki, Osaka (JP)

(73) Assignee: Panasonic Corporation, Osaka (JP)

( * ) Notice: Subject to any disclaimer, the term of this patent is extended or adjusted under 35 U.S.C. 154(b) by 1680 days.

(21) Appl. No.: 11/115,152

(22) Filed: Apr. 27, 2005

(65) Prior Publication Data
US 2005/0219361 A1 Oct. 6, 2005

Related U.S. Application Data

(63) Continuation of application No. PCT/JP2005/000544, filed on Jan. 18, 2005.

(30) Foreign Application Priority Data
Feb. 3, 2004 (JP) .............................. 2004-027294

(51) Int. Cl.
H04N 7/18 (2006.01)
(52) U.S. Cl. ..................................... 348/143
(58) Field of Classification Search .......... 348/143–168
See application file for complete search history.

(56) References Cited
U.S. PATENT DOCUMENTS

| 4,737,847 | A  | * | 4/1988  | Araki et al. ............... 348/161 |
| 5,164,827 | A  | * | 11/1992 | Paff .......................... 348/143 |
| 6,690,374 | B2 | * | 2/2004  | Park et al. .................. 345/427 |
| 6,760,063 | B1 |   | 7/2004  | Kamei |
| 6,778,207 | B1 |   | 8/2004  | Lee et al. |
| 7,046,292 | B2 | * | 5/2006  | Ziemkowski ............... 348/371 |
| 7,102,666 | B2 | * | 9/2006  | Kanade et al. .............. 348/159 |
| 7,106,361 | B2 | * | 9/2006  | Kanade et al. .............. 348/159 |

(Continued)

FOREIGN PATENT DOCUMENTS
JP          07-303207           11/1995

(Continued)

OTHER PUBLICATIONS

Paragraphs [0003] & [0072] of JP 2000-83243 (Mar. 2000) (with English translation).

(Continued)

*Primary Examiner*—Tung Vo
(74) *Attorney, Agent, or Firm*—Wenderoth, Lind & Ponack, L.L.P.

(57) ABSTRACT

A detection area adjustment apparatus automatically detects the entire target detection area without producing any dead areas and without requiring cameras to be previously fixed at regular intervals, even in the case where a camera is broken. The detection area adjustment apparatus includes plural camera terminals. Each of the plural camera terminals includes a camera whose detection area is adjustable, an adjustment unit that adjusts the position of the detection area by controlling the camera, and a communication unit that communicates the detection area information indicating the detection area of the camera. The adjustment unit adjusts the position of the detection area of the camera in the current camera terminal so that the total area of the detection areas of the plural camera terminals covers the entire target detection area based on the detection area of the camera in the current camera terminal and the detection areas of the cameras in the other camera terminals.

9 Claims, 29 Drawing Sheets

U.S. PATENT DOCUMENTS

| | | | |
|---|---|---|---|
| 7,123,126 B2 | 10/2006 | Tanaka et al. | |
| 7,212,228 B2 * | 5/2007 | Utsumi et al. | 348/139 |
| 7,336,297 B2 * | 2/2008 | Ishigami et al. | 348/143 |
| 2003/0053658 A1 | 3/2003 | Pavlidis | |
| 2003/0160863 A1 | 8/2003 | Kakou et al. | |
| 2003/0197612 A1 | 10/2003 | Tanaka et al. | |
| 2004/0008773 A1 | 1/2004 | Itokawa | |
| 2005/0219361 A1 | 10/2005 | Aoki et al. | |
| 2008/0225121 A1 * | 9/2008 | Yoshida et al. | 348/159 |
| 2009/0262195 A1 * | 10/2009 | Yoshida et al. | 348/159 |

FOREIGN PATENT DOCUMENTS

| | | |
|---|---|---|
| JP | 2000-083243 | 3/2000 |
| JP | 3043925 | 3/2000 |
| JP | 2001-094975 | 4/2001 |
| JP | 3180730 | 4/2001 |
| JP | 2001-325695 | 11/2001 |
| JP | 2002-077887 | 3/2002 |
| JP | 2002-185837 | 6/2002 |
| JP | 2004-005511 | 1/2004 |
| JP | 3905116 | 4/2007 |
| WO | 02/13515 A2 | 2/2002 |
| WO | 03/003721 A1 | 1/2003 |

OTHER PUBLICATIONS

Paragraph [0029] of JP 2001-94975 (Apr. 2001) (with English translation).

European Search Report issued Feb. 17, 2010 in corresponding European Application No. 05703781.4.

* cited by examiner

PRIOR ART

PRIOR ART

Detection target

● Detection camera

PRIOR ART

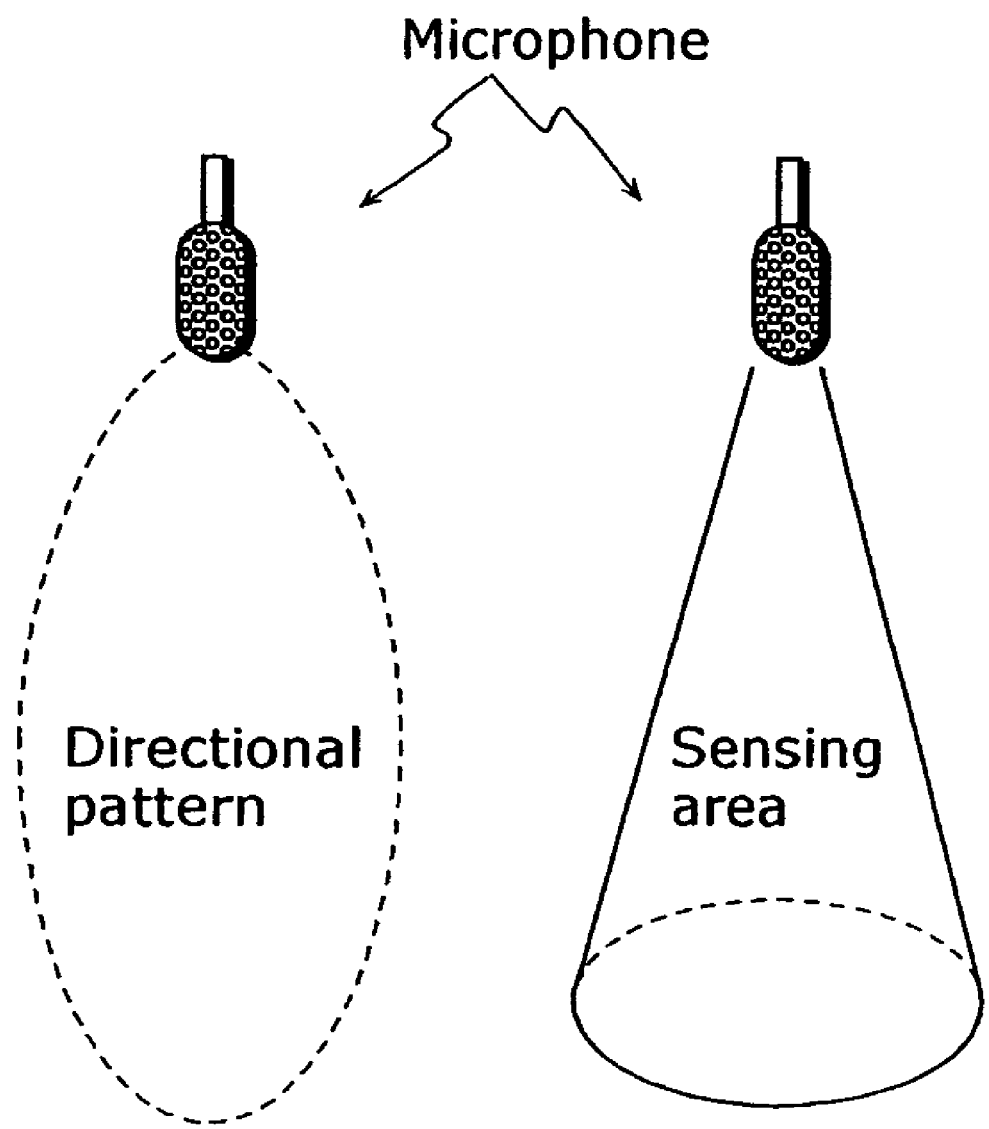

Area A

FIG. 34
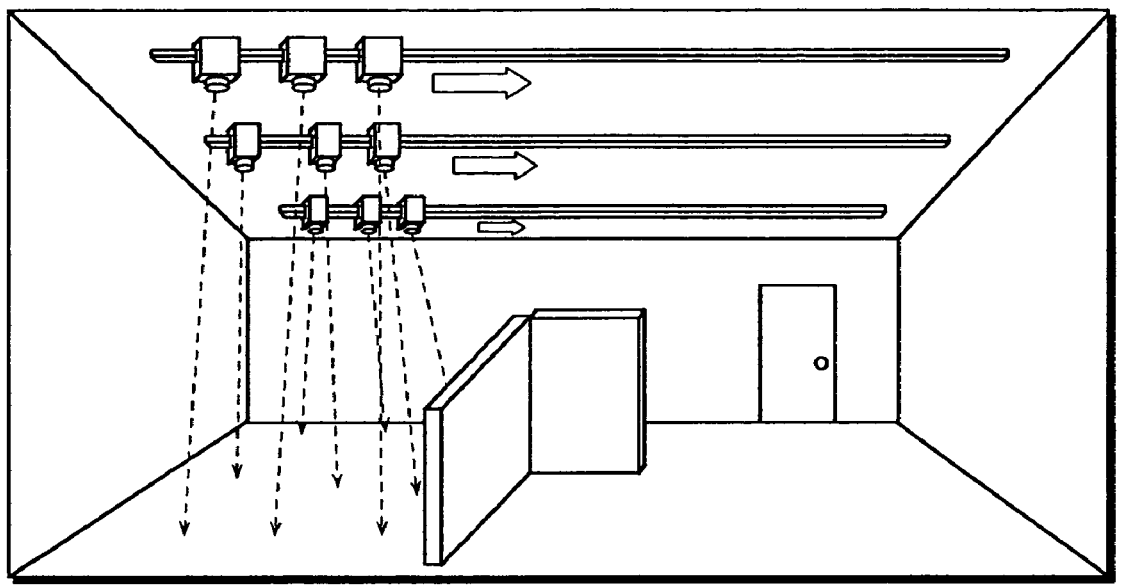
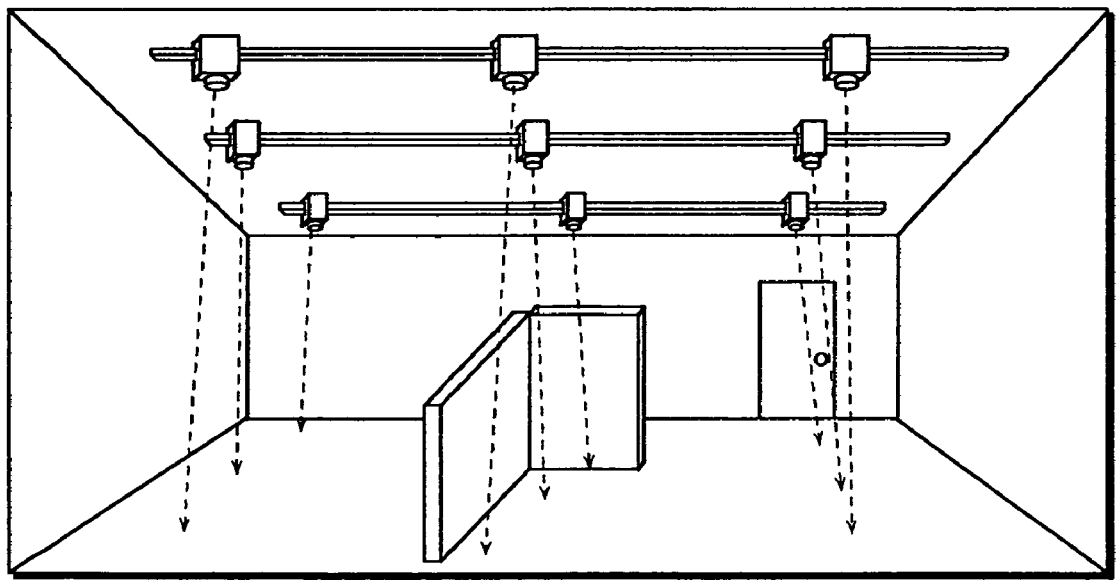

DETECTION AREA ADJUSTMENT APPARATUS

CROSS REFERENCE TO RELATED APPLICATION

This is a continuation of PCT Application No. PCT/JP2005/000544, filed on Jan. 18, 2005.

BACKGROUND OF THE INVENTION (1) Field of the Invention

The present invention relates to a detection area adjustment apparatus that adjusts the imaging area using internal cameras, especially to an optimum apparatus having such cameras that is used for a monitoring system.

(2) Description of the Related Art

Research and development on an apparatus having cameras that are mainly for the use of monitoring has been actively performed recently. In order to achieve this use purpose, such an apparatus is required (i) to always monitor an entire target detection area (the area in which monitoring is performed) and detect a target detection object in the target detection area, and (ii) to obtain detailed information on the target detection object that is present in the target detection area.

A conventional apparatus having cameras meets the above-mentioned requirements by automatically adjusting the imaging ranges of the respective internal cameras. A typical example of such an apparatus is shown in Document 1 and Document 2.

Document 1: U.S. Pat. No. 3,043,925 publication; and
Document 2: U.S. Pat. No. 3,180,730 publication.

FIG. 1 shows an apparatus that automatically adjusts the imaging areas of those cameras described in the Document 1. In the detection camera apparatus 9010, an image of a target detection object is taken by a camera 9011 and a reflection mirror 9012 in a large imaging area, a moving object extraction unit 9013 extracts the target detection object from the images taken by the moving object extraction unit 9013, and a position information extraction unit 9014 extracts position information on the detected target detection object in the area. In this way, the detection camera apparatus 9010 obtains the position information on the target detection object in the large imaging area that is later called detection area. In the judgment camera apparatus 9020, a camera control unit 9022 controls an angle of traverse, an angle of depression and a zoom ratio of the camera 9021 based on the position information on the target detection object, a judgment camera apparatus 9020 takes enlarged images of the target detection object. In this way, the judgment camera apparatus 9020 obtains detailed information on the target detection object.

FIG. 2 is a diagram showing the detection area of the detection camera apparatus 9010 and the detection area of the judgment camera apparatus 9020. In the figure, each bullet shows the setting position information on the detection camera apparatus 9010 that is a fixed camera. Likewise, each circle and each hexagon show the detection area of each detection camera apparatus 9010. As shown in the figure, setting each detection camera apparatus 9010 at regular intervals on purpose makes it possible to always detect a target detection object in the entire target detection area to be monitored.

FIG. 3 shows an apparatus that automatically adjusts an imaging area of those cameras described in the Document 2. In the figure, a camera for detecting moving objects 9211 is used for the purpose of taking an image of a target detection object in a large imaging area and a monitoring camera 9221 is used for the purpose of taking an enlarged image of the target detection object. The camera for detecting moving objects 9211 adjusts its imaging area by an angle control unit 9212, while the monitoring camera 9221 adjusts its imaging area by an angle control unit 9222.

The imaging area of each camera is determined in the image processing apparatus 9240, taking into account the position of the target detection object that is extracted from the image taken by the camera for detecting moving objects 9211 and the imaging area of each camera, and based on the information that is previously stored in a camera angle memory unit 9231 and a camera angle memory unit 9232.

The method for determining an imaging area of each camera will be described below. FIG. 4 to FIG. 6 are diagrams that are used for describing the imaging area determination method of each camera. Each of the figures is divided into several block images and taken by the camera for detecting moving objects 9211. First, the imaging area of the camera for detecting moving objects 9211 is determined as will be described below. In the case where there is a target detection object in one of the diagonally-shaded blocks in FIG. 4, the angle of the camera for detecting moving objects 9211 is adjusted to the direction shown by the arrow described in the block in FIG. 5 corresponding to the block in FIG. 4 so that the imaging area of the camera is adjusted. The position of the imaging area of the camera for detecting moving objects 9211 is previously determined by someone so that it matches the position of the total area of the block images, and the information on the imaging area is previously set in the camera angle memory unit 9231. Next, the imaging area of the monitoring camera 9221 is determined as will be described below. In the case where there is a target detection object in the block shown in FIG. 6, the angle of the monitoring camera 9221 is adjusted so that the imaging area is also adjusted to the matching area that is enclosed by a broken line. The position of the imaging area of the monitoring camera 9221 is previously determined by someone so that it matches the position of the total area of the block images, and the information on the imaging area is previously set in the camera angle memory unit 9232.

The features of the conventional apparatus having the cameras will be described below. Note that, in this apparatus, each camera detects a target detection object based on the information on the imaging range in which the camera takes images, or obtains detailed information on the target detection object. Therefore, the imaging range of each camera matches the range in which each camera detects the target detection object and obtains the information on the target detection object. Such being the case, the imaging range of each camera will be described as a detection range of the camera from here.

In the conventional apparatuses that are respectively shown in the Document 1 and the Document 2, each camera plays one of the fixed roles that has been previously determined. One of the roles is to monitor the entire target detection area, and the other role is to obtain detailed information. In the Document 1, a detection camera apparatus 9010 plays the role to monitor a target detection object in a large detection area, and a judgment camera apparatus 9020 plays the role to obtain detailed information, such as an enlarged image, on the target detection object. On the other hand, in the Document 2, a camera for detecting moving objects 9211 plays the role to monitor a target detection object in a large detection area, and a monitoring camera 9221 plays the role to obtain detailed information, such as an enlarged image, on the target detection object.

Also, in the conventional apparatus shown in the Document 2, the detection area of each camera is determined and adjusted based on the information that someone previously conceived in a form of a table, the information describing detection areas that are respectively corresponding to the specified adjustment statuses. For example, when there is a status change that the position of the target detection object to be detected by the camera for detecting moving object 9211 is adjusted to the upper left block of FIG. 4, the detection area of the camera for detecting moving object 9211 is also adjusted to the detection area in the upper left direction shown in the upper left block of FIG. 5 in response to the status change.

However, since the entire target detection area is monitored by someone previously setting fixed cameras at regular intervals in the conventional apparatus of the Document 1, in the case where a camera is broken, it becomes impossible to continue monitoring. For example, as shown in FIG. 7, increasing the number of detection camera apparatuses 9010 enables to cover the entire target detection area even in the case where one of the cameras is broken, but it is inefficient.

Also, in the apparatus in the Document 2, since the detection area of each camera is determined and adjusted based on the information that someone previously conceived in a form of a table, the information describing the detection areas that are respectively corresponding to the specified adjustment, someone needs to conceive the information in a form of a table, the information describing the detection areas that are respectively corresponding to the adjustment. The information depends on the position and the breadth of the target detection area, the adjustment conceived by someone, the positions in which respective cameras are set, and the number of cameras. In the case where there occurs a change in the information, someone needs to remake the information in response to the change. This operation becomes more troublesome as the number of cameras increases, resulting in increasing the cost and the workload for performing such operations. It is general that ten cameras are used in the camera monitoring system in a building.

SUMMARY OF THE INVENTION

The present invention solves the above-mentioned conventional problems. An object of the present invention is to provide a detection area adjustment apparatus that does not require someone to predict status changes for detection and to make a table for determining the entire target detection area of the detection area adjustment apparatus, and that is capable of detecting the entire target detection area even in the case where a camera is broken.

In order to achieve the object, the detection area adjustment apparatus, concerning the present invention, includes camera terminals that are connected to each other via a communication line, and enables taking images in a target detection area by adjusting positions of detection areas that are imaging areas of the camera terminals, each of the camera terminals includes: a camera that takes an image in a detection area included in the target detection area and adjusts the position of the detection area; a communication unit that sends, to the camera terminals other than the camera terminal, detection area information for specifying the detection area via the communication line, and to receive detection area information from the other camera terminals; and an adjustment unit that adjusts the position of detection area by controlling the camera of the camera terminal so that a total area of the detection areas of the camera terminals covers the entire target detection area, based on (i) the detection area information on the camera terminal, and (ii) the detection area information that the communication unit receives, from the other camera terminals.

For example, in a first aspect of the present invention, it is preferable that the adjustment unit, of the detection area adjustment apparatus, adjusts the position of the detection area so as not to leave a non-detection part in a part that is adjacent to the detection area of the camera terminal, the non-detection part being a part that does not belong to any of the detection areas of the camera terminals.

This consequently eliminates producing a dead area in the target detection area. In other words, the whole target detection area is detected. In addition, each camera terminal has the same function and operates automatically and coordinately communicating with other camera terminals whose detection areas are adjacent to the detection area of each camera. This eliminates the need that someone predicts the status changes and makes the table. Also, this makes it possible to take images in the entire target detection area even in the case where a camera is broken.

Here, in a first aspect of the present invention, it is further preferable that the camera, of the detection area adjustment apparatus, includes a unit that adjusts a spatial resolution of the detection area, the detection area information includes information for specifying the spatial resolution of the detection area, and the adjustment unit that controls the camera of the camera terminal and to adjust the position and the spatial resolution of the detection area so that a total area of the detection areas of the camera terminals covers the entire target detection area and the spatial resolutions of the detection areas of the camera terminals become substantially the same, based on (i) the detection area information on the camera terminal, and (ii) detection area information that the communication unit receives, from the other camera terminals.

Each camera terminal controls not only camera angles such as pan and tilt but also a zoom ratio in this way. This enables adjusting the position and the size of the detection area, and consequently, taking an image of the entire target detection area using an even spatial resolution.

Note that the present invention can be realized not only as the decentralized control structure in which an adjustment unit is set at each camera terminal but also as the centralized control structure in which a common adjustment unit is set, the common adjustment unit being for adjusting the positions of the detection areas of all the camera terminals. Also, it can be realized as a detection area adjustment method and a program causing a computer to execute the method. Further, the present invention can be realized as an apparatus for adjusting the position of the detection area of a sensor that is capable of detecting physical values obtained through a microphone and the like instead of the detection area in which a camera can take images. Note that the program concerning the present invention can be distributed through a recording medium such as a CD-ROM and a communication medium such as the Internet.

With the detection area adjustment apparatus of the present invention, the detection areas of respective camera terminals are automatically adjusted so that the total area of the detection areas of the respective cameras of the camera terminals can cover the predetermined entire target detection area. This eliminates the conventional requirement that someone conceives the information on the detection area of each camera in response to each status change. Also, this enables efficiently covering the predetermined target detection area without producing any dead areas even in the case where several cameras are broken.

Therefore, the present invention guarantees that an arbitrary space can be detected without producing any dead areas, and thus it is highly practical especially as, for example, a system for monitoring suspects in a school, a building and the like.

FURTHER INFORMATION ABOUT TECHNICAL BACKGROUND TO THIS APPLICATION

The disclosure of Japanese Patent Application No. 2004-027294 filed on Feb. 3, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIGS. 16A and 16B are diagrams illustrating respective examples where the present invention is applied to a microphone;

FIG. 34 is an illustration showing how the moving camera terminal moves on the track of a rail that is set in a monitoring area.

DETAILED DESCRIPTION OF THE INVENTION

Embodiments of the present invention will be described below with reference to figures.

First Embodiment

A first embodiment of the present invention will be described first.

This embodiment relates to a detection area adjustment apparatus that automatically adjusts the positions of the detection areas of the cameras in camera terminals so that the total area of the detection areas of the cameras in the camera terminals covers the predetermined entire target detection area. This embodiment will be described with reference to FIG. 8 to FIG. 14.

Figure 1:
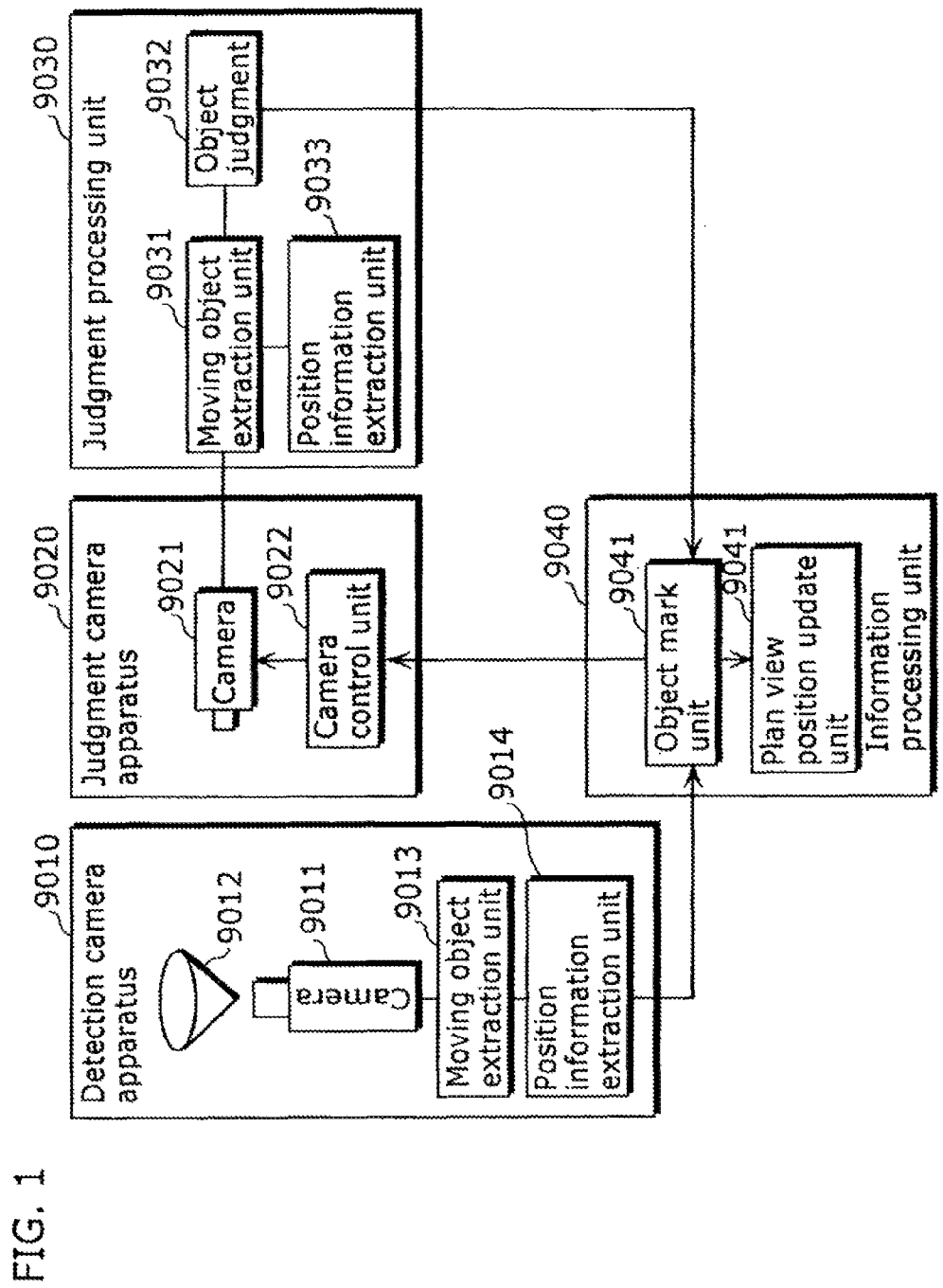
FIG. 1 is a block diagram of a conventional technique 1.
Figure 2:
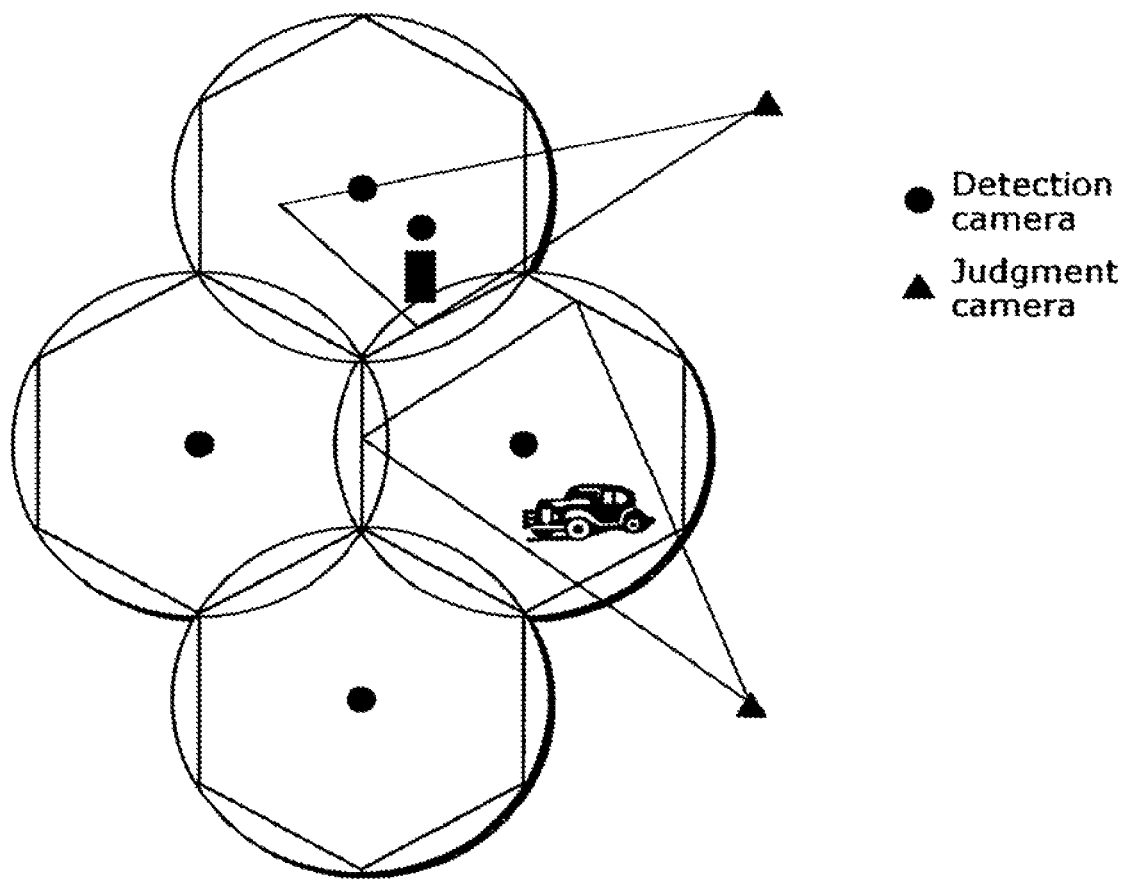
FIG. 2 is an illustration of camera angle ranges in the conventional technique 1.
Figure 3:
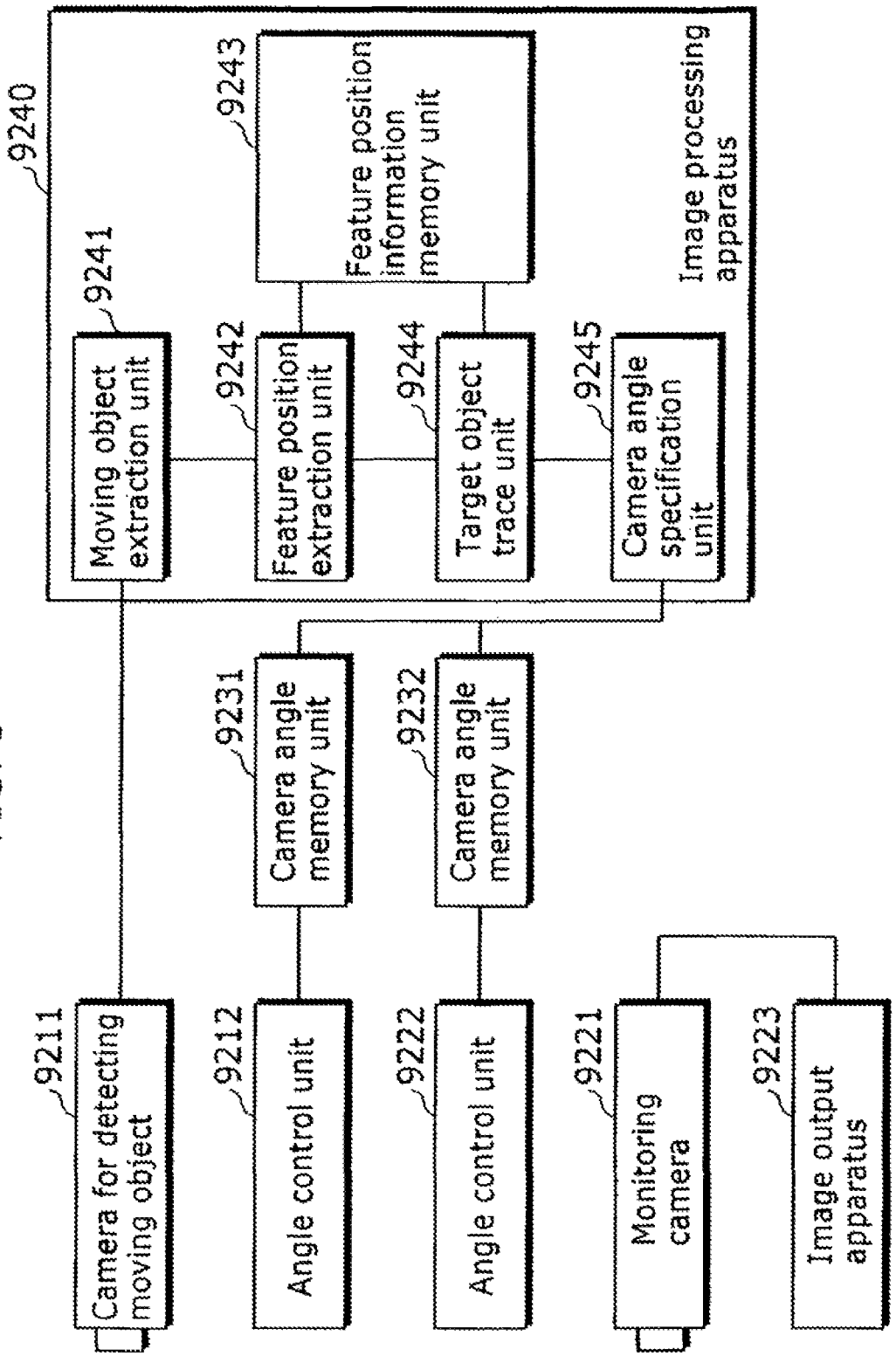
FIG. 3 is a block diagram of a conventional technique 2.
Figure 4:
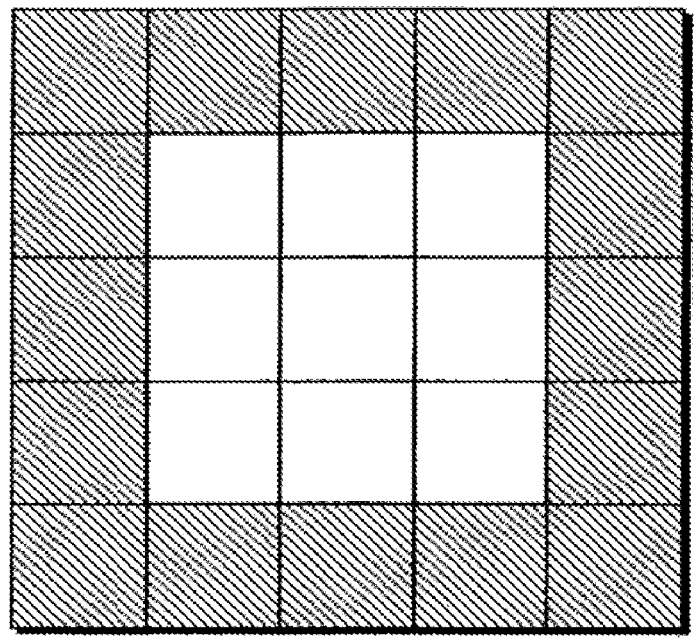
FIG. 4 is an illustration of an operation in the conventional technique 2.
Figure 5:
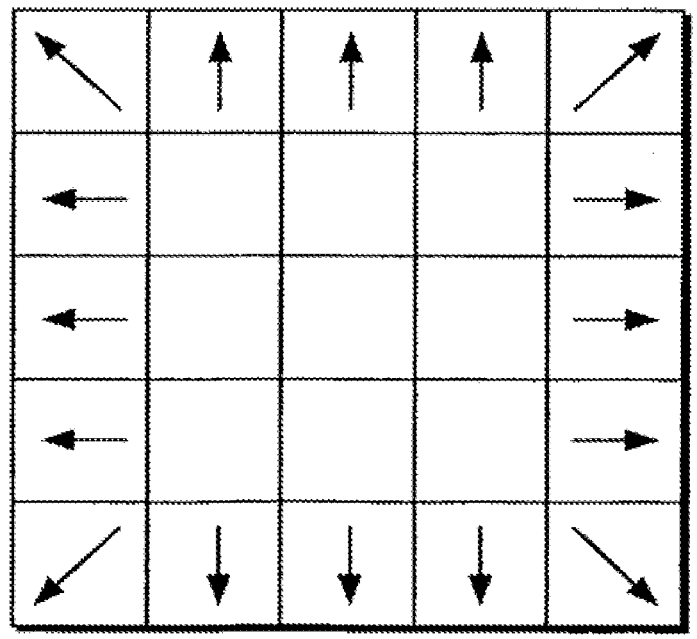
FIG. 5 is an illustration of another operation in the conventional technique 2.
Figure 6:
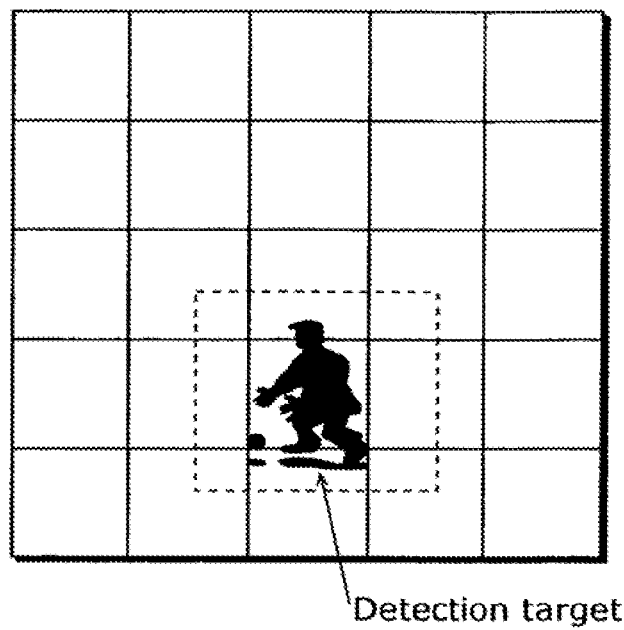
FIG. 6 is an illustration of another operation in the conventional technique 2.
Figure 7:
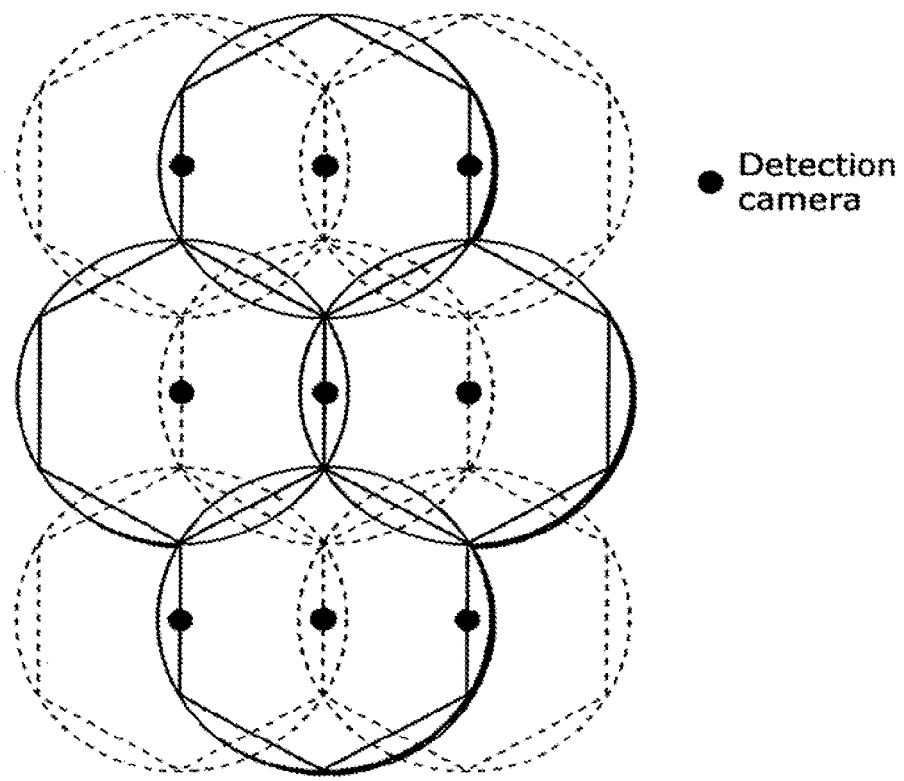
FIG. 7 is an illustration of still another operation in the conventional technique 2.
Figure 8:
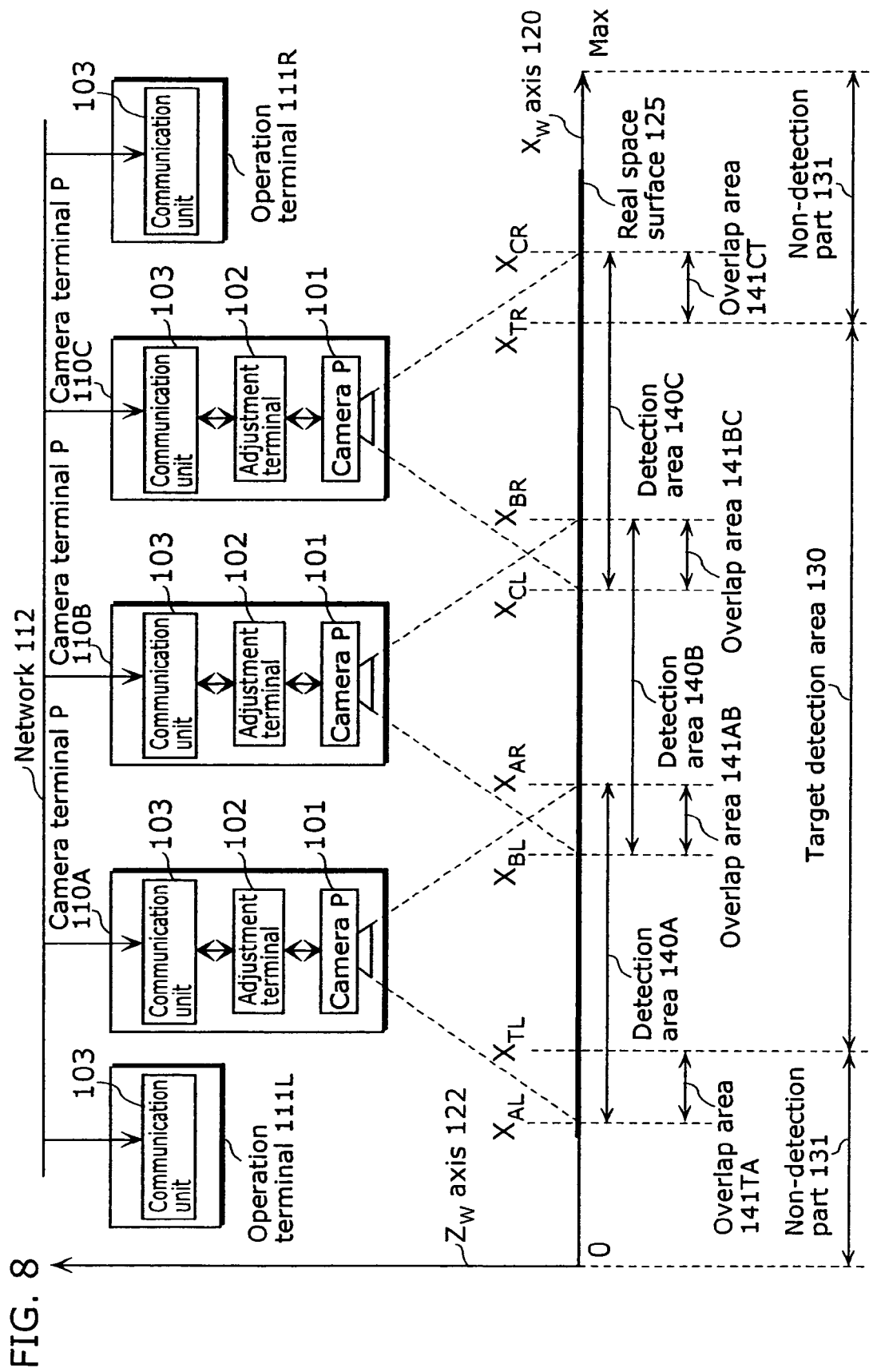
FIG. 8 is a block diagram of a detection area adjustment apparatus in a first embodiment of the present invention.

FIG. 8 is a block diagram of the structure of the detection area adjustment apparatus in the first embodiment of the present invention. This detection area adjustment apparatus is composed of (i) several camera terminals P110A to P110C and (ii) two operation terminals 111L and 111R, each of (i) and (ii) being connected through a network 112.

The camera terminals P110A to P110C are camera terminals that communicate with each other and operate automatically and coordinately. Each of the camera terminals has the same structural components that are a camera P101, an adjustment unit 102 and a communication unit 103. The camera P101 is a camera whose detection area position is movable. The adjustment unit 102 is the processing unit that adjusts the position of the detection area of the camera P101. The communication unit 103 is the processing unit that communicates information on the position of the detection area of the camera P101.

The adjustment unit 102 adjusts the position of the detection area by controlling the camera P101 in the current camera terminal based on the information on the position of the detection area of the current camera terminal and the information on the positions of the detection areas of the other camera terminals received by the communication unit 103 so that the total area of the detection areas of the camera terminals P110A to P110C can cover the entire target detection area. More specifically, the adjustment unit 102 adjusts the position of the detection area of the current camera terminal in the areas adjacent to the detection area of the current camera terminal so as not to leave non-detection part which does not belong to any of detection areas of camera terminals P110A to P110C.

The operation terminals 111L and 111R obtain instructions from a user, and notify the instructions to the camera terminals PR1110A to PR1110C respectively. They include a communication unit 103 for communicating the information on the position of the target detection object. The network 112 is the network circuit that is used in communication via communication units 103 in the camera terminals P110A to P110C and the operation terminals 111L and 111R. The camera terminals P110A to P110C communicate the information on the positions of the detection areas of the cameras P101 in the camera terminals P via the network 112. On the other hand, the operation terminals 111L and 111R communicate information on the target detection area to camera terminals P110A to P110C respectively via the network 112.

Here, in order to represent the area and the position in the area, an $X_W$ axis 120 and a $Z_W$ axis 122 that are perpendicular to each other are determined. The real space surface 125 is a surface in real space where camera terminals P110A to P110C are present, for example, it is a floor in the case where the camera terminals P110A to P110C are set in a downward direction from a ceiling. In the case of the first embodiment of the present invention, the real space surface 125 matches the $X_W$ axis 120, and various areas and the positions of the areas are described based on this surface. On the real space surface 125, the target detection area 130 is the entire area where detections in this invention are performed, and the position of the area is represented using $X_{TL}$ and $X_{TR}$. The non-detection part 131 is the area not to be detected in this invention.

The broken line emitted from each camera P101 shows the edges of the detection area of each camera P101. The detection area 140A is the detection area of the camera terminal P110A, and the position of the area is represented using $X_{AL}$ and $X_{AR}$. The detection area 140B is the detection area of the camera terminal P110B, and the position of the area is represented using $X_{BL}$ and $X_{BR}$. The detection area 140C is the detection area of the camera terminal P110, and the detection area is represented using $S_{CL}$ and $X_{CR}$. The overlap area 141TA is the overlap area of the detection area 140A that is the detection area of the camera terminal P110A and the non-detection part 131, and the size of the area is obtained from expression: $X_{TL}-X_{AL}$. The overlap area 141AB is the overlap area of the detection area 140A that is the detection area of the camera terminal P110A and the detection area 140B that is the detection area of the camera terminal P110B, and the size of the area is obtained from expression: $X_{AR}-X_{BL}$. The overlap area 141BC is the overlap area of the detection area 140B that is the detection area of the camera terminal P110B and the detection area 140C that is the detection area of the camera terminal P110C, and the size of the area is obtained from expression: $X_{BR}-X_{CL}$. The overlap area 141CT is the overlap area of the detection area 140C that is the detection area of the camera terminal P110C and the non-detection part 131, and the size of the area is obtained from expression: $X_{CR}-X_{TR}$.

Figure 9A:
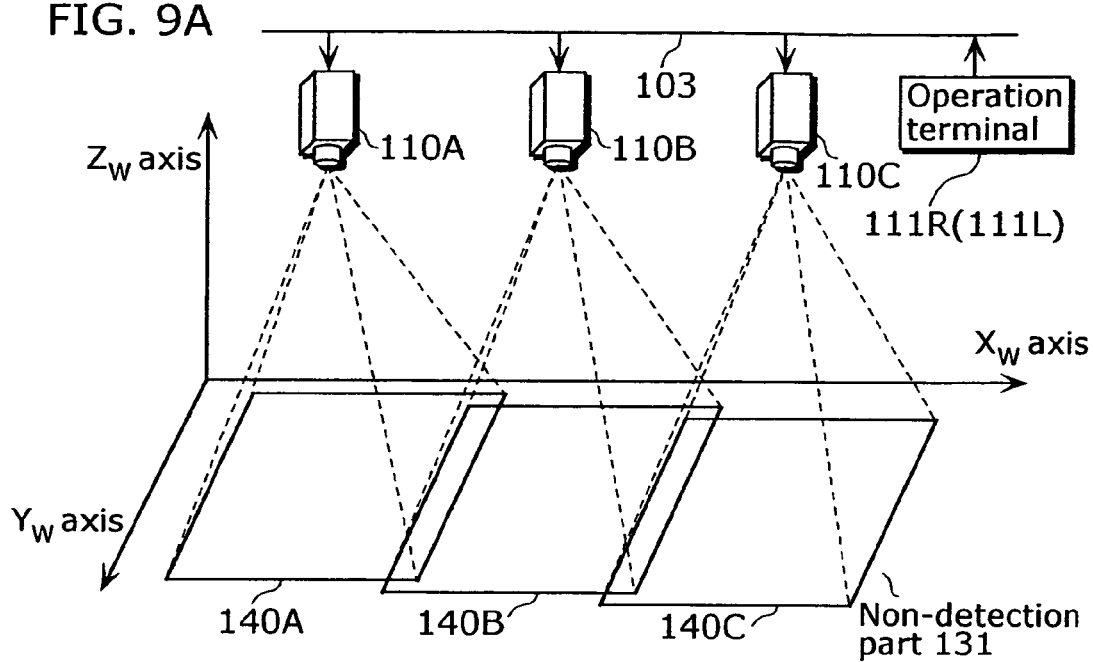
FIG. 9A to 9C are example diagrams that are respectively showing detection areas and overlap areas.
Figure 9B:
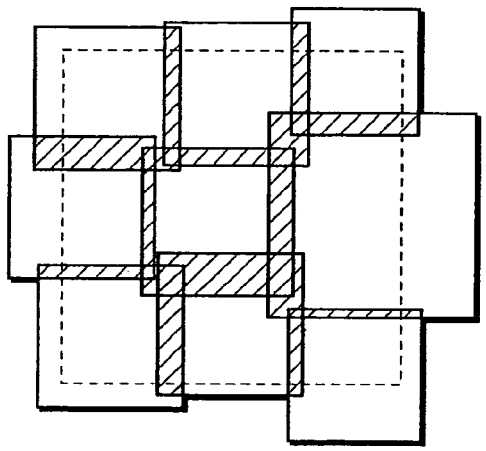
Figure 9C:
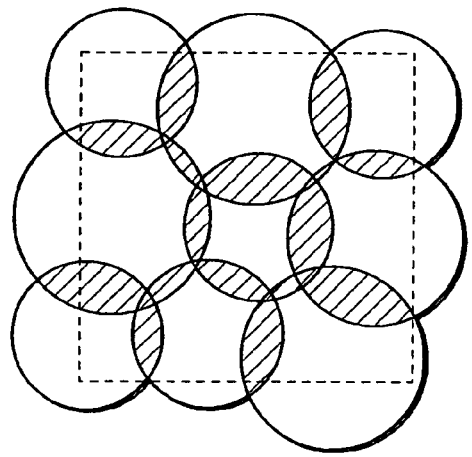

Note that the detection areas and the overlap areas are shown on the one-dimensional $X_W$ axis 120 in this figure for the convenience in explanation, but there are other detection areas and other overlap areas on the surface. FIG. 9A is a diagram showing the detection area of this embodiment two-dimensionally. FIG. 9B shows an example of the detection areas (squares) and the overlap areas (diagonally-shaded areas) in the case where the detection areas are squares. FIG. 9C is a diagram showing an example of the detection areas (circles) and the overlap areas (diagonally-shaded areas) in the case where the detection areas are circles. The detection area adjustment apparatus of this embodiment can be applied also in the case where the detection area is not two-dimensional but three-dimensional as will be described later. The processing that is performed in the case of one-dimension can be extendedly applied to the case of two-dimension and three-dimension, and thus only X axis will be focused on in the description.

Figure 10A:
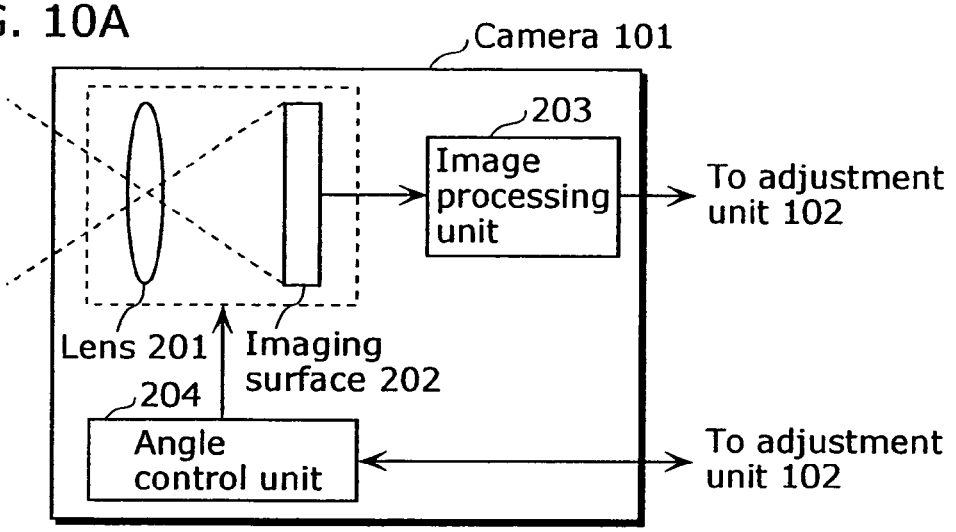
FIG. 10A to 10C are block diagrams of a camera P.
Figure 10B:
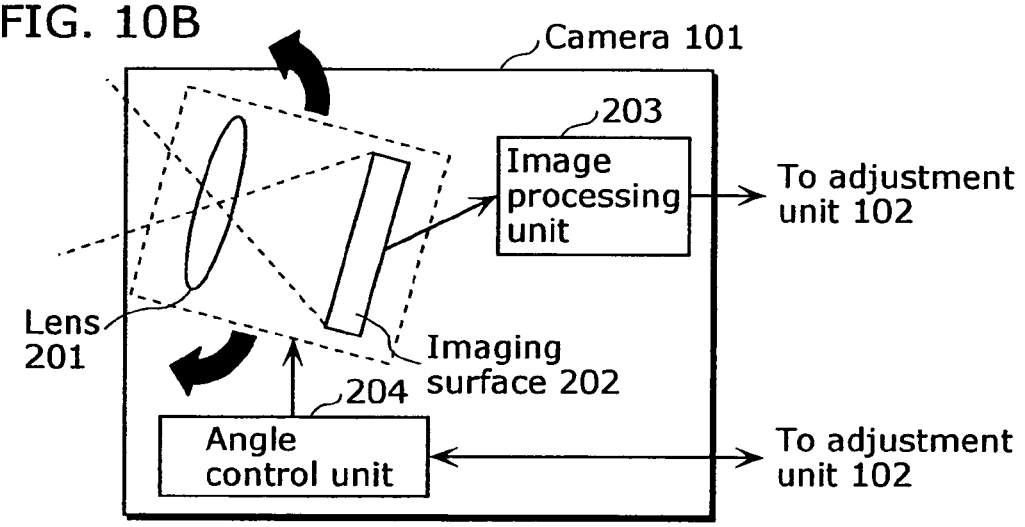
Figure 10C:
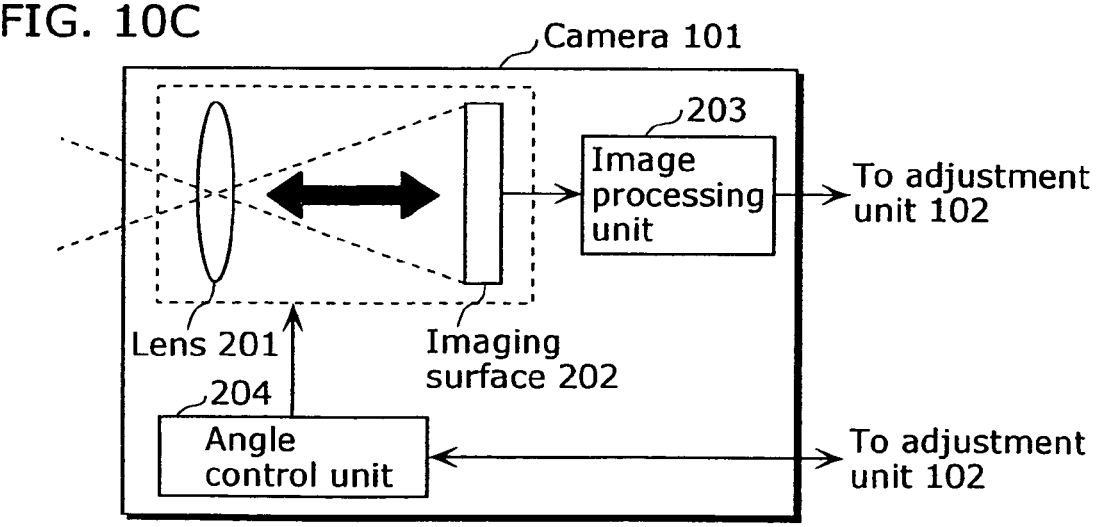

FIG. 10A is a diagram showing the internal structure of the camera P101. The camera P101 includes a lens 201, an imaging surface 202, an imaging processing unit 203 and an angle control unit 204. The lens 201 is for forming images, the imaging surface 202 is a device such as a CCD that takes an image formed on the lens 201, the image processing unit 203 is the processing unit for processing a taken image on the imaging surface 202, and the angle control unit 204 is the processing unit that controls the positions of the lens 201 and the imaging surface 202, or the interval of the lens 201 and the imaging surface 202. The angles of the lens 201 and the imaging surface 202 that are controlled by the angle control unit 204 is generally called pan or tilt. As shown in FIG. 10B, the lens 201 and the imaging surface 202 are rotated in an associated manner, centering a point or an axis. Also, the control on the interval between the lens 201 and the imaging surface 202 performed by the angle control unit 204 is generally called zoom, and as shown in FIG. 10C, the interval between the lens 201 and the imaging surface 202 increases and decreases.

The operation of the detection area adjustment apparatus in the first embodiment of the present invention will be described with reference to FIG. 8. In the camera terminals P110A to P110C the cameras P101 have internal structures respectively as shown in FIG. 10A. In each camera P101, the image formed on the lens 201 shown in FIG. 10A is converted into an image signal on the imaging surface 202. After that, the detection of a target detection object and the extraction of information from the image signal are performed in the image processing unit 203 using a general image processing technique and a general image recognition technique. In this way, the camera P101 performs operations such as the detection of a target detection object and the extraction of information in its imaging range that is determined as a detection area in the real space surface, based on the angles of the lens 201 and the imaging surface 202 and the interval between the lens 201 and the imaging surface 202. The information on the detected target is sent to the adjustment unit 102 in FIG. 8. Note that examples of the above-mentioned general image processing technique and the general image recognition technique are the background subtraction technique and the dynamic subtraction technique that are well-known.

Further, in the camera P101, the angle control unit 204 shown in FIG. 10A adjusts the position of the detection area of the camera P101 to the position specified by the adjustment unit 101 in FIG. 8 by controlling the angles of the lens 201 and the imaging surface 202, or the interval between the lens 201 and the imaging surface 202. Also, the angle control unit 204 sends the information on the position of the detection area of the current camera P101 to the adjustment unit 102, the information on the position being determined based on the angles of the current lens 201 and the imaging surface 202 or the interval between the lens 201 and the imaging surface 202. In this way, the position of the detection area of the camera P101 is controlled by the adjustment unit 102, and the information on the position of the detection area of the current camera P101 is sent to the adjustment unit 102. Note that the method for calculating the position of the detection area of the current camera P101 will be described later in detail in the supplementary explanation 1, the position being determined based on the angles of the current lens 201 and the imaging surface 202 or the interval between the current lens 201 and the imaging surface 202. Also, (i) the positions of the lens 201 and the imaging surface 202 and (ii) the interval between the current lens 201 and the imaging surface 202 can be adjusted using, for example, a stepper motor, and also, the current position and the interval can be read.

The adjustment unit 102 periodically sends the information on the position of the detection area of the camera P101 that is sent from the camera P101 to the adjustment unit 102 of the other camera terminal P via the communication unit 103 and the network 112. Also, the adjustment units 102 receive the information on the positions of the detection areas of the cameras P101 in the other camera terminals P that are periodically sent from the adjustment units 102 in the other camera terminals P. Further, in the operation terminals 111L and 111R, the communication units 103 periodically send the information on the position of the target detection area 130 to the adjustment units 102 in the camera terminals P110A to P110C via the network 112.

In this way, the adjustment units 102 periodically obtain (i) the information on the positions of the detection areas of cameras P101 in the current camera terminal P and the other camera terminals P and (ii) the information on the position of the target detection area of the camera terminals P110A to P110C. Also, in the first embodiment of the present invention, the adjustment units 102 periodically obtain, via the communication unit 103 and the network 112, $X_{AL}$ and $X_{AR}$ indicating the position of the detection area 140A of the camera terminal P110A, $X_{BL}$ and $X_{BR}$ indicating the position of the detection area 140B of the camera terminal P110B, $X_{CL}$ and $X_{CR}$ indicating the position of the detection area 140C of the camera terminal P110C, and $X_{TL}$ and $X_{TR}$ indicating the position of the target detection area 130.

Figure 11:
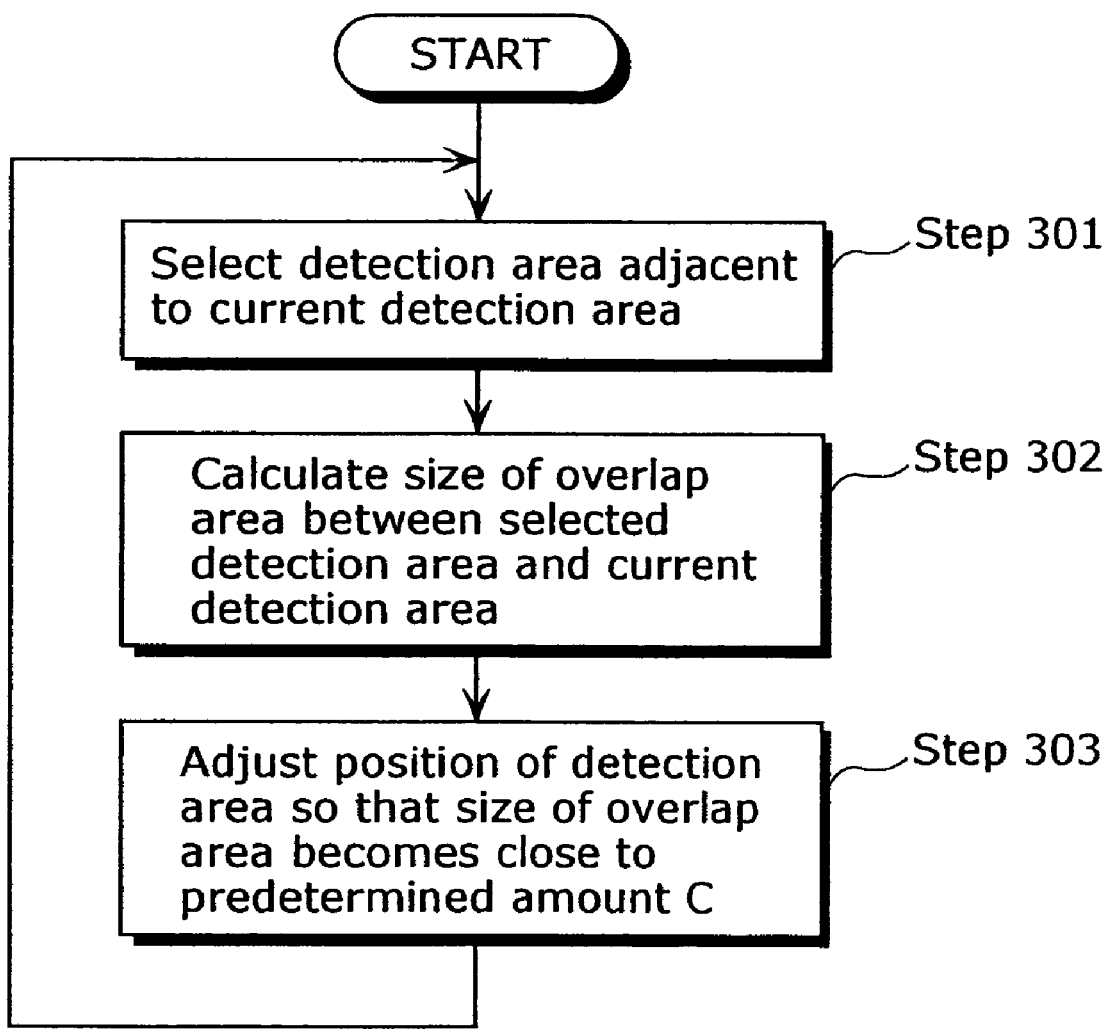
FIG. 11 is a flow chart of the processing performed by an adjustment unit.

In addition, the adjustment unit 102 performs the processing of the following steps shown in FIG. 11 based on the information on the positions of the obtained detection areas and the information on the position of the target detection area so as not to leave non-detection part which does not belong to any of detection areas of camera terminals P110A to P110C, in the area adjacent to the detection area of the current camera terminal.

First, the adjustment unit 102 selects detection areas of the other camera terminals P adjacent to the detection area of the current camera terminal P or non-detection part based on the information indicating the positions of the detection areas of the cameras P101 in the current camera terminal P and the other camera terminals P (Step 301). An example of this selection method will be described below with reference to FIG. 12.

Figures 12A, 12B:
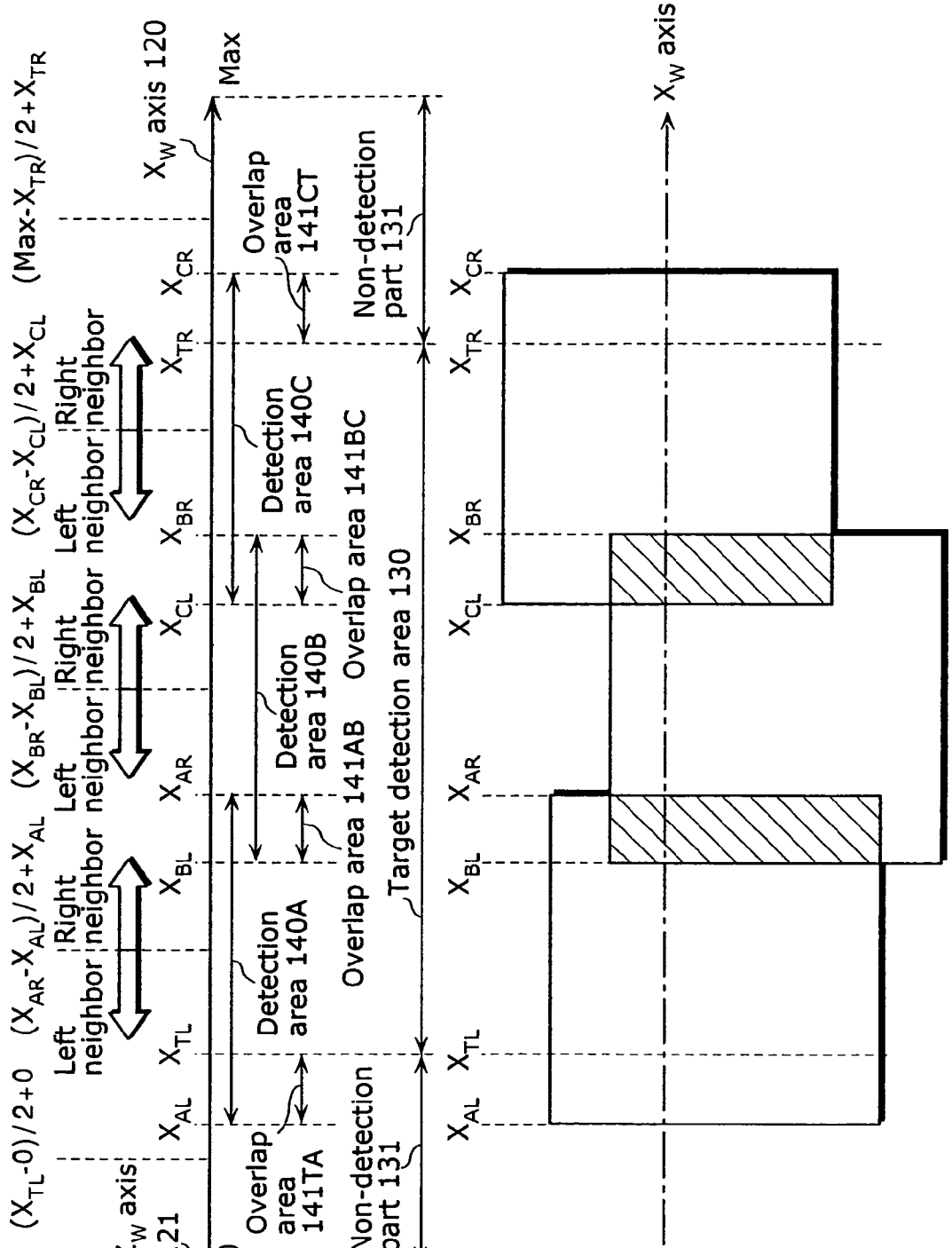
FIGS. 12A and 12B are illustrations of adjacent detection areas.

FIG. 12A is a diagram showing the detection areas and the overlap areas on the $X_W$ axis in the case where the detection areas shown in FIG. 12B are squares. First, the center position of the detection area of the current camera terminal P, the center positions of the detection areas of the other camera terminals P, and the center position of the non-detection part are calculated. After that, the detection areas of the other cameras or the non-detection part that has a center position whose value is smaller than the value of the center position of the detection area of the current camera terminal P is selected as the detection area that is the left neighbor. Also, the detection areas of the other cameras or the non-detection part that has a center position whose value is larger than the value of the center position of the detection area of the current camera terminal P is selected as the detection area that is the right neighbor. Note that, in the case where there are several detection areas or non-detection part of the other cameras whose values are smaller or larger, the area whose center position is closest to the center position of the detection area of the current camera terminal P is selected. Accordingly, selections are as follows: in the camera terminal P110A, the non-detection part 131 as the left neighbor; and the detection area 140B as the right neighbor; in the camera terminal P110B, the detection area 140A as the left neighbor; and the detection area 140C as the right neighbor; and in the camera terminal P110C, the detection area 140B as the left neighbor; and the non-detection part 131 as the right neighbor. Note that there are several methods other than the selection method of the adjacent areas. The other methods will be described later in a supplementary explanation 2.

Next, the size of the overlap areas of the detection areas selected in Step 301 and the detection area of the current camera terminal P is calculated (Step 302). In this calculation method, the overlap areas are calculated based on the sizes of the selected detection area and the detection area of the current camera terminal P as shown in FIG. 12, and thus this method is simpler. Accordingly, calculations are performed as follows: in the camera terminal P110A, $X_{TL}-X_{AL}$ indicating the size of the overlap area 141TA that is the left overlap area; and $X_{AR}-X_{BL}$ indicating the size of the overlap area 141AB that is the right overlap area; in the camera terminal P110B, $X_{AR}-X_{BL}$ indicating the size of the overlap area 141AB that is the left overlap area; and $X_{BR}-X_{CL}$ indicating the size of the overlap area 141BC that is the right overlap area; and in the camera terminal P110C, $X_{BR}-X_{CL}$ indicating the size of the overlap area 141BC that is the left neighbor; and $X_{CR}-X_{TR}$ indicating the size of the overlap area 141CT that is the right neighbor.

Next, the position of the detection area of the current camera terminal P is adjusted so that the amount indicating the size of the overlap area that is calculated in Step 302 can become close to a certain amount C (Step 303). This adjustment method will be described below. First, a function UP( ) is determined as the amount indicating the difference between (i) the amount indicating the size of the overlap area and (ii) 0 or a certain amount C that is over 0. In this first embodiment, as shown in the following expressions 1 to 3, the same function is applied to the respective camera terminals P110A to P110C.

$$UP_{AL}(X_{AL})=(X_{TL}-X_{AL}-C)^2 \quad UP_{AR}(X_{AR})=(X_{AR}-X_{BL}-C)^2 \quad \text{[Expression 1]}$$

$$UP_{BL}(X_{BL})=(X_{AR}-X_{BL}-C)^2 \quad UP_{BR}(X_{BR})=(X_{BR}-X_{CL}-C)^2 \quad \text{[Expression 2]}$$

$$UP_{CL}(X_{CL})=(X_{BR}-X_{CL}-C)^2 \quad UP_{CR}(X_{CR}=(X_{CR}-X_{TR}C)^2 \quad \text{[Expression 3]}$$

The expressions 1 to 3 are used for the camera terminals P110A to P110C respectively, and the square values of the differences between the amounts indicating the sizes of the overlap areas and the certain amount C are determined as the amounts indicating the respective differences. Next, as shown in the following expressions 4 to 6, the next position of the detection area of the current camera terminal P will be calculated using the generally well-known steepest descent method.

$$X'_{AL} = X_{AL} - \alpha \frac{\partial UP_{AL}(X_{AL})}{\partial X_{AL}} \quad \text{[Expression 4]}$$

$$X'_{AR} = X_{AR} - \alpha \frac{\partial UP_{AR}(X_{AR})}{\partial X_{AR}}$$

$$X'_{BL} = X_{BL} - \alpha \frac{\partial UP_{BL}(X_{BL})}{\partial X_{BL}} \quad \text{[Expression 5]}$$

$$X'_{BR} = X_{BR} - \alpha \frac{\partial UP_{BR}(X_{BR})}{\partial X_{BR}}$$

$$X'_{CL} = X_{CL} - \alpha \frac{\partial UP_{CL}(X_{CL})}{\partial X_{CL}} \quad \text{[Expression 6]}$$

$$X'_{CR} = X_{CR} - \alpha \frac{\partial UP_{CR}(X_{CR})}{\partial X_{CR}}$$

In the expressions 4 to 6, $X'_{AL}, X'_{AR}, X'_{BL}, X'_{BR}, X'_{CL}, X'_{CR}$ respectively show the next positions of the detection areas of the camera terminals P110A to P110C, and $\alpha$ is a constant. Lastly, the positions of the detection areas of the cameras P101 are adjusted to the next positions of detection areas.

Note that $X_{AL}$ and $X_{AR}$ need to be independently adjustable in the above-mentioned method, the $X_{AL}$ and $X_{AR}$ indicating, in combination, the position of the detection area of the current camera terminal P. Likewise, $X_{BL}$, $X_{BR}$, $X_{CL}$, and $X_{CR}$ also need to be independently adjustable. However, a general camera cannot adjust them independently as described in FIG. 10A or will be described later in a supplementary explanation 1. In this way, in the case where it is impossible to adjust them independently, on condition that the function UP( ) is shown in the following expressions 7 to 9, and using the expressions of the steepest descent method shown in the following expressions 10 to 12 enables performing similar adjustments as the one mentioned above.

When $$UP_A(X_{AL}, X_{AR}) = UP_{AL}(X_{AL}) + UP_{AR}(X_{AR})$$

$$X_{AL} = F_{AL}(\theta_{1A}, \theta_{2A} \ldots), X_{AR} = F_{AR}(\theta_{1A}, \theta_{2A} \ldots)$$

$$UP_A(X_{AL}, X_{AR}) = UP_A(\theta_{1A}, \theta_{2A} \ldots) = (X_{TL} - F_{AL}(\theta_{1A}, \theta_{2A} \ldots) - X_{BL} - C)^2 \quad \text{[Expression 7]}$$

When $$UP_B(X_{BL}, X_{BR}) = UP_{BL}(X_{AL}) + UP_{BR}(X_{AR})$$

$$X_{BL} = F_{BL}(\theta_{1B}, \theta_{2B} \ldots), X_{BR} = F_{BR}(\theta_{1B}, \theta_{2B} \ldots)$$

$$UP_B(X_{BL}, X_{BR}) = UP_B(\theta_{1B}, \theta_{2B} \ldots) = (X_{AR} - F_{BL}(\theta_1 B, \theta_{2B} \ldots) - C)^2 + (F_{BR}(\theta_{1B}, \theta_{2B} \ldots) - X_{CL} - C)^2 \quad \text{[Expression 8]}$$

When $$UP_C(X_{CL}, X_{CR}) = UP_{CL}(X_{CL}) + UP_{CR}(X_{CR})$$

$$X_{CL} = F_{CL}(\theta_{1C}, \theta_{2C} \ldots), X_{CR} = F_{CR}(\theta_{1C}, \theta_{2C} \ldots),$$

$$UP_C(X_{CL}, X_{CR}) = UP_C(\theta_{1C}, \theta_{2C} \ldots) = (X_{BR} - F_{CL}(\theta_{1C}, \theta_{2C} \ldots) - C)^2 + (X_{TR} - F_{CR}(\theta_{1C}, \theta_{2C} \ldots) - C)^2 \quad \text{[Expression 9]}$$

$$\theta'_{1A} = \theta_{1A} - \alpha \frac{\partial UP_A(\theta_{1A})}{\partial \theta_{1A}} \quad \text{\{Expression 10\}}$$

$$\theta'_{2A} = \theta_{2A} - \alpha \frac{\partial UP_A(\theta_{2A})}{\partial \theta_{2A}} \ldots,$$

$$\theta'_{1B} = \theta_{1B} - \alpha \frac{\partial UP_B(\theta_{1B})}{\partial \theta_{1B}} \quad \text{[Expression 11]}$$

$$\theta'_{2B} = \theta_{2B} - \alpha \frac{\partial UP_B(\theta_{2B})}{\partial \theta_{2B}} \ldots$$

$$\theta'_{1C} = \theta_{1C} - \alpha \frac{\partial UP_C(\theta_{1C})}{\partial \theta_{1C}} \quad \text{[Expression 12]}$$

$$\theta'_{2C} = \theta_{2C} - \alpha \frac{\partial UP_C(\theta_{2C})}{\partial \theta_{2C}} \ldots,$$

The adjustment unit 102 performs the processing of Steps 301, 302 and 303 in sequence, and returns to the processing of Step 301 after finishing the processing of Step 303. After that, the adjustment unit 102 repeats the processing of Steps 301 to 303 until it completes the adjustment of the detection range of the camera P101.

The operations of the detection area adjustment apparatus in the first embodiment of the present invention have been described. The next position of the detection area of the current camera terminal P is calculated using the steepest descent method so that the amount indicating the size of the overlap areas in the Step 303 becomes close to 0 or a certain amount C that is over 0. Also, the position of the detection area of the camera P101 is adjusted to the next position of the detection area. Therefore, the detection areas 140A, 140B and 140C that are the detection areas of the camera terminals P110A to P1110C respectively and the non-detection part are to have overlap areas whose sizes are 0 or a certain amount C that is over 0 by repeating the processing of Steps 301 to 303. As shown in FIG. 8, the detection areas of camera terminals P110A to P110C and the non-detection part have overlap areas whose sizes are 0 or a certain amount C that is over 0, the target detection area 130 is included in the total area of the camera terminals P110A to P110C. Therefore, the detection area adjustment apparatus of the present invention can detect the entire target detection area 130 using the camera terminals P110A to P110C.

Also, the adjustment unit 102 can have an effect of detecting the entire target detection area 130 by repeating the processing of Steps 301 to 303. The processing of Steps 302 and 303 that are repeatedly performed on the detection areas of the other cameras P adjacent to the detection area of the current camera terminal P selected in Step 301.

Therefore, even in the case where there is adjustment in the positions of the detection areas of the other cameras P that are adjacent to the detection area of the current camera terminal P or the position of the target detection area, it is possible to obtain the effect of detecting the entire target detection area 130 in response to the adjustment. The cases where there is adjustment in the positions of detection areas or the position of the target detection area are as follows:

(1) the detection area position of the camera terminal P is adjusted;
(2) a camera terminal P is newly set;
(3) several camera terminals P among all camera terminals P are removed or broken; and
(4) the position of target detection area sent from an operation terminal is adjusted.

The operations of the present invention in response to the adjustment will be described later in detail in supplementary explanations 3 and 4. In brief, the adjustment leads to adjustment in the positions of detection areas sent by the respective camera terminals P or the position of target detection area sent by the operation terminal. Also, even in the case where the positions of the detection areas are not sent or new positions of the detection areas are sent, the detection area adjustment apparatus of the present invention can detect the entire target detection area 130 using the respective camera terminals P in response to the adjustment in the positions of detection areas or the position of the target detection area.

Figure 13:
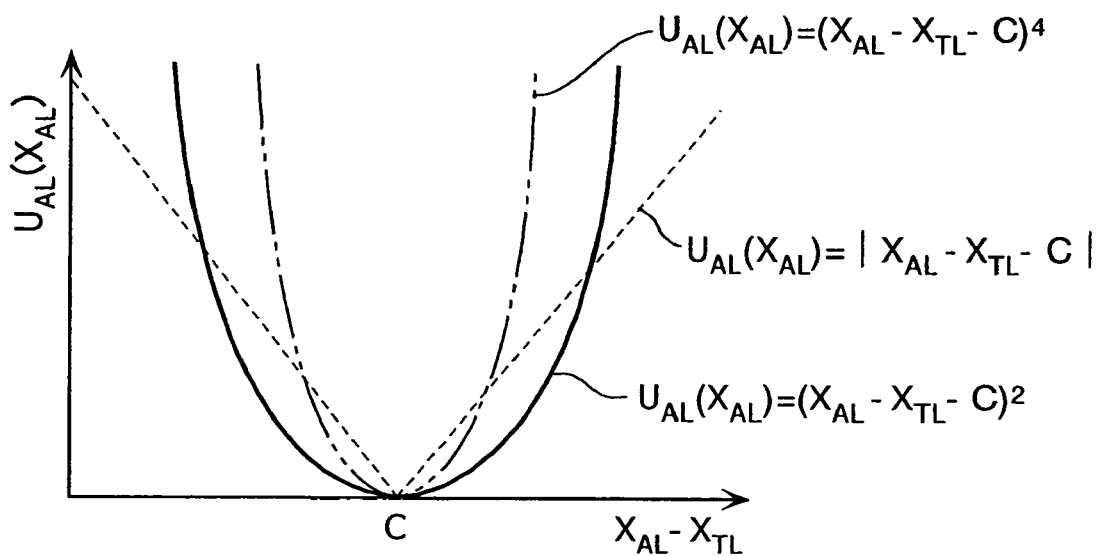
FIG. 13 is an illustration of a function U( )

Note that, in this first embodiment, as shown in the above-mentioned expressions 1 to 3 and 7 to 9, the function UP( ) indicating the difference between (i) the amount indicating the size of the overlap areas and (ii) 0 or a certain amount C that is over 0 is determined as a square value of the difference between the amount indicating the size of the overlap areas and the certain amount C. However, as shown in FIG. 13, the function UP( ) may be any of (i) an even number power value such as a four power, a six power, and a ten power of the difference between the amount indicating the size of the overlap area and the certain amount C and (ii) an absolute value of the difference between the amount indicating the size of the overlap areas and the certain amount C. Since the function UP( ) becomes the smallest value when C is obtained from expression: $X_{AL}-X_{TL}$, the amount indicating the size of overlap areas becomes close to the certain amount C as the effect of the steepest descent method performed in Step 303, and thus a similar effect can be obtained.

Figure 14:
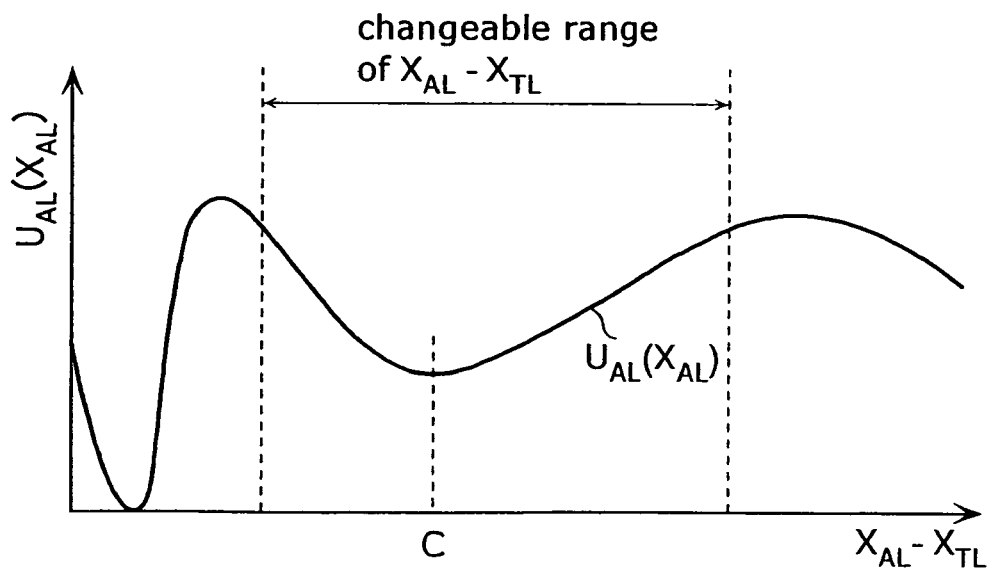
FIG. 14 is an illustration of another function U( )

Also, even in the case where the function UP( ) indicating the difference between (i) the amount indicating the size of the overlap areas and (ii) 0 or a certain amount C that is over 0 is not the smallest value when C is obtained from expression: $X_{AL}-X_{TL}$ as shown in FIG. 14 but the function UP( ) having a minimum value, a similar effect can be obtained as long as the function UP( ) is the smallest value when C is obtained from expression: $X_{AL}-X_{TL}$ in the adjustable range of $X_{AL}-X_{TL}$.

Figure 15:
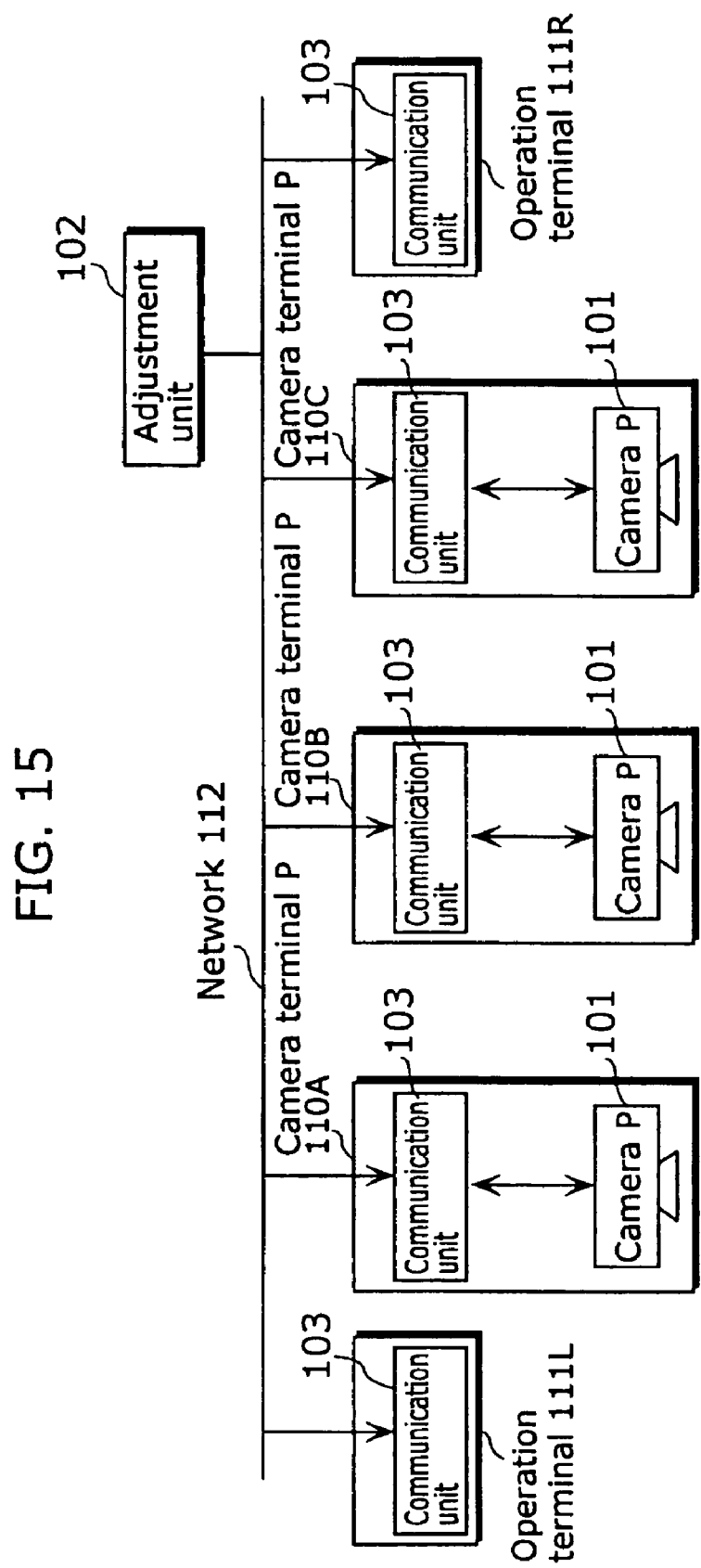
FIG. 15 is a block diagram of the structure of a detection area adjustment apparatus of a centralized control system in which a single adjustment unit adjusts all the detection areas.

Also, in the first embodiment, as shown in FIG. 8, the adjustment units 102 are included in the respective camera terminals P110A to P110C in a decentralized way. However, also in the case of the detection area adjustment apparatus which has a single adjustment unit 102 shown in FIG. 15, a similar effect can be obtained as long as the single adjustment unit 102 adjusts all the positions of the detection areas of the cameras P101 in the respective camera terminals P110A to P110C.

Also, in the first embodiment, the cameras P101 are handled as general cameras, but a similar effect may be obtained also in the case of using the cameras that detect visible light or invisible light such as infrared rays and ultraviolet rays. In addition, a similar effect may be obtained also in the case of using general sensors such as microsensors, pressure sensors, temperature sensors and air pressure sensors (i) that have detection areas for detecting various kinds of physical amounts and (ii) whose positions of detection areas are adjustable. For example, as for a microphone which has a directional pattern as shown in FIG. 16A, it is possible to define the directional area in which sound can be detected with a sensitivity that is a certain degree or more as a sense area (detection area) as shown in FIG. 16B. Controlling the angles of the microphone likewise the case of pan and tilt of the cameras in this embodiment makes it possible to form a detection area adjustment apparatus composed of plural microphones instead of or in addition to the cameras in this embodiment. In other words, the present invention can be applied to not only cameras but also the above-mentioned sensors.

Also, in this first embodiment, the network 112 is handled as a network circuit that is used in general communication, but a similar effect can be obtained even in the case where the network 112 is a wired or wireless network.

Figure 17A:
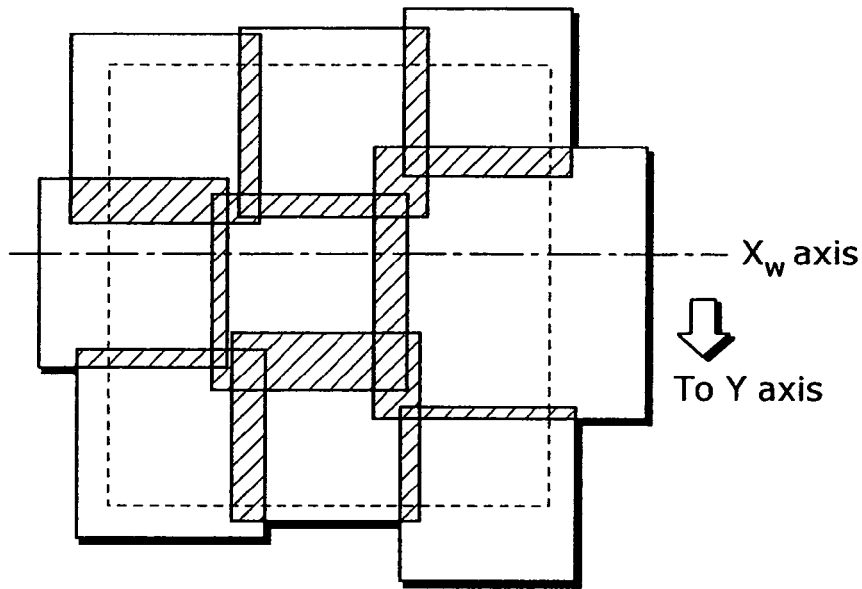
FIGS. 17A and 17B are diagrams of respective methods for applying the processing on the X axis to the processing on the Y axis.
Figure 17B:
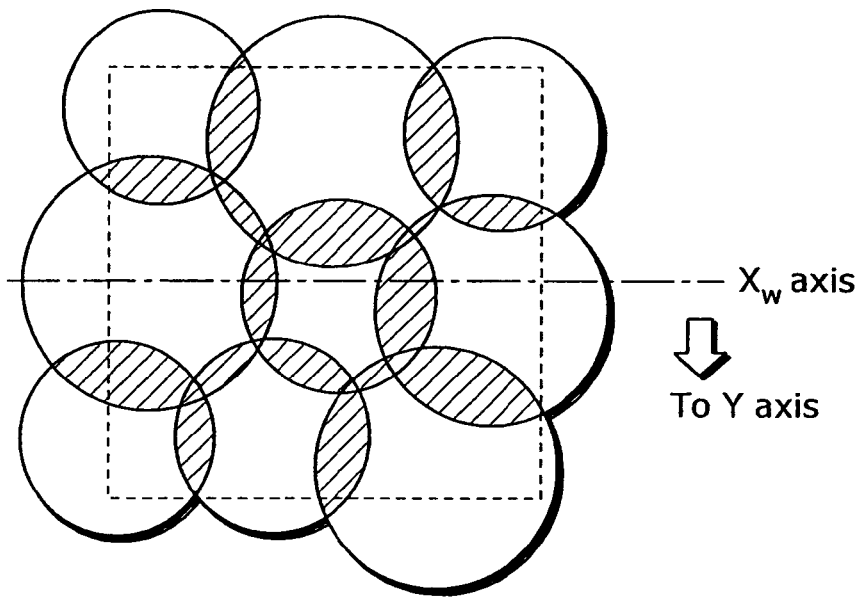

Note that the processing on the X axis has been mainly described in this embodiment, but applying the processing to the processing on the Y axis eliminates producing a dead area two-dimensionally. As shown in FIG. 17, the processing on the $X_W$ axis in this embodiment is performed, shifting the $X_W$ axis to the direction of Y axis at certain intervals, and this processing is repeated until the detection areas of the respective camera terminals are set so that overlap area becomes 0 or more at any positions on the Y axis. The processing on the $X_W$ axis is for making the overlap area 0 or more, and the detection areas for the respective camera terminals are adjusted to the largest detection areas in scanning to the Y axis direction. This eliminates producing a dead area on a surface irrespective of how the respective camera terminals are placed or the shapes of detection areas. This dimensional extension can be applied to the Z axis.

Second Embodiment

Next, a second embodiment of the present invention will be described below.

This embodiment relates to a detection area adjustment apparatus that can obtain images of the respective cameras whose spatial resolutions are substantially the same in response to adjustment even in the case where there is adjustment in the spatial resolutions of the detection areas of the other camera terminals whose detection areas are adjacent to the detection area of the current camera terminal.

Figure 18:
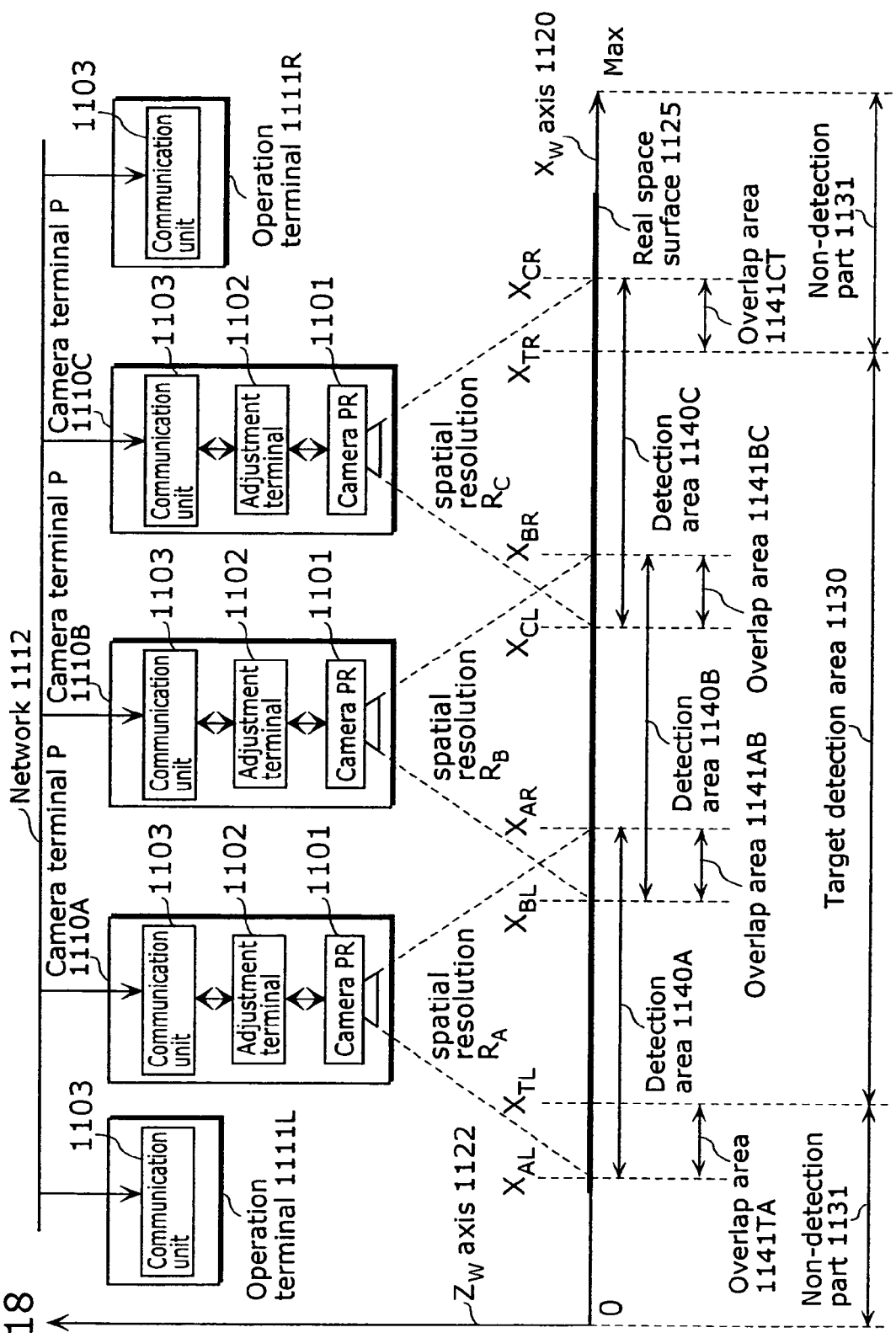
FIG. 18 is a block diagram of the structure of a detection area adjustment apparatus in a second embodiment of the present invention.

FIG. 18 is a block diagram of the structure of the detection area adjustment apparatus in the second embodiment of the present invention. This detection area adjustment apparatus is composed of several camera terminals PR1110A to PR1110C that are connected to each other on the network 112 and two operation terminals 1111L and 111R.

The camera terminals PR1110A to PR1110C communicate with each other and operate automatically and coordinately. Also, they include the same structural components that are a camera PR1101, an adjustment unit 1102 and a communication unit 1103. The camera PR1101 is the camera (such as a camera that can perform zoom control) whose position and spatial resolution of the detection area are adjustable. The adjustment unit 1102 is the processing unit for adjusting the position of the detection area of the camera PR1101 and the spatial resolution of the detection area. The communication unit 1103 is the processing unit for communicating the information on the position of the detection area of the camera PR1101 and the spatial resolution of the detection area.

Based on (i) the information on the position of the detection area of the current camera terminal and the spatial resolution of the detection area and (ii) the information on the positions of the detection areas of the other camera terminals and the spatial resolutions of the detection areas that are received in the communication unit 1103, the adjustment unit 1102 controls the camera in the current camera terminal and adjusts the position and the spatial resolution of the detection area so that the total area of the detection areas of the camera terminals PR1110A to PR1110C covers the entire target detection area, and the spatial resolutions of the detection areas of the camera terminals PR1110A to PR1110C become substantially the same. More specifically, the adjustment unit 1102 adjusts the position of the detection area and the spatial resolution of the detection area of the current camera terminal so as not to leave non-detection part which does not belong to any of the detection areas of the camera terminals PR1110A to PR1110C in the area adjacent to the detection area of the current camera terminal but so that the spatial resolution of the detection area of the current camera terminal and the spatial resolutions of the detection areas of the other camera terminals that are adjacent to the detection area become substantially the same.

The operation terminals 1111L and 1111R obtain instructions from a user, notify the instructions to the camera terminals PR1100A to PR1110C respectively, and include a communication unit 1103 for communicating the information on the position of the target detection object. The network 1112 is the network circuit used in communication via the communication units 1103 of the respective camera terminals PR1110A to PR1110C and the operation terminals 1111L and 1111R. The camera terminals PR1110A to PR1110C communicate the information on the positions and the spatial resolutions of the detection areas of the cameras PR1101 in the camera terminals PR via the network 1112. On the other hand, the operation terminals 1111L and 1111R communicate the target detection area to the camera terminals PR1110A to PR1110C via the network 1112.

The operation terminals 1111L and 1111R, and the network 1112 are respectively similar to the operation terminals 111L and 111R, and the network 112 in FIG. 8 in the first embodiment of the present invention. This second embodiment differs from the first embodiment in that each camera PR1101 can adjust not only the position of the detection area but also the spatial resolution of the detection area, and, accompanied by this, the adjustment unit 1102 and the communication unit 1103 handle not only the information on the position of the detection area but also the information on the spatial resolution of the detection area. Note that a spatial resolution is concerning the space of the image taken by a camera, and it corresponds to the value obtained by dividing the size of a detection area using the number of imaging devices. This spatial resolution adjustment mainly by the zoom control of a camera, and this becomes high as the size of the detection area becomes small (a high spatial resolution indicates a state where a detailed image can be obtained).

The followings are the same as the ones in the first embodiment of the present invention shown in FIG. 8: an $X_W$ axis 1120; a $Z_W$ axis 1122; a real space surface 1125; a target detection area 1130; $X_{TL}$ and $X_{TR}$ indicating the position of the target detection area 1130; an non-detection part 1131; a detection area 1140A; $X_{AL}$ and $X_{AR}$ indicating the position of the detection area 1140A; a detection area 1140B; $X_{BL}$ and $X_{BR}$ indicating the position of the detection area 1140B; a detection area 1140C; $X_{CL}$ and $X_{CR}$ indicating the position of the detection area 1140C; an overlap area 1141TA; the value obtained from expression: $X_{TL}-X_{AL}$ that is the amount indicating the size of the overlap area 1141TA; an overlap area 1141AB; the value obtained from expression: $X_{AR}-X_{BL}$ that is the amount indicating the size of the overlap area 1141AB; an overlap area 1141BC; the value obtained from expression: $X_{BR}-X_{CL}$ that is the amount indicating the size of the overlap area 1141BC; an overlap area 1141CT; the value obtained from expression: $X_{CR}-X_{TR}$ that is the amount indicating the size of the overlap area 1141CT. $R_A$ shows the spatial resolution of the detection area of the camera terminal PR1110A, $R_B$ shows the spatial resolution of the detection area of the camera terminal PR1110B, and $R_C$ shows the spatial resolution of the detection area of the camera terminal PR110C.

Figure 19A:
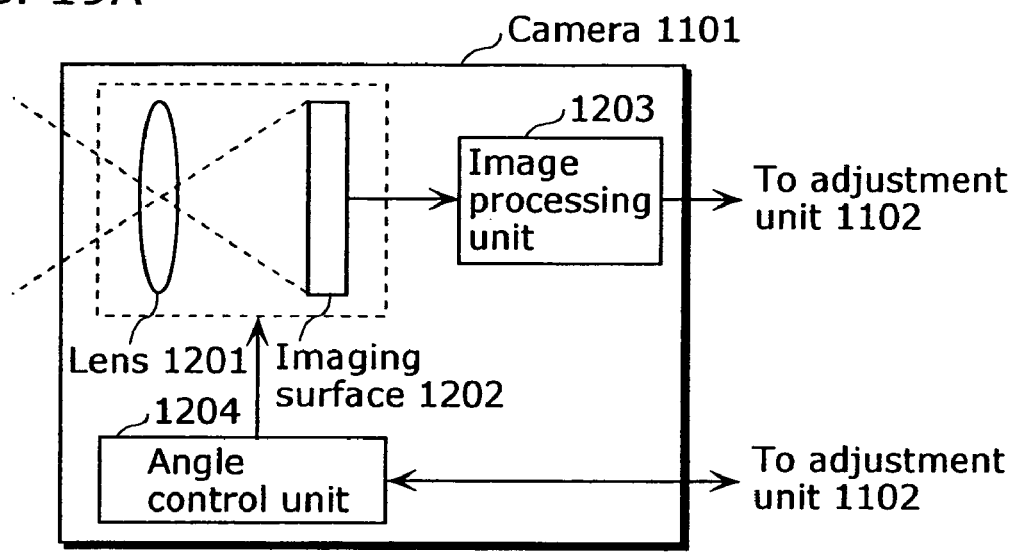
FIGS. 19A and 19B are block diagrams of a camera PR.

FIG. 19A is a diagram showing the internal structure of the camera PR1101. The camera PR1101 includes a lens 1201, an imaging surface 1202, an image processing unit 1203 and an angle control unit 1204. The lens 1201 is the lens for forming images, the imaging surface 1202 is a device such as a CCD that takes an image formed on the lens 1201, the image processing unit 1203 is the processing unit for processing the taken image on the imaging surface 1202, and the angle control unit 1204 is the processing unit for controlling the angles of the lens 1201 and the imaging surface 1202 and the interval between the lens 1201 and the imaging surface 1202.

Figure 19B:
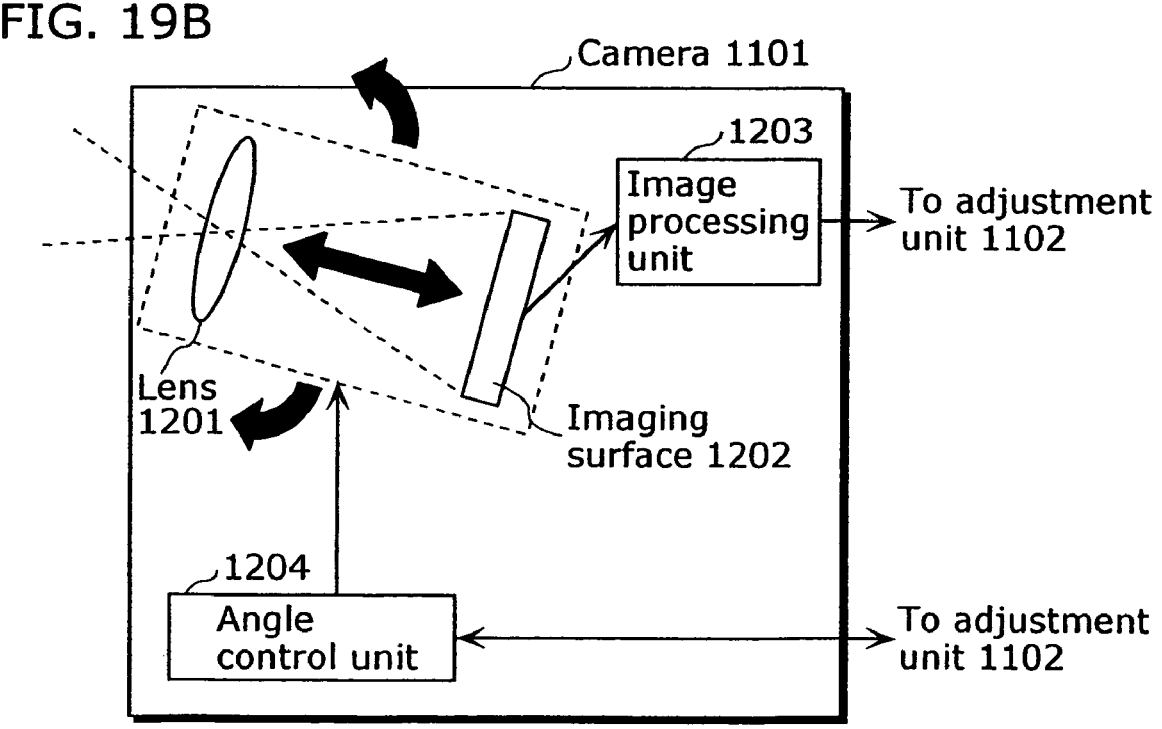

The lens 1201, the imaging surface 1202 and the image processing unit 1203 are similar to the lens 201, the imaging surface 202 and the image processing unit 203 of FIG. 10A respectively in the first embodiment of the present invention. This second embodiment shown in FIG. 19A differs from the first embodiment in that the angle control unit 1204 controls not one of (i) the angles of the lens 1201 and the imaging surface 1202 and (ii) the interval between the lens 1201 and the imaging surface 1202 but both of (i) and (ii) at the same time. The angle control unit 1204 controls the angles of the lens 1201 and the imaging surface 1202 and the interval between the lens 1201 and the imaging surface 1202. The former control is generally called pan or tilt, and the latter control is generally called zoom at the same time as shown in FIG. 19B.

The operations of the detection area adjustment apparatus in the second embodiment of the present invention will be described below with reference to FIG. 18. In the camera terminals PR1110A to PR1110C, the camera PR1101 determines its imaging range, as its detection area, based on the angles of the lens 1201 and the imaging surface 1202 on the real space surface and respective intervals, and it performs an operation of detecting a target detection object or an operation of extracting information. The information on the detected target detection object is sent to the adjustment unit 1102 in FIG. 18. Further, in the camera PR1101, the angle control unit 1204 shown in FIG. 19A adjusts the position of the detection area of the camera PR1101 to the position of the detection area indicated by the adjustment unit 1102 in FIG. 18 by controlling the angles of the lens 1201 and the imaging surface 1202, and the interval between the lens 1201 and the imaging surface 1202. Also, the angle control unit 1204 sends, to the adjustment unit 1102, the information on the position of the detection area of the current camera PR1101 that is determined based on the angles of the current lens 1201 and the imaging surface 1202 and the interval between the lens 1201 and the imaging surface 1202.

Operations described up to this point are similar to the operations of the camera terminals P110A to P110C in the first embodiment of the present invention. In the second embodiment of the present invention, the angle control unit 1204 further adjusts the spatial resolution of the detection area of the camera PR1101 to the spatial resolution of the detection area specified by the adjustment unit 1102 in FIG. 18 by controlling the interval between the lens 101 and the imaging surface. Also, the angle control unit 1204 sends the spatial resolution of the detection area of the current camera PR1101 determined based on the interval between the current lens 1201 and the imaging surface 1202 to the adjustment unit 1102.

In this second embodiment, likewise the first embodiment of the present invention, the position of the detection area of the camera PR1101 is controlled by the adjustment unit 1102, the information on the position of the detection area of the current camera PR1101 is sent to the adjustment unit 1102. Additionally, in this second embodiment of the present invention, the spatial resolution of the detection area of the camera PR1101 is controlled by the adjustment unit 1102 and the information on the spatial resolution on the detection area of the current camera PR1101 is sent to the adjustment unit 1102.

The adjustment unit 1102 periodically sends the information on the position and the spatial resolution of the detection area of the camera PR1101 sent from the camera PR1101 to the adjustment unit 1102 via the communication unit 1103 and the network 1112. Also, the adjustment unit 1102 receives the information on the positions and the spatial resolutions of the detection areas of the cameras PR1101 in the other camera terminals PR that are periodically sent from the adjustment units 1102 in the other camera terminals PR. Further, in the operation terminals 1111L and 1111R, the communication units 1103 periodically send the information on the position of the target detection area 1130 to the adjustment units 1102 in the camera terminals PR1110A to PR1110C through the network 1112.

The operations that the adjustment units 1102 and the communication units 1103 in the camera terminals PR1110A to PR1110C and the operation terminals 1111L and 1111R communicate the information on the positions of the detection areas have been described up to this point as the first embodiment of the present invention. Additionally, in the second embodiment of the present invention, the adjustment units 1102 and the communication units 1103 in the camera terminals PR1110A to PR1110C communicate the spatial resolutions of the detection areas.

Therefore, the adjustment units 1102 in the camera terminals PR1110A to PR1110C periodically obtain the information on the positions and the spatial resolutions of the detection areas of the cameras PR1101 in the current camera terminal P and the other camera terminals P and the information on the position of the target detection area. Likewise the first embodiment of the present invention, the adjustment units 1102 periodically obtain $X_{AL}$ and $X_{AR}$ indicating the position of the detection area 1140A of the camera terminal PR1110A, $X_{BL}$ and $X_{BR}$ indicating the position of the detection area 1140B of the camera terminal PR110B, $X_{CL}$ and $X_{CR}$ indicating the position of the detection area 1140C of the camera terminal PR1110C and $X_{TL}$ and $X_{TR}$ indicating the position of the target detection area 1130 via the communication units 1103 and the network 1112. In the second embodiment of the present invention, the adjustment units 1102 further periodically obtain $R_A$ that is the spatial resolution of the detection area 1140A of the camera terminal PR1110A, $R_B$ that is the spatial resolution of the detection area 1140B of the camera terminal PR110B, $R_C$ that is the spatial resolution of the detection area 1140C of the camera terminal PR1110 via the communication units 1103 and the network 1112.

Figure 20:
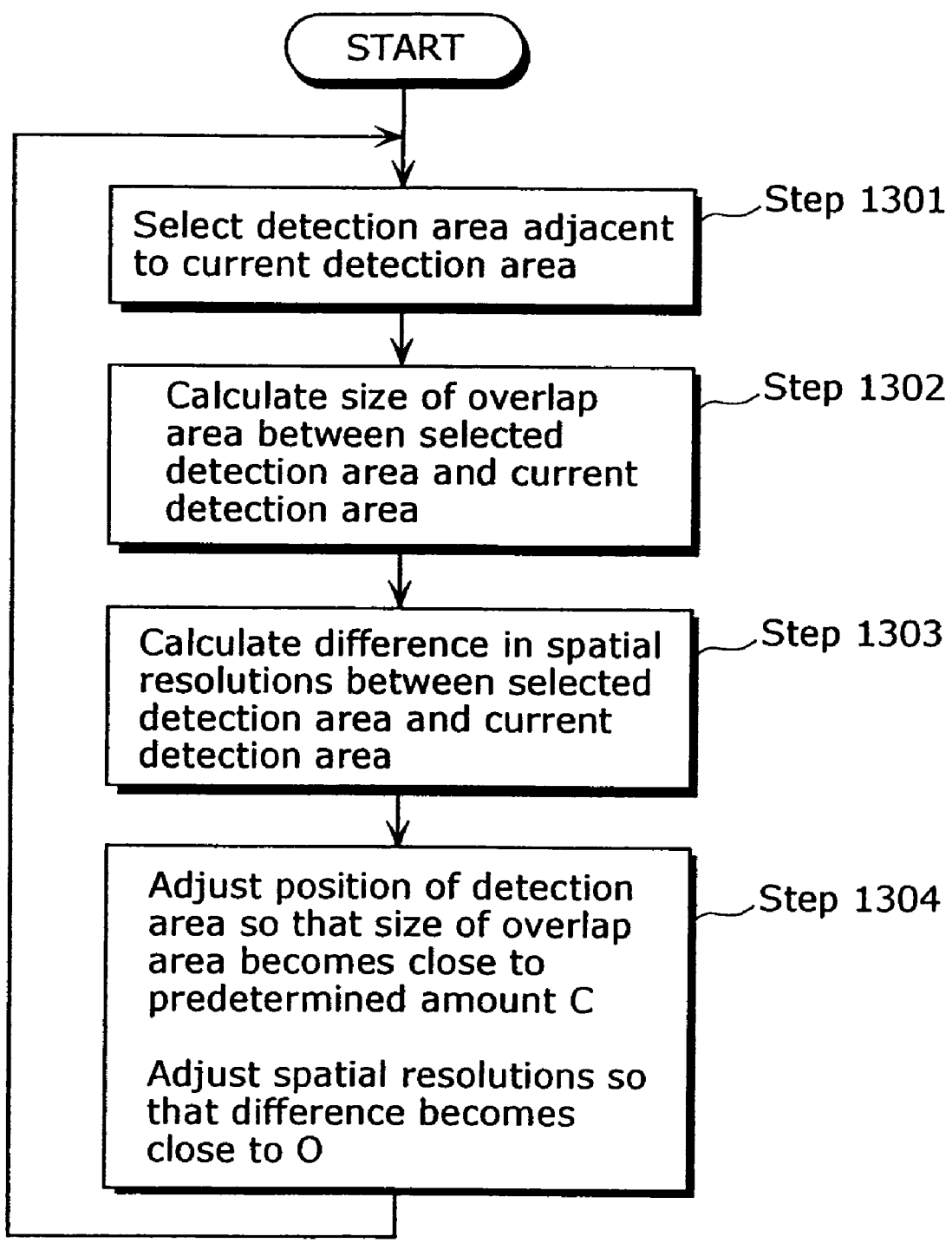
FIG. 20 is a flow chart of the processing performed by the adjustment unit.

Further, the adjustment units 1102 perform the processing of the following step shown in FIG. 20 based on the information on the positions and the spatial resolutions of the obtained detection areas and the information on the position of the target detection area.

First, the adjustment units 1102 select the detection areas of the other camera terminals PR that are adjacent to the detection area of the current camera terminal PR or non-detection part based on the information indicating the positions of the detection areas of the cameras PR1101 in the current camera terminal PR and the other camera terminals PR (Step 1301). This processing is similar to the first embodiment of the present invention.

Next, the adjustment units 1102 calculate the amount indicating the size of the overlap areas of the detection areas selected in Step 1301 and the detection area of the current camera terminal P (Step 1302). This processing is similar to the processing in the first embodiment of the present invention.

Next, the adjustment units 1102 calculate the amount indicating the difference between the spatial resolution of the detection area selected in Step 1301 and the spatial resolution of the detection area of the current camera terminal P (Step 1303). Values obtained in this way will be described below: the value obtained from expression: $R_A - R_B$ indicating the difference in the spatial resolutions in its detection area 1140A and its adjacent detection area 1140B in the camera terminal PR1110A; $R_B - R_A$ indicating the difference in the spatial resolutions in its detection area 1140B and its adjacent detection area 1140A in the camera terminal PR1110B; $R_B - R_C$ indicating the difference in the spatial resolutions in its detection area 1140B and its adjacent detection area 1140C in the camera terminal PR110B; and $R_C - R_B$ indicating the difference in the spatial resolutions in its detection area 1140C and its adjacent detection area 1140B in the camera terminal PR110C.

Next, the adjustment units 1102 adjust the position of the detection areas of the current camera terminal PR so that the amount indicating the size of the overlap areas calculated in Step 1303 becomes close to the certain amount C (Step 1304). This processing is similar to the processing in the first embodiment of the present invention. In the second embodiment of the present invention, each adjustment unit 1102 further adjusts the spatial resolution of the detection area of the current camera terminal PR so that the amounts indicating the differences in the spatial resolutions of the detection areas calculated in Step 1303 become close to 0. This adjustment method will be described below.

First, the function UR( ) is determined as each amount indicating the difference in the spatial resolutions of the detection areas. In this second embodiment, the values obtained from the following expressions 13 to 15 respectively are determined as such function UR( ).

$$UR_{AR}(R_A) = (R_A - R_B)^2 \quad \text{[Expression 13]}$$

$$UR_{BL}(R_B)(R_B - R_A)^2 UR_{BR}(R_B) = (R_B - R_C)^2 \quad \text{[Expression 14]}$$

$$UR_{CL}(R_C) = (R_C - R_B)^2 \quad \text{[Expression 15]}$$

The above-mentioned expressions 13 to 15 correspond to the camera terminals PR1110A to PR1110C respectively, the square values of the amounts indicating the differences in the spatial resolutions of the detection areas are determined as the amounts indicating the respective differences. Next, as shown in the following expressions 16 to 18, the spatial resolution of the next detection area of the current camera terminal PR is calculated using the expression of the well-known steepest descent method.

$$R'_A = R_A - \alpha \frac{\partial UR_{AL}(R_A)}{\partial R_A} \quad \text{[Expression 16]}$$

$$R'_B = R_B - \alpha \frac{\partial (UR_{BL}(R_B) + UR_{BR}(R_B))}{\partial R_B} \quad \text{[Expression 17]}$$

$$R'_C = R_C - \alpha \frac{\partial UR_{CR}(R_C)}{\partial R_C} \quad \text{[Expression 18]}$$

In the above expressions 16 to 18, R'A, R'B and R'C respectively show the next spatial resolutions of the detection areas of the camera terminals PR1110A to PR1110C, and α is a constant. Lastly, the spatial resolutions of the detection areas of the cameras PR1101 are adjusted to the next spatial resolutions of the detection areas.

The adjustment units 1102 perform the processing of Steps 1301, 1302, 1303 and 1304 in sequence, and return to the processing of Step 1301 after completing the processing of Step 1304. After that, the adjustment units 1102 adjust the positions of the detection areas of the cameras PR1101 by repeating the processing of Steps 1301 to 1304 continuously.

The operations of the detection area adjustment apparatus in the second embodiment of the present invention are like described above. Since the operations in the second embodiment of the present invention fully include the operations in the first embodiment of the present invention, it is obvious that such operations have the same effect as the operations shown in the first embodiment of the present invention. Further, in the second embodiment of the present invention, the next spatial resolution of the next detection area of the current camera terminal PR is calculated using the expression of the steepest descent method so that the amount indicating the difference in the spatial resolutions of the detection areas becomes close to 0 and the spatial resolutions of the detection areas of the cameras PR1101 are adjusted to the next spatial resolutions of the detection areas in Step 1303. Therefore, these spatial resolutions of the detection areas of the camera terminals PR1110A to PR1110C are to become substantially the same by repeating the processing of Steps 1301 to 1304. In this way, with the detection area adjustment apparatus of the present invention, it becomes possible to obtain respective images that have substantially the same spatial resolutions and that are taken by the cameras PR1101 in the camera terminals PR1110A to PR1110C. Also, that the spatial resolutions of the detection areas of the camera terminals PR1110A to PR1110C are substantially the same means that the numbers of devices of the imaging surfaces 1202 of the camera terminals PR1110A to PR1110C are also substantially the same in this embodiment, and also means the sizes of the detection areas to be detected by the camera terminals PR1110A to PR1110C are substantially the same.

Also, there produced an effect that the adjustment units 1102 can obtain the respective cameras' images whose spatial resolutions are substantially the same by repeating the processing of Steps 1301 to 1304. The processing of Steps 1302 and 1304 is repeatedly performed on the detection areas of the other cameras PR that are adjacent to the detection area of the current camera terminal PR selected in Step 1301.

Therefore, there produced the effect that it becomes possible to obtain the respective cameras' images whose spatial resolutions are substantially the same in response to adjustment even in the case where there is adjustment at respective time in the spatial resolutions of the detection areas of the other cameras PR that are adjacent to the detection area of the current camera terminal PR. The cases where there is adjustment in the spatial resolutions of the detection areas are as follows:

(1) the spatial resolution of the detection area of the camera terminal PR is adjusted;
(2) a camera terminal PR is newly set; and
(3) several camera terminals PR among all camera terminals PR are removed or broken.

The operations of the present invention in response to the adjustment will be described later in detail in supplementary explanations 3 and 4. In brief, the adjustment leads to adjustment in the information on the spatial resolutions of detection areas sent by the respective camera terminals PR. Also, even in the case where the information on the spatial resolutions of the detection areas are not sent or new information on the spatial resolutions of the detection areas are sent, the detection area adjustment apparatus of the present invention can obtain respective cameras' images whose spatial resolutions are substantially the same in response to the adjustment in the spatial resolutions of the detection areas.

Note that, in this second embodiment, as shown in the above-mentioned expressions 13 to 15, each function UR( ) indicating the difference in the spatial resolutions of the detection areas is determined as the square value of the difference in the spatial resolutions of the detection areas. However, likewise the first embodiment of the present invention, a similar effect can be obtained also in the case of employing, as the function UR( ), any of (i) an even power value such as a four power, a six power, and a ten power of the difference in the spatial resolutions of the detection areas and (ii) an absolute value of the difference in the spatial resolutions of the detection areas. This is because the function UR( ) becomes the smallest value when 0 is obtained from expression: $R_A - R_B$, which enables the amount indicating the difference in the spatial resolutions of the detection areas to become close to 0 as the effect of the steepest descent method performed in Step 1304.

Also, likewise the first embodiment of the present invention, even in the case where the function UR( ) indicating the difference in the spatial resolutions of the detection areas is the function UR( ) having not the smallest value but the minimum value when 0 is obtained from expression: $R_A - R_B$, a similar effect can be obtained as long as the function UP( ) is the smallest value when 0 is obtained from expression: $R_A - R_B$ in the adjustable range of $R_A - R_B$.

Also, in the second embodiment, as shown in FIG. 18, the adjustment units 1102 are included in the respective camera terminals P1110A to P1110C in a decentralized way. However, also in the case of the detection area adjustment apparatus which has a single adjustment unit 1102 shown in the block diagram of FIG. 15, a similar effect can be obtained as long as the single adjustment unit 1102 adjusts all the spatial resolutions of the detection areas of the cameras PR1101 of the respective camera terminals PR1110A to PR1110C.

Also, in the second embodiment, the cameras PR1101 are handled as general cameras, but a similar effect may be obtained also in the case of using the cameras PR 101 that detect visible light or invisible light such as infrared rays and ultraviolet rays. In addition, a similar effect may be obtained also in the case of using general sensors that have detection areas and whose spatial resolutions of the detection areas are adjustable.

Also, in the second embodiment of the present invention, the network 1112 is handled as the network circuit used in general communication. However, a similar effect may be obtained even in the case where the network 1112 is a wired or a wireless network.

Also, in the second embodiment of the present invention, the respective camera terminals perform the adjustment for making the spatial resolution of its detection area and the spatial resolutions of the detection areas of the other camera terminals by communicating with the other camera terminals whose detection areas are adjacent to each other. However, the present invention is not limited to this method. In other words, each camera terminal may fix the spatial resolution of its detection area so that the spatial resolution can be the highest spatial resolution without communicating with the other camera terminals. In this way, consequently, each set of adjacent detection areas shares an overlap area, and all of the detection areas have the highest spatial resolution. Therefore, with the detection area adjustment apparatus of this embodiment, it becomes possible to take images, in the entire target detection area, of the highest spatial resolution (a high spatial resolution indicates a state where a detailed image can be obtained).

Next, supplementary explanation of the first and second embodiments will be made below and examples of the present invention will be detailed in the explanation.

(Supplementary Explanation 1)

In this supplementary explanation, the calculation method of the detection areas of the camera P101 and the camera PR1101 that has been described in the first and second embodiments will be further described below in detail.

Figure 21:
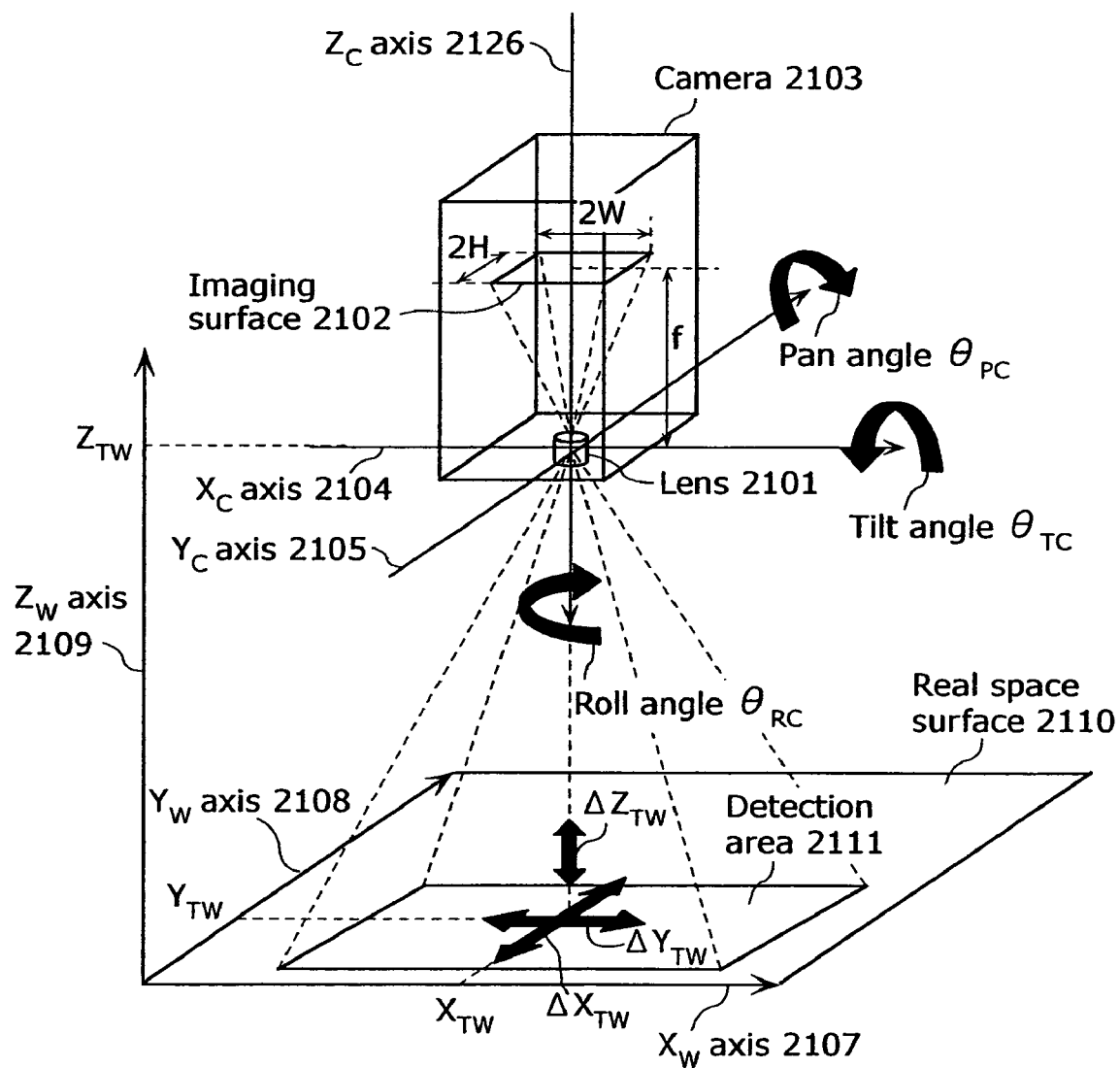
FIG. 21 is an illustration of calculating the position of a detection area in a supplemental explanation 1 of the present invention.

FIG. 21 is an illustration of the adjustable detection areas of the camera P101 and the camera PR1101. In FIG. 21, the lens 2101 corresponds to the lens 201 shown in FIG. 10A and the lens 1201 shown in FIG. 19A, the imaging surface 2102 corresponds to the imaging surface 202 shown in FIG. 10A and the imaging surface 1202 shown in FIG. 19A, and the camera 2103 corresponds to the camera P101 shown in FIG. 10A and the camera PR1201 shown in FIG. 19A. The $X_C$ axis 2104, the $Y_C$ axis 2105 and the $Z_C$ axis 2106 are perpendicular to each other, and form a camera coordinate system whose origin is the lens 2101. The camera 2103 rotates based on the respective axes. The rotation based on the $Y_C$ axis 2105 is pan, the rotation based on the $X_C$ axis 2104 is tilt, and the rotation based on the $Z_C$ axis 2106 is roll. Angles of such rotations are shown as $\Theta_{PC}$, $\Theta_{TC}$ and $\Theta_{RC}$. The imaging surface 2102 is present at the point that is distant from the lens 2101 by f in the direction of $Z_C$ axis, and has a size of 2W×2H. The $X_W$ axis 2107, the $Y_W$ axis 2108 and the $Z_W$ axis 2109 are perpendicular to each other, and form a world coordinate system. The $X_W$ axis 2107 corresponds to the $X_W$ axis 120 shown in FIG. 8 and the $X_W$ axis 1120 shown in FIG. 18. The $Z_W$ axis 2109 corresponds to the $Z_W$ axis 122 shown in FIG. 8 and the $Z_W$ axis 1122 shown in FIG. 18. The camera 2103 is present at the point that is shown using $(X_T, Y_T, Z_T)$ in the world coordinate system, and it moves from the point by the amount that is shown using $(\Delta X_{TW}, \Delta Y_{TW}, \Delta Z_{TW})$.

The point $(X_C, Y_C, Z_C)$ on the camera coordinate axis system composed of the $X_C$ axis 2104, the $Y_C$ axis 2105 and the $Z_C$ axis 2106 can be converted to the point $(X_W, Y_W, Z_W)$ on the world coordinate axis system composed of the $X_W$ axis 2107, the $Y_W$ axis 2108 and the $Z_W$ axis 2109 using the following expression 19:

$$\begin{pmatrix} X_W \\ Y_W \\ Z_W \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_C \\ Y_C \\ Z_C \end{pmatrix} + \begin{pmatrix} X_{TW} \\ Y_{TW} \\ Z_{TW} \end{pmatrix} + \begin{pmatrix} \Delta X_W \\ \Delta Y_W \\ \Delta Z_W \end{pmatrix} \quad \text{[Expression 19]}$$

In the expression 19, the 3×3 matrix whose elements are $M_{00}$ to $M_{22}$ shows the angle bench mark of the camera 2103, the angle bench mark being the matrix of rotation angles $(\Theta_{PC}, \Theta_{TC}, \Theta_{RC})=(0, 0, 0)$ of the camera 2103. The 3×3 matrix whose elements are $R_{00}$ to $R_{22}$ shows the angle variation from the angle bench mark of the camera 2103. Also, $(X_{TW}, Y_{TW}, Z_{TW})$ shows the position bench mark of the camera 2103, the position bench mark being the variation of the position of the camera 2103 that is $(\Delta X_{TW}, \Delta Y_{TW}, \Delta Z_{TW})=(0, 0, 0)$. Further, $(\Delta X_{TW}, \Delta Y_{TW}, \Delta Z_{TW})$ shows the position variation from the position bench mark of the camera 2103.

The 3×3 matrix whose elements are $M_{00}$ to $M_{22}$ or $(X_{TW}, Y_{TW}, Z_{TW})$ can be calculated by adjusting the angle and the position of the current camera 2103 to the angle bench mark and the position bench mark, or by determining the angle and the position of the current camera 2103 as the angle bench mark and the position bench mark respectively and by using the calibration method shown in the following Document 1.

The 3×3 matrix whose elements are $M_{00}$ to $M_{22}$ or $(X_{TW}, Y_{TW}, Z_{TW})$ should be calculated before the detection area adjustment apparatus of the present invention starts operating.

Document 1: R. Tsai. A Versatile Camera Calibration Technique for High-Accuracy 3D Machine Vision Metrology Using Off-the-Shelf TV Cameras and Lenses. IEEE journal of Robotics and Automation, Vol. RA-3, No. 4, pp. 323-344, 1987

The 3×3 matrix whose elements are $R_{00}$ to $R_{22}$ can be calculated from the rotation angles $(\Theta_{PC}, \Theta_{TC}, \Theta_{RC})$ that are the angles of the camera 2103 as shown in the following expression 20.

$$\begin{pmatrix} R_{00} & R_{01} & R_{02} \\ R_{10} & R_{11} & R_{12} \\ R_{20} & R_{21} & R_{22} \end{pmatrix} = \begin{pmatrix} \cos\Theta_{RC} & \sin\Theta_{RC} & 0 \\ -\sin\Theta_{RC} & \cos\Theta_{RC} & 0 \\ 0 & 0 & 0 \end{pmatrix} \quad \text{[Expression 20]}$$

$$\begin{pmatrix} 1 & 0 & 0 \\ 0 & \cos\Theta_{TC} & \sin\Theta_{TC} \\ 0 & -\sin\Theta_{TC} & \cos\Theta_{TC} \end{pmatrix}$$

$$\begin{pmatrix} \cos\Theta_{PC} & 0 & -\sin\Theta_{PC} \\ 0 & 1 & 0 \\ \sin\Theta_{PC} & 0 & \cos\Theta_{PC} \end{pmatrix}$$

Note that the rotation angles $(\Theta_{PC}, \Theta_{TC}, \Theta_{RC})$ are read by the angle control unit 204 shown in FIG. 10A and the angle control unit 1204 shown in FIG. 19A respectively in the first and the second embodiments of the present invention.

Also, $(\Delta X_{TW}, \Delta Y_{TW}, \Delta Z_{TW})$ that are the position variations from the position bench mark of the camera 2103 can be read by a stepper motor on condition that the stepper motor adjusts the position of the camera 2103.

The respective points $(X_{PC}, Y_{PC}, f)$ on the imaging surface 2102 are projected at $Z_W = C$ on the real space surface 2110 using the following expression 21.

$$\begin{pmatrix} X_{PW} \\ Y_{PW} \\ Z_{PW} \end{pmatrix} = \begin{pmatrix} X_O + \frac{(Z_O - Z_C)X_D}{Z_D} \\ Y_O + \frac{(Z_O - Z_C)Y_D}{Z_D} \\ Z_C \end{pmatrix} \quad \text{[Expression 21]}$$

$$\begin{pmatrix} X_O \\ Y_O \\ Z_O \end{pmatrix} = \begin{pmatrix} X_{TW} \\ Y_{TW} \\ Z_{TW} \end{pmatrix} + \begin{pmatrix} \Delta X_W \\ \Delta Y_W \\ \Delta Z_W \end{pmatrix}$$

$$\begin{pmatrix} X_D \\ Y_D \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix}$$

$$\begin{pmatrix} M_{00} & M_{01} & M_{02} \\ M_{10} & M_{11} & M_{12} \\ M_{20} & M_{21} & M_{22} \end{pmatrix} \begin{pmatrix} X_{PC} \\ Y_{PC} \\ f \end{pmatrix}$$

Therefore, the respective points of the four corners on the imaging surfaces (−W, −H, f), (W, −H, f), (−W, H, f), (W, H, f) are projected at $Z_W = C$ on the real space surface 2110 using the following expression 22.

[Expression 22]

$$\begin{pmatrix} X_{PW0} \\ Y_{PW0} \\ Z_{PW0} \end{pmatrix} = \begin{pmatrix} X_O + \dfrac{(Z_O - Z_C)X_{D0}}{Z_{D0}} \\ Y_O + \dfrac{(Z_O - Z_C)Y_{D0}}{Z_{D0}} \\ Z_C \end{pmatrix}$$

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ -H \\ f \end{pmatrix}$$

$$\begin{pmatrix} X_{PW1} \\ Y_{PW1} \\ Z_{PW1} \end{pmatrix} = \begin{pmatrix} X_O + \dfrac{(Z_O - Z_C)X_{D1}}{Z_{D1}} \\ Y_O + \dfrac{(Z_O - Z_C)Y_{D1}}{Z_{D1}} \\ Z_C \end{pmatrix}$$

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ -H \\ f \end{pmatrix}$$

$$\begin{pmatrix} X_{PW2} \\ Y_{PW2} \\ Z_{PW2} \end{pmatrix} = \begin{pmatrix} X_O + \dfrac{(Z_O - Z_C)X_{D2}}{Z_{D2}} \\ Y_O + \dfrac{(Z_O - Z_C)Y_{D2}}{Z_{D2}} \\ Z_C \end{pmatrix}$$

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ H \\ f \end{pmatrix}$$

$$\begin{pmatrix} X_{PW3} \\ Y_{PW3} \\ Z_{PW3} \end{pmatrix} = \begin{pmatrix} X_O + \dfrac{(Z_O - Z_C)X_{D3}}{Z_{D3}} \\ Y_O + \dfrac{(Z_O - Z_C)Y_{D3}}{Z_{D3}} \\ Z_C \end{pmatrix}$$

$$\begin{pmatrix} X_{D3} \\ Y_{D3} \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ H \\ f \end{pmatrix}$$

[Expression 23]

$$\begin{pmatrix} X_{PW0} \\ Y_{PW0} \\ Z_{PW0} \end{pmatrix} = \begin{pmatrix} X_O + \dfrac{Z_O X_{D0}}{Z_{D0}} \\ Y_O + \dfrac{Z_O Y_{D0}}{Z_{D0}} \\ 0 \end{pmatrix}$$

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ -H \\ f \end{pmatrix}$$

$$\begin{pmatrix} X_{PW1} \\ Y_{PW1} \\ Z_{PW1} \end{pmatrix} = \begin{pmatrix} X_O + \dfrac{Z_O X_{D1}}{Z_{D1}} \\ Y_O + \dfrac{Z_O Y_{D1}}{Z_{D1}} \\ 0 \end{pmatrix}$$

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ -H \\ f \end{pmatrix}$$

$$\begin{pmatrix} X_{PW2} \\ Y_{PW2} \\ Z_{PW2} \end{pmatrix} = \begin{pmatrix} X_O + \dfrac{Z_O X_{D2}}{Z_{D2}} \\ Y_O + \dfrac{Z_O Y_{D2}}{Z_{D2}} \\ 0 \end{pmatrix}$$

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ H \\ f \end{pmatrix}$$

$$\begin{pmatrix} X_{PW3} \\ Y_{PW3} \\ Z_{PW3} \end{pmatrix} = \begin{pmatrix} X_O + \dfrac{Z_O X_{D3}}{Z_{D3}} \\ Y_O + \dfrac{Z_O Y_{D3}}{Z_{D3}} \\ 0 \end{pmatrix}$$

$$\begin{pmatrix} X_{D3} \\ Y_{D3} \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ H \\ f \end{pmatrix}$$

The surface that constitutes the four corner points of the imaging surface that is projected at $Z_W=C$ on the real space surface 2110 is the detection area of the camera 2103. Since the real space surface 2110 is especially determined as $Z_W=0$ in the first and the second embodiments of the present invention, the detection area of the camera 2103 can be calculated using the following expression 23.

Figure 22:
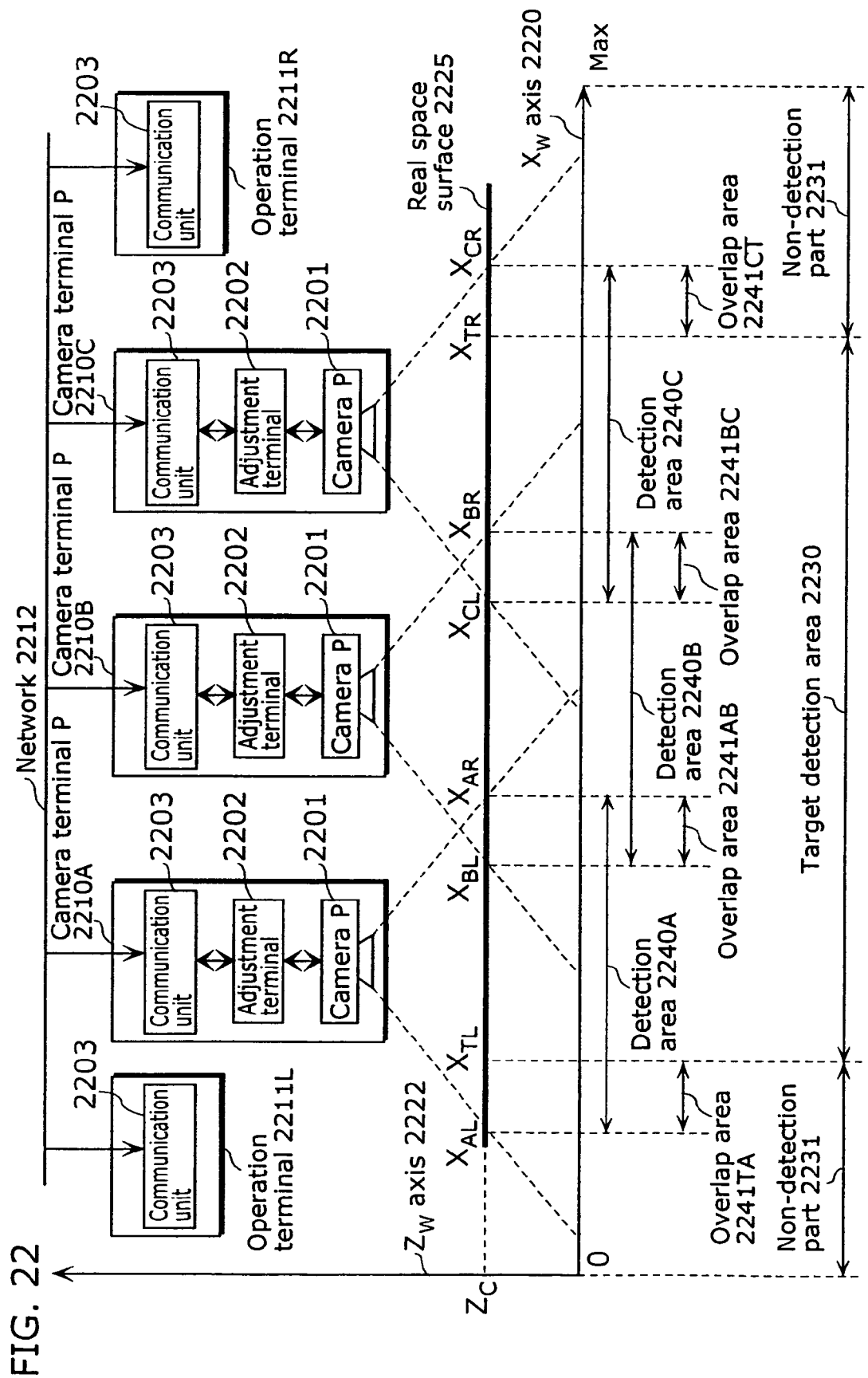
FIG. 22 is a block diagram of the structure of the detection area adjustment apparatus in the supplemental explanation 1 of the present invention.

Note that FIG. 22 is a block diagram of the structure of the detection area adjustment apparatus of the present invention in the case where the real space surface 2210 is determined as $Z_W=C$, likewise in FIG. 8 and FIG. 18. The real space surface 2110 is determined as $Z_W=0$ in the first and second embodiments of the present invention. Even in the case where the real space surface 2110 is determined as $Z_W=C$, the position of the detection area of the camera 2103 can be calculated using the following expression 22. As shown in this FIG. 22, determining the real space surface 2210 as $Z_W=C$ makes it possible to detect the entire target detection area 2230 ranging from $Z_W=0$ to $Z_W=C$ using respective camera terminals P.

The calculation method of the detection areas of the camera P101 and the camera PR1101 have been described up to this point, but other than that, there is a method where the camera P101 and the camera PR1101 use devices such as laser pointers that send detectable signals. This example is shown below.

Figure 23:
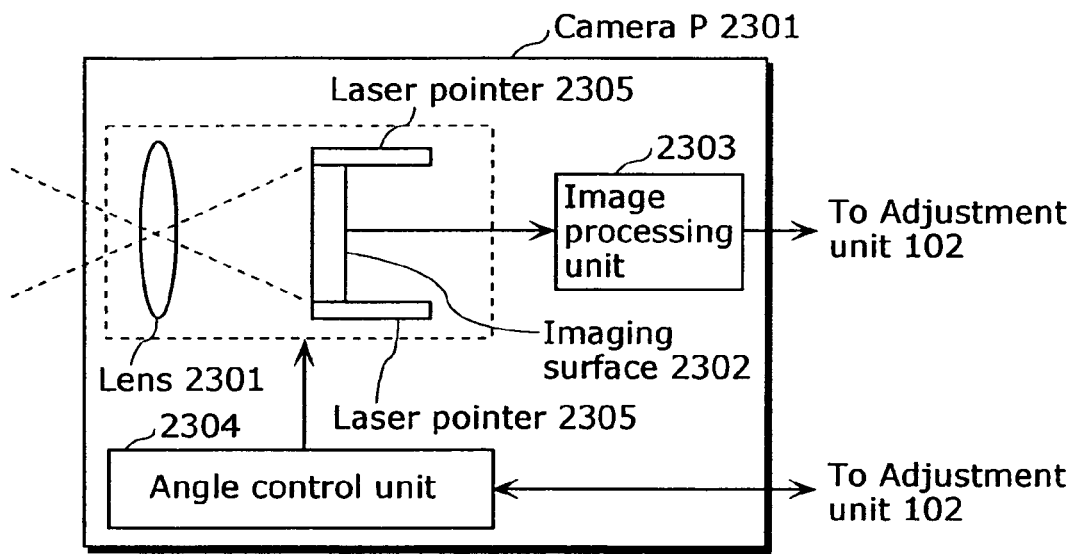
FIG. 23 is a block diagram of the structure of a camera in the supplemental explanation 1 of the present invention.

FIG. 23 is a diagram showing the internal structure of the camera P2301 including a laser pointer. This camera P2301 includes a lens 2301, an imaging surface 2302, an imaging processing unit 2303, an angle control unit 2304 and a laser pointer 2305. The lens 2301 is the lens for forming images. The imaging surface 2302 is a device such as a CCD that takes an image formed on the lens 2301. The imaging processing unit 2303 is the processing unit for processing the image taken on the imaging surface 2302. The angle control unit 2304 is the processing unit for controlling the angles of the lens 2301, the imaging surface 2302 and the laser pointer 2305, and the interval between the lens 2301 and the imaging surface 2302. The laser pointer 2305 makes the angle control unit 2304 adjust these angles working with the lens 2301 and the imaging surface 2302, and projects a laser at edges of the detection area of the camera P2301.

The lens 2301, the imaging surface 2302, the imaging processing unit 2303 are similar to the lens 201, the imaging surface 202 and the imaging processing unit 203 in FIG. 10A in the first embodiment of the present invention. The difference from the first embodiment of the present invention is that the angle control unit 2304 controls angles of not only the lens 2301 and the imaging surface 2302 but also the laser pointer 2305, and the laser pointer 2305 projects a laser at the edges of the detection area of the camera P2301.

In the camera P2301 shown in FIG. 23, the laser pointer 2305 projects a laser to show the edges of the detection area of the camera. The laser is projected on the real space surface 125 shown in FIG. 8 and light spots appear on the surface. The light spots show the edges of the camera P2301. The other cameras, which are adjacent to the camera, take images of such light spots, and extract the positions of the light spots, in the image processing unit 2303, using a general image processing method. The positions of the light spots extracted in the imaging processing unit 2303 are the positions in the camera coordinate axis system, but the positions in the world coordinate axis system can also be calculated using the above-mentioned expression 19 as shown in the supplementary explanation 1. As described up to this point, with the camera P2301 shown in FIG. 23, it is possible to calculate the position of the detection area and communicate the information on the position of the detection area to the other cameras which need the information on the position of the detection area of the current camera P2301 without using the network 112 shown in FIG. 8, the other cameras being adjacent to the current camera.

(Supplementary Explanation 2)

In this supplementary explanation, the method where the detection areas of the other camera terminals P that are adjacent to the detection area of the current camera terminal P or the non-detection part is selected based on the information indicating the positions of the detection areas of the cameras P101 in the current camera terminal P and the other camera terminals P will be further described below in detail.

In the first embodiment of the present invention the case where the detection area is a line has been described as an example. The case where the detection area is a surface or a three-dimensional object will be described below.

Figure 24:
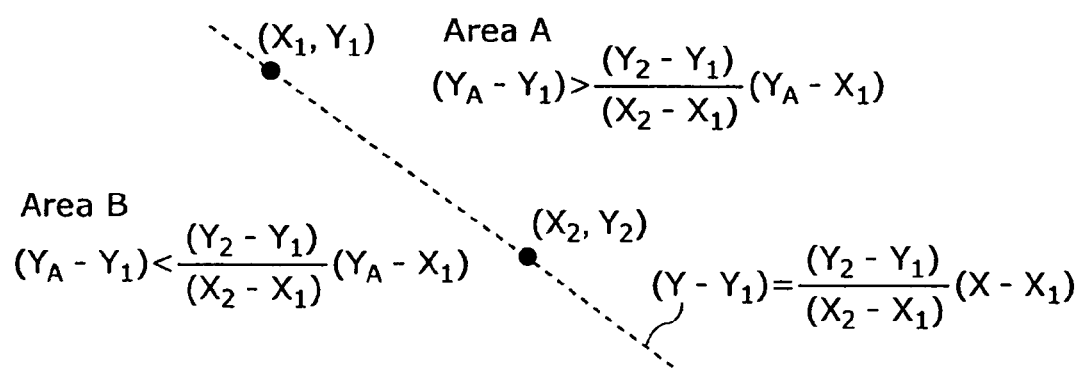
FIG. 24 is a diagram of a judgment method of an area adjacent to the detection area in a supplemental explanation 2 of the present invention.

FIG. 24 is a diagram showing in which side of the line the point $(X_A, Y_A)$ is present, the line passing through the point $(X_1, Y_1)$ and the point $(X_2, Y_2)$. The line that passes through the point $(X_1, Y_1)$ and the point $(X_2, Y_2)$ can be represented using the following expression 24.

$$(Y - Y_1) = \frac{(Y_2 - Y_1)}{(X_2 - X_1)}(X - X_1) \quad \text{[Expression 24]}$$

The following expression 25 shows the relationship in the case where the point $(X_A, Y_A)$ is present in the A side of the line. Likewise, the following expression 26 shows the relationship in the case where the point $(X_A, Y_A)$ is present in the B side of the line.

$$(Y_A - Y_1) > \frac{(Y_2 - Y_1)}{(X_2 - X_1)}(X_A - X_1) \quad \text{[Expression 25]}$$

$$(Y_A - Y_1) < \frac{(Y_2 - Y_1)}{(X_2 - X_1)}(X_A - X_1) \quad \text{[Expression 26]}$$

These relationships enable judging in which side of the line, which passes through the already-known two points, the point to be judged is present. For example, by determining two points that have already been known as the apexes of the detection area of the camera P101 in the current camera terminal P and also by determining the point to be judged as the gravity position of the detection area of the camera P101 in each of the other camera terminals P, it becomes possible to judge where the detection area of the camera P101 in each of the other camera terminals P is present, the position being in A side or B side of the detection area of the current camera terminal P.

Figure 25A:
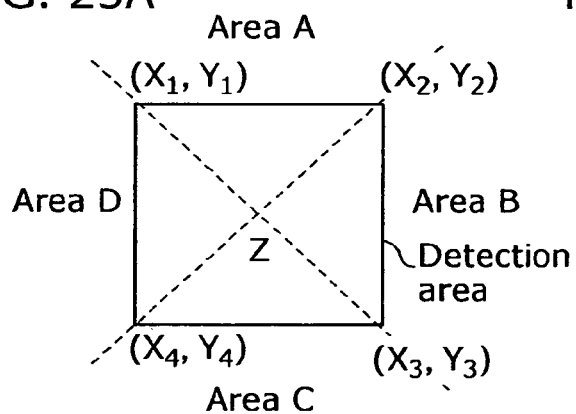
FIG. 25A to 25C are diagrams of a judgment method of the areas adjacent to the detection area in the supplemental explanation 2 of the present invention.
Figure 25B:
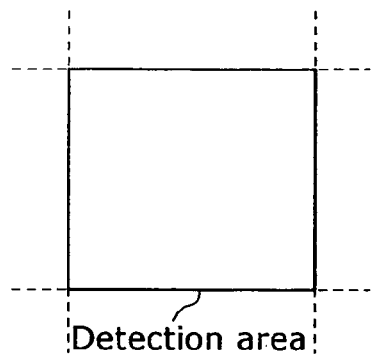
Figure 25C:
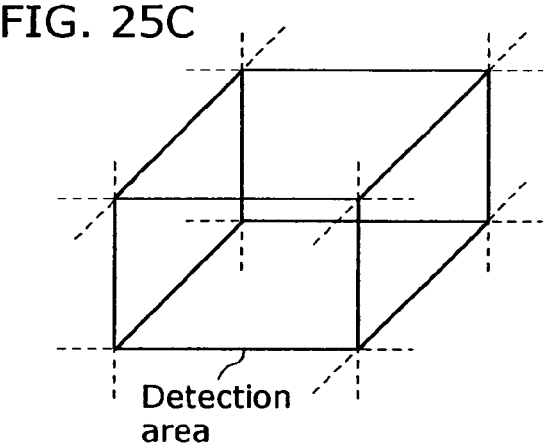

FIG. 25A and FIG. 25B are examples in the case where the detection areas are surfaces respectively. FIG. 25C is an example in the case where the detection area is a three-dimensional object.

In FIG. 25A, the apex $(X_1, Y_1)$ of the detection area of the camera P101 in the current camera terminal P and the line that passes through the apex $(X_3, Y_3)$ are shown by the following expression 27, and the apex $(X_2, Y_2)$ and the line that passes through the apex $(X_4, Y_4)$ are shown by the following expression 28.

$$(Y - Y_1) = \frac{(Y_3 - Y_1)}{(X_3 - X_1)}(X - X_1) \quad \text{[Expression 27]}$$

$$(Y - Y_2) = \frac{(Y_4 - Y_2)}{(X_4 - X_2)}(X - X_2) \quad \text{[Expression 28]}$$

Note that the positions of the respective apexes of the detection area can be calculated using the earlier-mentioned expression 19. Also, the gravity position of the camera P101 in each of the other terminals P can be easily calculated in the case where the apex positions of the detection area of the camera P101 in each of the other camera terminals P are known, and the gravity position is determined as $(X_C, Y_C)$. Based on the above-mentioned relationships, that the gravity position $(X_C, Y_C)$ is present at the A side of the area, in other words, that the detection area of the camera P101 of one of the other camera terminals P is adjacent to the A side of the detection area of the camera P101 in the current camera terminal P enables satisfying the relationships of the following expressions 29 and 31.

Likewise, that the gravity position $(X_C, Y_C)$ is present at the B side of the area, in other words, that the detection area of the camera P101 in one of the other camera terminals P is adjacent to the B side of the detection area of the camera P101 in the current camera terminal P enables satisfying the relationships of the following expressions 29 and 32.

Likewise, that the gravity position $(X_C, Y_C)$ is present at the C side of the area, in other words, that the detection area of the camera P101 of one of the other camera terminals P is adjacent to the C side of the detection area of the camera P101 in the current camera terminal P enables satisfying the relationships of the following expressions 30 and 32.

$$(Y_A - Y_1) > \frac{(Y_3 - Y_1)}{(X_3 - X_1)}(X_A - X_1) \quad \text{[Expression 29]}$$

$$(Y_A - Y_1) < \frac{(Y_3 - Y_1)}{(X_3 - X_1)}(X_A - X_1) \quad \text{[Expression 30]}$$

$$(Y_A - Y_2) > \frac{(Y_4 - Y_2)}{(X_4 - X_2)}(X_A - X_2) \quad \text{[Expression 31]}$$

$$(Y_A - Y_2) < \frac{(Y_4 - Y_2)}{(X_4 - X_2)}(X_A - X_2) \quad \text{[Expression 32]}$$

Likewise, that the gravity position $(X_C, Y_C)$ is present at the D side of the area, in other words, that the detection area of the camera P101 in the other camera terminal P is adjacent to the D side of the detection area of the camera P101 in the current camera terminal P enables satisfying the relationships of the following expressions 30 and 31. In this way, the detection areas of the other camera terminals P that are adjacent to the detection area of the current camera terminal P or the non-detection part can be selected based on the information indicating the positions of the detection areas of the cameras P101 in the current terminal P and the other camera terminals P.

FIG. 25B differs from FIG. 25A in that each line passes through different pairs of apexes. Therefore, with a method that is similar to the method described earlier, it becomes possible to select the detection areas of the other camera terminals P that are adjacent to the detection area of the current camera terminal P or the non-detection part based on the information indicating the positions of the detection areas of the cameras P101 in the current camera terminal P and the other camera terminals P.

Also, FIG. 25C is an example where the detection area is a three-dimensional object. As for this, it is possible to select the detection areas of the other camera terminals P that are adjacent to the detection area of the current camera terminal P or the non-detection part that can be selected based on the information indicating the positions of the detection areas of the cameras P101 in the current camera terminal P and the other camera terminals P.

(Supplementary Explanation 3)

In this supplementary explanation, the operation terminals of the detection area adjustment apparatus of the present invention that have been described in the first and second embodiments of the present invention will be further described below in detail.

In the first and second embodiments of the present invention, the operation terminals 111L and 111R in FIG. 8 and the operation terminals 1111L and 1111R in FIG. 18 have the function for sending the information on the position of the target detection area to the camera terminals P110A to P110C in FIG. 8 and to the camera terminals P1110A to P1110C in FIG. 18 using the communication units 103 or 1103.

Such operation terminals are needed in the case where the operation and the structure of the camera terminal that are described in the first and second embodiments of the present invention are employed, but they are not needed in the case where a target detection area is previously set for the camera terminals.

Also, each operation terminal is composed of a communication unit 103 or 1103, but such communication unit is present also in each camera terminal P or each camera terminal PR. In the case where the communication unit 103 or 1103 that is present in the camera terminal P or the camera terminal PR sends the information on the position of the target detection area, the camera terminal P or the camera terminal PR also has the function of an operation terminal. In this case, no operation terminal is needed in special.

Also, in the first and second embodiments of the present invention, each operation terminal sends each information on the position of the target detection area and a closed area that is constituted at respective edges, but the detection area adjustment apparatus of the present invention can have a similar effect that one operation terminal sends information on all the edge positions of the target detection area even in the case where the closed area that is constituted at the respective positions is determined as a target detection area. Further, in the first and second embodiments of the present invention, two operation terminals send two pieces of information on the edge positions of the target detection area, but in the case where N numbers of edges of the target detection area are present, the N numbers of operation terminals may send N pieces of information on the edge positions respectively.

Also, the information on the position of the target detection area to be sent by each operation terminal has a certain value that is previously set in the first and second embodiments of the present invention. As shown in the first and second embodiments of the present invention, the detection area adjustment apparatus of the present invention can obtain the effect that the entire target detection area is detected in response to adjustment even in the case where the position of the target detection area to be sent from each operation terminal is adjusted. Therefore, the information on the position of the target detection area to be sent by each operation terminal may be the value that adjusts temporally even during the detection area adjustment apparatus of the present invention is operating.

Figure 26:
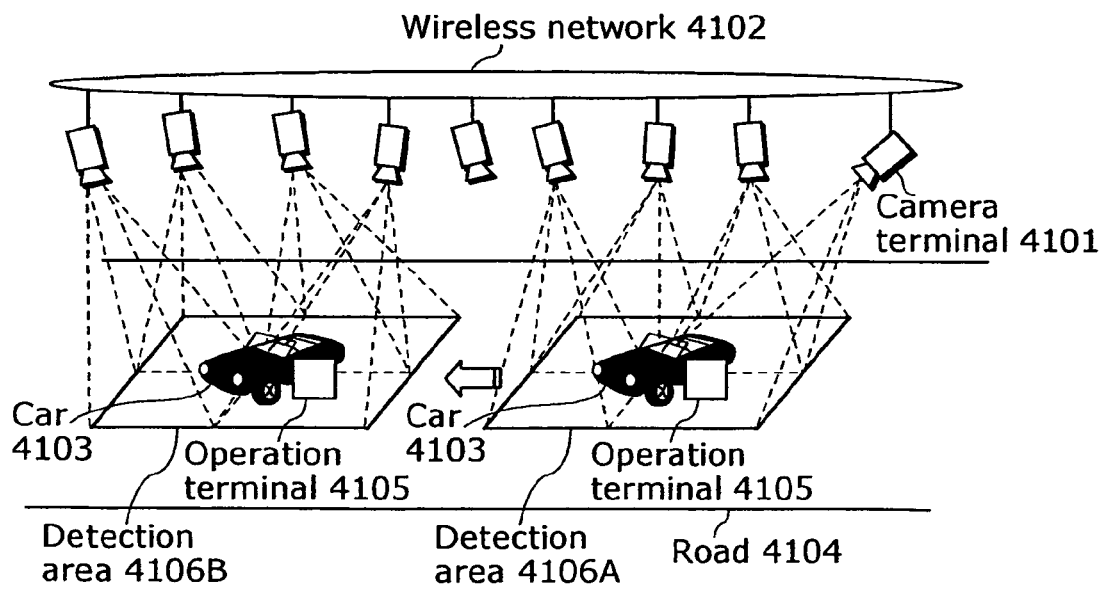
FIG. 26 is an illustration of the detection area adjustment apparatus in a supplemental explanation 3 of the present invention.

The example of the operation, taking into consideration the details of the above-described supplementary information, of the detection area adjustment apparatus of the present invention will be described below with reference to FIG. 26. In FIG. 26, the camera terminal 4101 is the camera terminal P or the camera terminal PR in the first and second embodiments of the present invention, and it communicates the information with the other camera terminals 4101 and the operation terminal 4105 via the wireless network 4102. The car 4103 runs on the road 4104 and equips an operation terminal 4105. The detection areas 4106A and 4106B are the detection areas where the car 4103 that runs on the road 4104 is detected at respective time. The detection areas have a certain size, centering the car position that is obtained using a GPS or a gyrocompass, and it is sent from the operation terminal 4105.

The operation of this detection area adjustment apparatus will be described below. The camera terminals 4101 of the detection area adjustment apparatus of the present invention are set on the road 4104, and communicate with each other via the wireless network 4102. The operation terminal 4105 set in the car 4103 that runs on the road 4104 sends the information on the position of the detection area, centering the present position of the car 4103 to each camera terminal 4101 via the wireless network 4102. In this way, this detection area adjustment apparatus can always take images in the entire detection area, centering the position of the car 4103 that temporally adjusts from one minute to the next. The image information always taken without producing any dead area is provided to the driver of the car 4103 via the wireless network 4102. This enables the driver of the car 4103 to obtain the information on the area around the car without producing any dead area, which can be a help for a driver to run and park the car safely.

(Supplementary Explanation 4)

In this supplementary explanation, the specification methods of the detection areas of the camera terminal P and the camera terminal PR of the detection area adjustment apparatus of the present invention that has been described in the first and second embodiments of the present invention will be further described below in detail.

In the first and second embodiments of the present invention, the camera terminals P110A to P110C in FIG. 8 and the camera terminals P1110A to P1110C in FIG. 18 perform the operations based on the procedure of the flow charts shown in FIG. 11 and FIG. 20. In this supplementary explanation, the camera terminal P performs the operation based on the flow chart shown in FIG. 27, and the camera terminal PR performs the operation based on the flow chart shown in FIG. 28.

Figure 27:
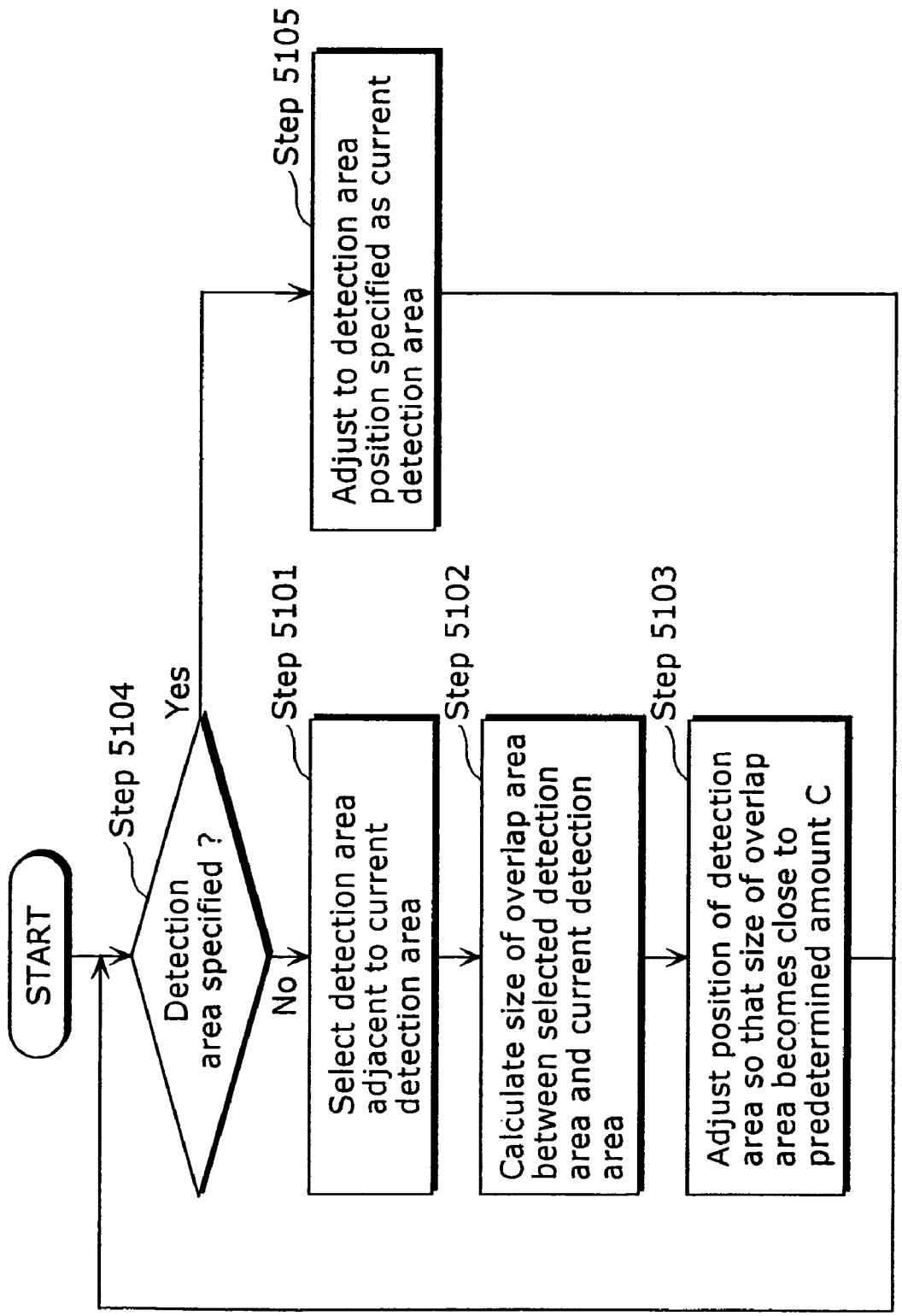
FIG. 27 is a flow chart of the processing performed by an adjustment unit in a supplemental explanation 4 of the present invention.
Figure 28:
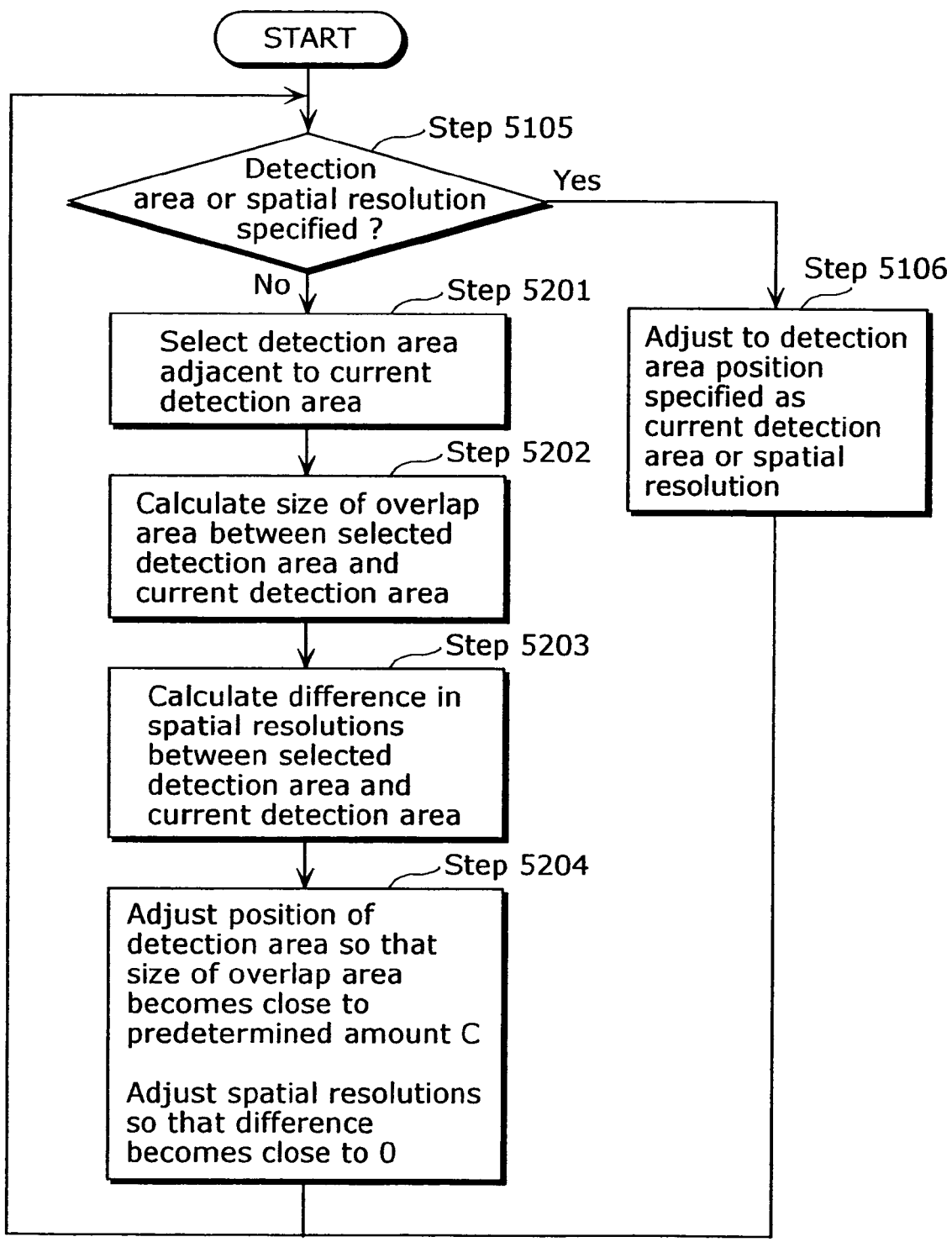
FIG. 28 is a flow chart of the processing performed by an adjustment unit in the supplemental explanation 4 of the present invention.

The flow chart shown in FIG. 27 is obtained by adding Steps 5104 and 5105 to the flow chart shown in FIG. 11 that has been described in the first embodiment of the present invention. In the case where the judgment is No in Step 5104, in other words, in the case where the detection area is not specified, the processing from Steps 5101 to 5103 that are the same as the ones in the first embodiment of the present invention are repeated. Therefore, the effect of the detection area adjustment apparatus of the present invention can be obtained. The flow chart shown in FIG. 28 is obtained by adding Steps 5205 and 5206 to the flow chart shown in FIG. 20 that has been described in the second embodiment of the present invention. In the case where the judgment is No in Step 5205, in other words, in the case where the detection area or the spatial resolution is not specified, the processing from Steps 5201 to 5204 are repeated, the steps being the same as the ones in the second embodiment of the present invention. Therefore, the effect of the detection area adjustment apparatus of the present invention can be obtained.

In the flow charts shown in FIG. 27 and FIG. 28, in the case where the judgment in Step 5104 or 5205 is Yes, in other words, the detection area is specified, in Step 5105 or 5206, the position of the detection area of the camera terminal P or the camera PR, or the spatial resolution of the detection area is adjusted to the position or the spatial resolution of the detection area that is specified in Step 5104 or 5205.

The position and the spatial resolution of the detection area are specified by someone in Steps 5104 and 5205. Otherwise, the position and the size of the target detection object are detected from the images taken by the camera terminal P and the camera terminal PR using a general image processing method in the image processing unit 203 in FIG. 10A and the image processing unit 1203 in FIG. 19A. After that, the position and the spatial resolution of the detection area are specified, centering the position of the detected target and including the target detection object 5303 in the detection area.

In this way, the camera terminal P and the camera terminal PR perform such operations based on the flow charts shown in FIG. 27 and FIG. 28. In the case where there are specifications of the detection area positions or the spatial resolutions of the detection areas of the camera terminal P and the camera terminal PR, the positions or the spatial resolutions of the detection areas are adjusted according to the specifications. On the other hand, in the case where there are neither specifications of the detection area positions nor specifications of the spatial resolutions of the detection areas of the camera terminal P and the camera terminal PR, the camera terminal P and the camera terminal PR perform the operations for detecting the entire target detection area likewise the first and second embodiments of the present invention.

In this supplementary explanation, the specification method of the detection areas of the camera terminal P and the camera terminal PR has been further described up to this point. The things described in this supplementary explanation is added to the operation example of the detection area adjustment apparatus of the present invention, and the operation example will be described with reference to FIG. 29 to FIG. 31.

Figure 29:
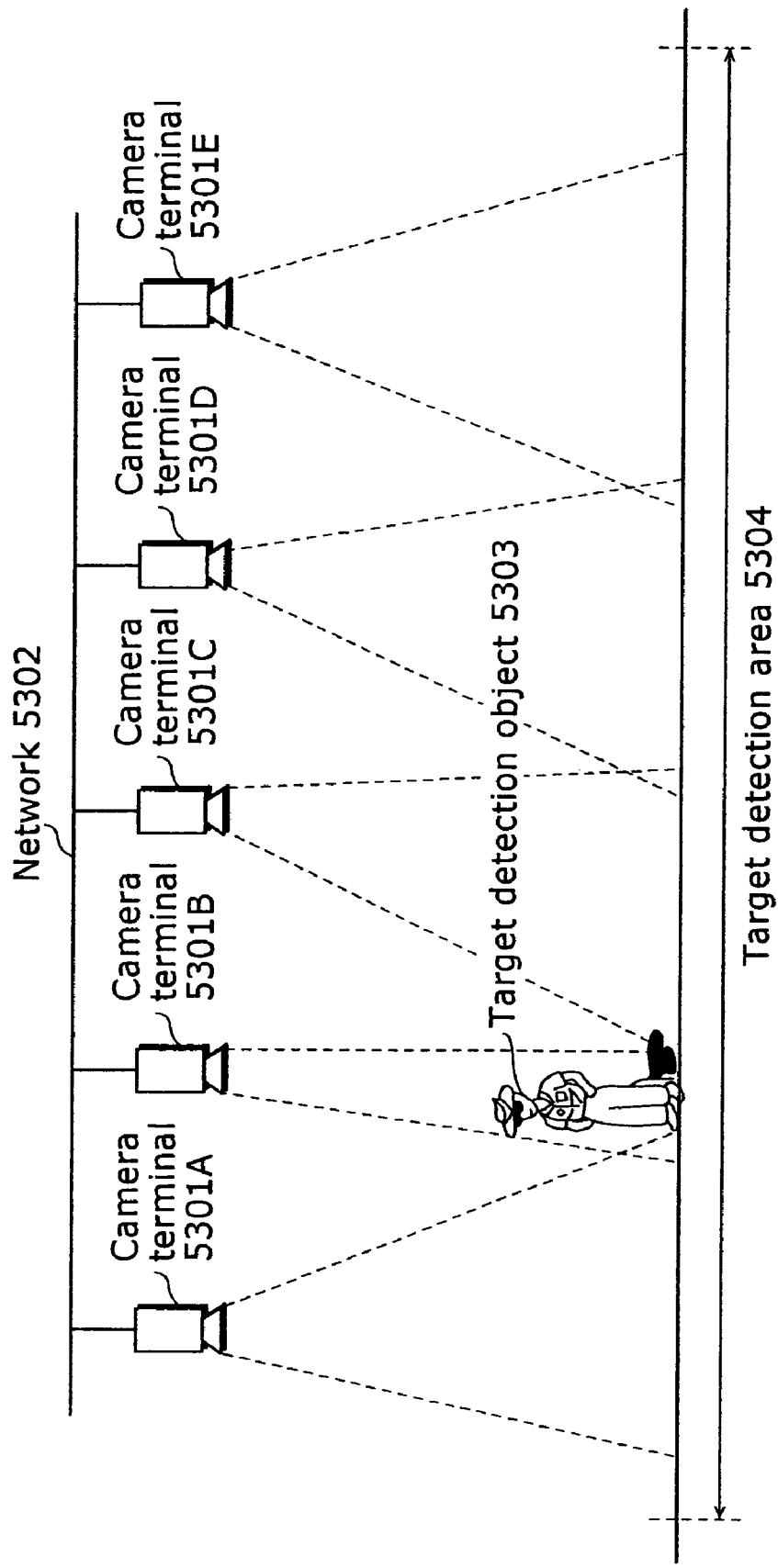
FIG. 29 is an illustration of the detection area adjustment apparatus in the supplemental explanation 4 of the present invention.

In FIG. 29, the camera terminal 5301A to the camera terminal 5301E are the camera terminal P or the camera terminal PR in the first and second embodiments of the present invention, and they operate based on the flow charts shown in FIG. 27 and FIG. 28. The network 5302 communicates the information between the camera terminals 5301A to 5301E. The target detection object 5303 is detected by the camera terminals 5301A to 5301E and is present in the target detection area 5304.

The operation will be described below. The camera terminals 5301A to 5301E operate based on the flow charts shown in FIG. 27 and FIG. 28. More specifically, since the camera terminal 5301B differs from the other camera terminals in that it detects the target detection object 5303, the detection area position or the spatial resolution of the detection area are specified in Steps 5104 and 5205. The position and the spatial resolution of the detection area are specified, centering the position of the detected target object 5303 and including the target detection object 5303 in the detection area. As a result, the position and the spatial resolution of the detection area of the camera terminal 5301B are adjusted, centering the position of the target detection object 5303 and including the target detection object 5303 in the detection area.

On the other hand, since the other camera terminals 5301A, 5301C, 5301D and 5301E do not detect a target detection object 5303, the positions of the detection areas are adjusted so that these camera terminals have the same sizes of overlap areas respectively as the adjacent detection areas do, likewise the first and second embodiments of the present invention.

With the operations of the camera terminals 5301A to 5301E like described above, also in the case where the target detection object 5303 is present in the target detection area 5304, a detailed image is automatically obtained, centering the target detection object 5303 and including the target detection object 5303 in the detection area, and the entire target detection area 5304 is always detected. As the target detection object 5303 moves, the camera terminal that detects the target detection object 5303 is changed to the next camera terminal. Each of the camera terminals performs a similar operation.

Figure 30:
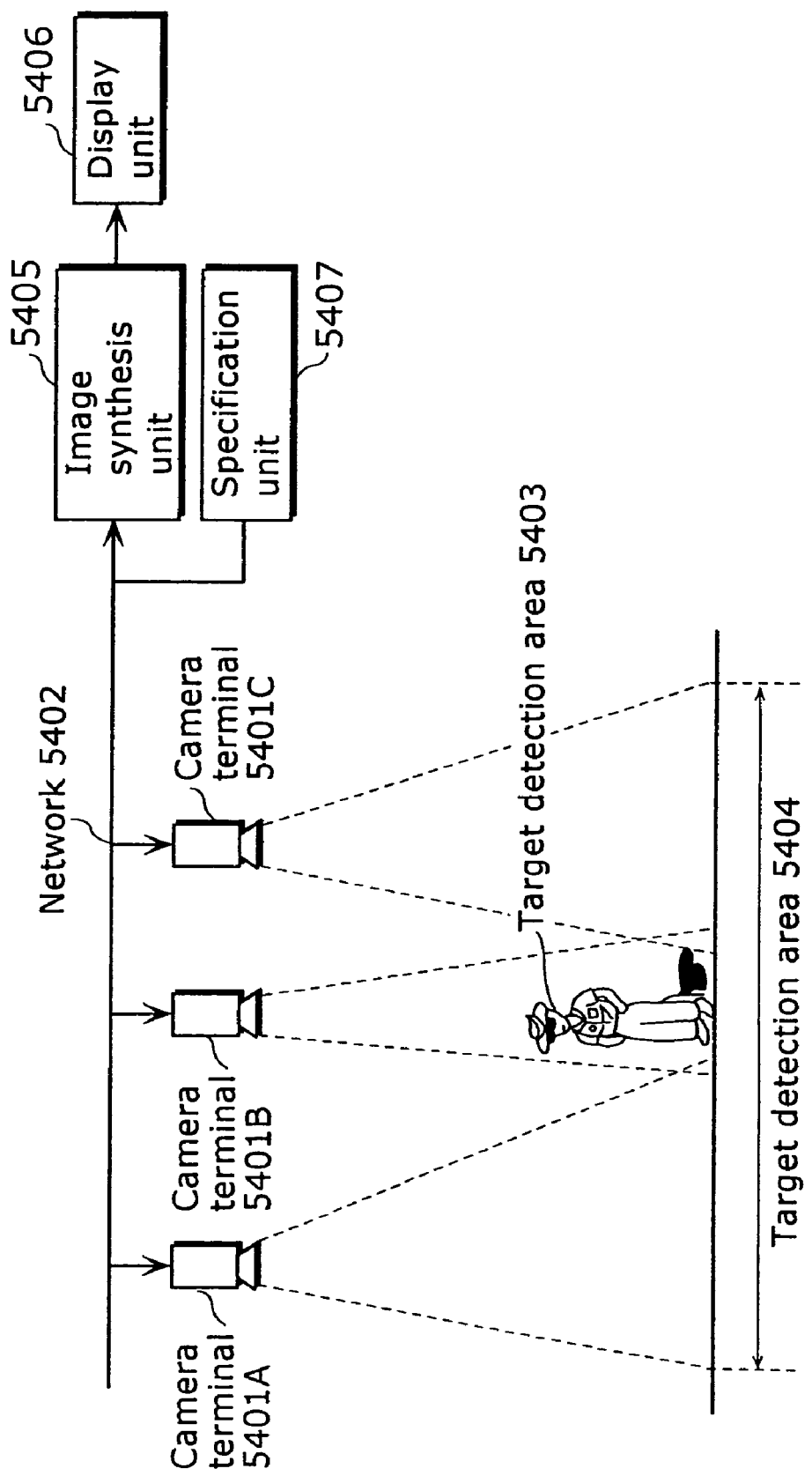
FIG. 30 is an illustration of another detection area adjustment apparatus in the supplemental explanation 4 of the present invention.

In FIG. 30, the camera terminals 5401A to 5401E are the camera terminal P or the camera terminal PR in the first and second embodiments of the present invention, and they operate based on the flow charts shown in FIG. 27 and FIG. 28. The network 5402 communicates the information among the camera terminals 5401A to 5401C. The target detection object 5403 is detected by the camera terminals 5401A to 5401C, and is present in the target detection area 5404. What described above is similar to the case of FIG. 29. Also, in the case where the target detection object 5403 is present in the target detection area 5404, the camera terminals 5401A to 5401C always detect the entire target detection area 5404, and automatically obtain a detailed image, centering the position of the target detection object 5403 and including the target detection object 5403 in the detection area.

The detection area adjustment apparatus shown in FIG. 30 is obtained by adding a new processing unit (an image synthesis unit 5405, a display unit 5406 and a specification unit 5407) to the detection area adjustment apparatus of the present invention shown in FIG. 29. The image synthesis unit 5405 is the processing unit for synthesizing respective images obtained by the camera terminals 5401A to 5401C into a single image and the like, the display unit 5406 is the processing unit for displaying images synthesized by the image synthesis unit 5405, and the specification unit 5407 is the processing unit for specifying the detection areas or the spatial resolutions of the detection areas of the camera terminals 5401A to 5401C.

The operations of the detection area adjustment apparatus like this will be described below. More specifically, the image synthesis unit 5405 receives images taken by the camera terminals 5401A to 5401C and the information on the positions of the detection areas to be sent by the camera terminals 5401A to 5401C via the network 5402. The image synthesis unit 5405 synthesizes images whose spatial positions are continuous, for example, the images taken by the respective camera terminals and shown in FIG. 31 using the information on the positions of the detection areas of the camera terminals. The synthesized images are displayed on the display unit 5406 and the image information is presented to someone. Note that images obtained by the camera terminals 5401A to 5401C that are used for synthesis in the image synthesis unit 5405 and the positions of pixels that constitute the images in the world coordinate axis system can be calculated using the above-mentioned expression 19. Therefore, the use of a general projection conversion method makes it possible to synthesize images whose spatial positions from various view points are continuous in the image synthesis unit 5405.

Someone who has seen the synthesized image that is displayed on the display unit 5406 inputs the information indicating the area position on the desired synthesis image or the spatial resolution to the specification unit 5407. The position or the spatial resolution of the area is specified by input through a pointing device or the like. The receiving unit 5407 receives the position or the spatial resolution of the area specified by someone, and determines, by judgment, a camera terminal whose current detection area is in the detection area. The judgment can be easily made using detection area information to be sent by the camera terminals 5401A to 5401C. After that, the specification unit 5407 specifies, via the network 5402, the position or the spatial resolution of the area specified by someone as the position or the spatial resolution of the detection area of the camera terminal, to the camera terminal whose detection area includes the area specified by someone who made the above-mentioned judgment. In the case where there is a specification of the position or the spatial resolution of the detection area of the camera terminal, the position or the spatial resolution of the detection area is adjusted according to the specification.

With the operations described up to this point, someone can always receive the information on the target detection area 5404, without producing any dead areas, from various view points, and as information on the images whose spatial positions are continuous. Further, specifying the positions or spatial resolutions specified based on the image information makes it possible to also obtain images which have specific area positions or spatial resolutions. For example, that someone makes an input in order to improve the spatial resolution of an area results in displaying an image, taken in the area, whose spatial resolution is high on the display unit 5406. This effect is useful in monitoring a building and the like which has a large target detection area.

Figure 31:
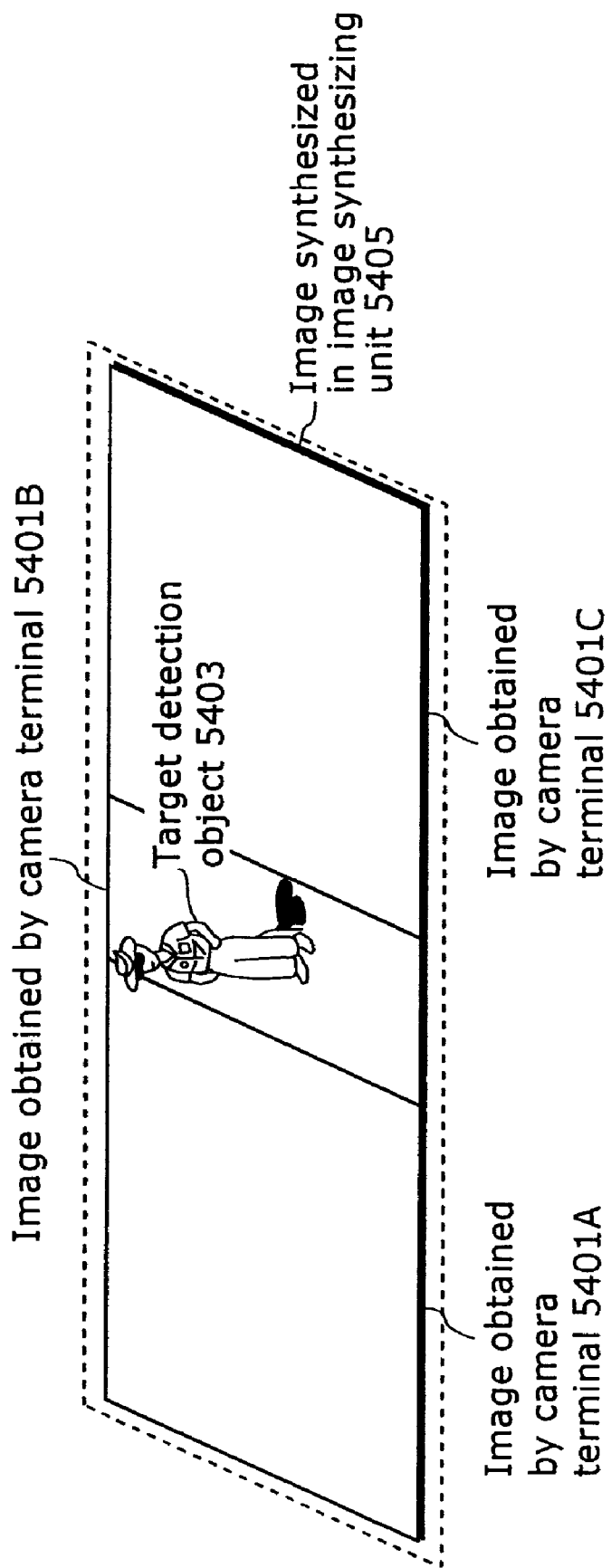
FIG. 31 is an illustration of an example of a synthesized image.

In the examples shown in FIG. 29 to FIG. 31, control may be performed so that the position and the size of the detection area of one camera terminal that takes an image of a target detection object are fixed (in other words, the state where the spatial resolution is the highest) and the detection areas of the one camera terminal and the other camera terminals are overlapped each other. However, as another method that enables obtaining a similar result, control is performed so as to fix the position and the size of the detection area of one camera terminal that takes an image of a target detection object (in other words, the state where the spatial resolution is highest) and the detection areas of the other camera terminals are overlapped each other. In other words, the one camera terminal that is taking an image of a target detection object may be excluded from the camera terminals to be controlled in order to overlap detection areas. In other words, it is possible to regard the one camera terminal that is taking an image of a target detection object as broken and controls in order to overlap detection areas of the other camera terminals. In this way, images of the target detection object can be obtained in the highest spatial resolution, and images are taken in the entire target detection area.

The detection area adjustment apparatus of the present invention has been described up to this point based on the embodiments and supplementary explanations, but the present invention is not limited to this examples. In the respective embodiments, variations that can be conceived by a person having ordinary skill in the art may be provided or new functions that can also be conceived by a person having ordinary skill in the art may be added within the scope of this invention. Also, components in the respective embodiments can be arbitrarily used in a different combination as long as they can coexist functionally.

For example, in the embodiment, plural camera terminals that constitute the detection area adjustment apparatus can control any of pan, tilt and zoom, but the present invention is not always limited to this structure. Any or all of pan, tilt and zoom of several camera terminals may be fixed. With the present invention, plural camera terminals that constitute detection area adjustment apparatus adjust the positions of the detection areas that are adjacent to each other so that they are partly overlapped and make the spatial resolutions substantially the same automatically and coordinately by communicating with each other. Therefore, one of the camera terminals whose detection area is adjacent has a function for controlling pan, tilt and zoom. Also in that case, as a result, adjustment is made so that the detection areas adjacent to each other are partly overlapped or so that spatial resolutions are made to be substantially the same as the spatial resolution of the whole target detection area.

Figure 32:
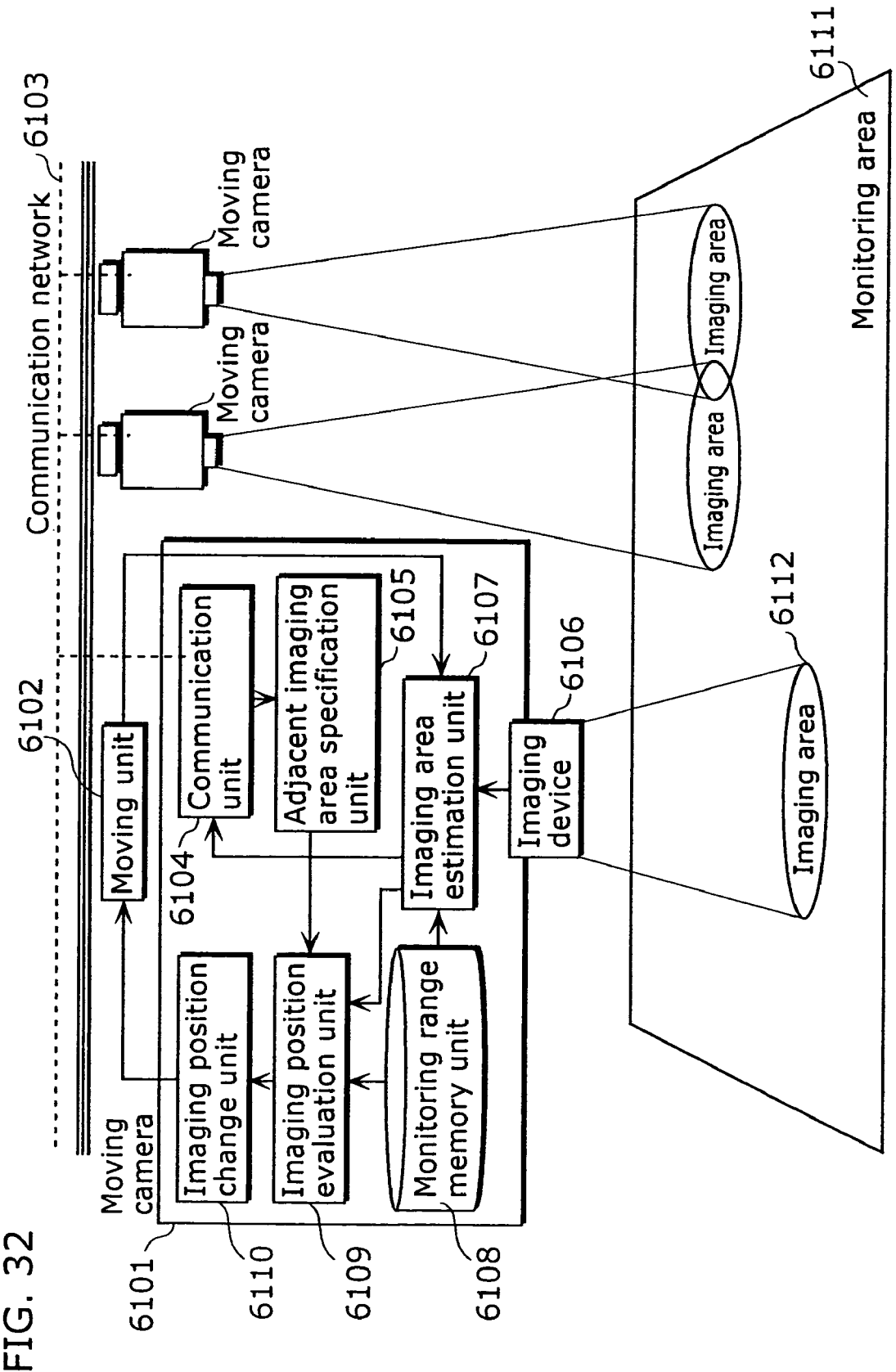
FIG. 32 is an illustration of the structure of a monitoring system composed of moving camera terminals.

Also, the camera terminals are fixed at specific places respectively in the above-described embodiments, but they may be movable. FIG. 32 is a block diagram indicating the structure of the monitoring system in the case of applying the detection area adjustment apparatus concerning the present invention to the monitoring system that constitutes moving cameras. This monitoring system is composed of plural moving camera terminals 6101 that are connected via the communication network 6103. The feature of this monitoring system is that camera terminals move automatically and coordinately, not only that these moving camera terminals 6101 adjust pan and tilt so that the entire monitoring area 6111 is monitored. The moving camera terminal 6101 moves supported by the moving unit 6102. The moving unit 6102 is a mechanism or the like that adjusts the imaging position of the moving camera terminal 6101. The communication network 6103 is a transmission path that connects plural moving camera terminals 6101. The communication unit 6104 is a communication interface for enabling the moving camera terminal 6101 to exchange information with the other moving camera terminals via the communication network 6103. The adjacent imaging area specification unit 6105 presumes moving camera terminals whose imaging areas are adjacent to each other in response to the information from the other moving camera terminals that are notified to the communication unit 6104. The imaging device 6106 is a CCD camera and the like that intakes video in the monitoring area. The imaging area estimation unit 6107 estimates the imaging area of the moving camera terminal 6101 based on the characteristics of the imaging device 6106 and the positions of the moving unit 6102. The monitoring range memory unit 6108 is a memory or the like that holds the information on the range of the area to be monitored by the moving camera terminal 6101. The imaging position evaluation unit 6109 estimates the overlap areas of the imaging areas that are adjacent to the imaging area of the moving camera terminal 6101 or the distances from the boundary of the monitoring area. The imaging position evaluation unit 6110 controls a moving unit 6102 and adjusts the imaging position of the moving camera terminal 6101. The monitoring area 6111 is the area to be monitored by the moving camera terminal 6101. The imaging area 6112 is the area in which the moving camera terminals 6101 are taking images.

With this monitoring system, the moving camera terminals 6101 communicate, to adjacent moving camera terminals, the information on the imaging area to be estimated based on their imaging positions and the characteristics of the imaging devices 6106. Also the moving camera terminals 6101 adjust the pan, tilt and imaging positions so that the sizes of the overlap areas of the imaging areas that are adjacent to each other and the distances from the boundary of the monitoring area become close to predetermined values respectively, through coordination with the adjacent moving camera terminals. This enables the moving camera terminals 6101 to move to the imaging positions that make it possible to reduce dead areas in the monitoring area while they are taking images respectively at the same time.

Figure 33:
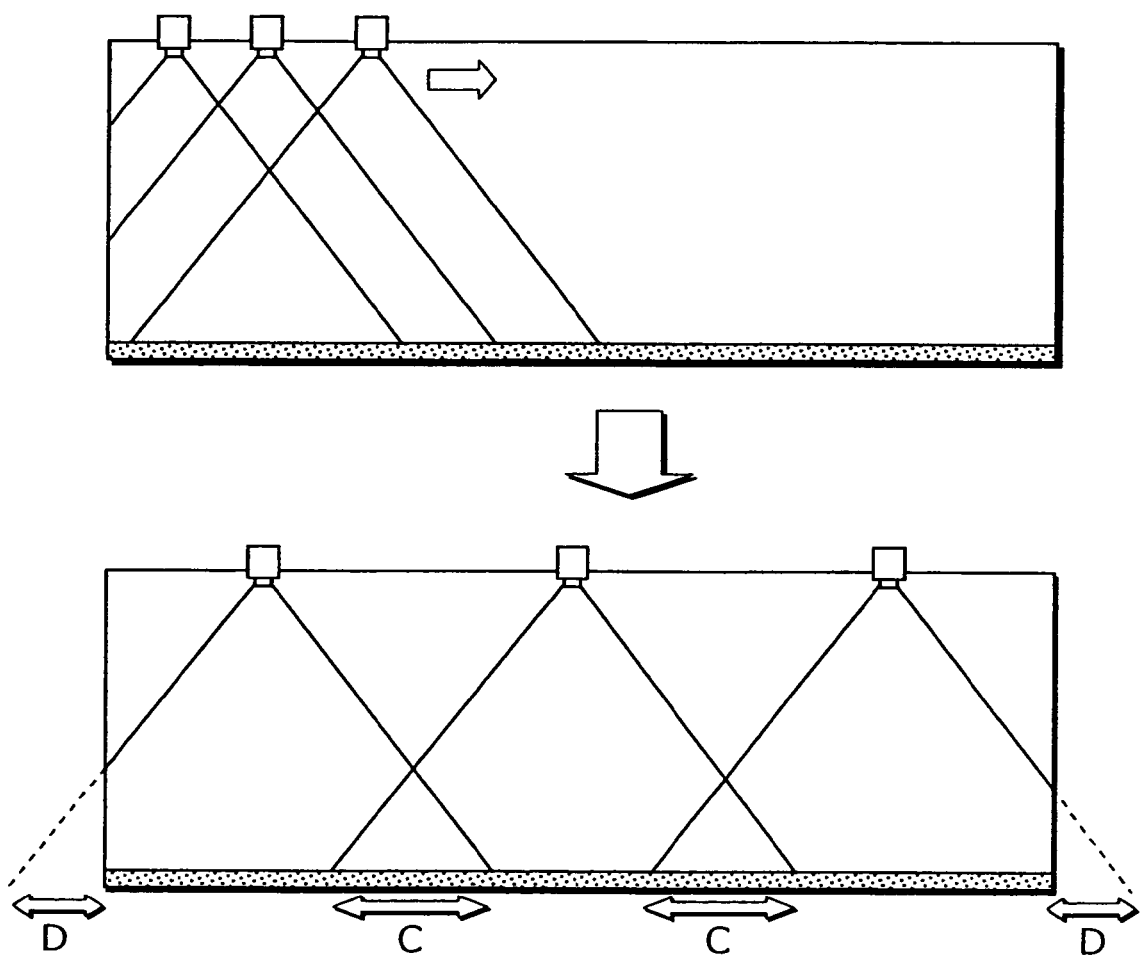
FIG. 33 is an illustration showing how the moving camera terminal in the monitoring system operates.

FIG. 33 shows the operation of how the moving camera terminals 6101 operate in the monitoring system like that. To simplify the explanation, the figure shows the case where moving camera terminals 6101 that can move to the horizontal direction (one-dimension) is set on the ceiling whose height is constant and where the moving camera terminals 6101 are made to monitor the floor. As shown in the above-mentioned figure, even in the case of setting the moving camera terminals 6101 at the appropriate positions on the ceiling, the moving camera terminals can automatically move to the positions where plural moving camera terminals can take images in the entire monitoring area at the same time as shown in the lower part of the diagram, by adjusting their imaging positions so that the widths C of the overlap areas of the imaging areas or the distances D from the boundary of the monitoring area become close to the predetermined values respectively. Further, in the case of setting moving camera terminals 6101 at one place where it is difficult to perform a setting operation, for example, on a ceiling, the moving camera terminals automatically move to the positions where dead areas are reduced during the moving camera terminals are taking images respectively at the same time. Therefore, it becomes possible to reduce the workload of determining the setting positions of the moving camera terminals or the workload of setting the moving camera terminals. As for an example of this method, as shown in FIG. 34, the system may be configured in a way that a rail is set in the monitoring area and the moving camera terminals move on the track of the rail.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The detection area adjustment apparatus concerning the present invention is useful as a monitoring system where plural cameras are used or a sensing system and the like that measures physical amounts using plural sensor devices, especially as a high-functional monitoring system that is composed of plural camera terminals that can adjust their imaging areas and that monitors a large area without producing any dead areas, such high-functional monitoring system being a system for monitoring suspects in a school or a building and the like.

What is claimed is:

1. A detection range adjustment device, comprising:
   camera terminals connected to each other via a communication line, wherein the detection range adjustment device is operable to enable capturing of an image in a target detection range by adjusting detection ranges which are imaging ranges of the camera terminals,
   each of the camera terminals comprising:
   a camera operable to capture an image of a detection range included in the target detection range, the camera including a unit operable to change a position of the detection range and a spatial resolution of the detection range;
   a communication unit operable to send, to another camera terminal among the camera terminals, detection range information including information for identifying the detection range and information for identifying the spatial resolution of the detection range, via the communication line, and operable to receive detection range information from the other camera terminal; and
   an adjustment unit operable to adjust the position and the spatial resolution of the detection range by controlling a camera of a camera terminal so that 1) an undetectable range, which does not belong to any of the detection ranges of the camera terminals, is not included in a surrounding area adjacent to the detection range and 2) the spatial resolution of the detection range of the camera terminal and a spatial resolution of the detection range of the other camera terminal become approximately the same, based on the detection range information of the camera terminal and the detection range information of the other camera terminal received by the communication unit,
   wherein the adjustment unit is operable to control the camera of the camera terminal so that an amount of an overlap area of the detection range of the camera terminal and a detection range of an adjacent detection range of the camera terminal is smaller than a certain value, and
   the adjustment unit is operable to adjust the position and the spatial resolution of the detection range of the camera terminal to a position and a spatial resolution which are obtained by repeating the following:

selecting the detection range which is adjacent to the detection range of the camera terminal, from detection ranges of the camera terminals;

calculating an overlap range differential amount which is a difference between a predetermined target amount and an overlap range amount of the selected adjacent detection range and the detection range of the camera terminal;

calculating a spatial resolution differential amount which is a difference between the spatial resolution of the selected detection range and the spatial resolution of the detection range of the camera terminal; and calculating the position and the spatial resolution of the detection range of the camera terminal, the position and the spatial resolution enabling the overlap range differential amount and the spatial resolution differential amount to be close to 0.

2. The detection range adjustment device according to claim 1, wherein the adjustment unit is operable to calculate the spatial resolution differential amount using a function which takes a smallest value when the spatial resolution of the selected detection range is equal to the spatial resolution of the detection range of the camera terminal.

3. The detection range adjustment device according to claim 2, wherein the camera having the detection range whose spatial resolution is adjustable has a spatial resolution that is adjustable within a certain range, and the function takes a smallest value when the spatial resolution of the selected detection range is equal to the spatial resolution of the detection range of the camera terminal in the case where the spatial resolution of the detection range of the camera terminal is within the certain range.

4. The detection range adjustment device according to claim 1, wherein, in the case where the camera of the camera terminal has detected a target detection object or has received a specification about a spatial resolution of the target detection object, the adjustment unit is operable to adjust, prior to the adjustment of the position and the spatial resolution of the detection range, the spatial resolution of the detection range of the camera terminal to a spatial resolution based on the detected target detection object or the specified spatial resolution.

5. The detection range adjustment device according to claim 1, further comprising:

a synthesis unit operable to obtain images captured by the cameras of the camera terminals and operable to synthesize the captured images as a spatially continuous image; and a display unit operable to display the synthesized image.

6. A detection range adjustment device comprising:

camera terminals; and an adjustment device, wherein the camera terminals and the adjustment device are connected to each other via a communication line, the detection range adjustment device being operable to enable the capturing of an image of a target detection range by adjusting detection ranges which are imaging ranges of the camera terminals, each of the camera terminals comprising:

a camera operable to capture an image of the detection range included in the target detection range, the camera including a unit operable to change a position of the detection range and a spatial resolution of the detection range; and a communication unit operable to send, to the adjustment device, detection range information including information for identifying the detection range and information for identifying the spatial resolution of the detection range via the communication line, operable to receive the specification from the adjustment device, and operable to adjust the position of the detection range and the spatial resolution of the detection range by controlling a camera of a camera terminal according to the received specification, wherein the adjustment device includes:

a communication unit operable to instruct the camera terminals to adjust positions and spatial resolutions of detection ranges so that 1) an undetectable range, which does not belong to any of the detection ranges of the camera terminals, is not included in the detection ranges and 2) the spatial resolutions of the detection ranges of the camera terminals become approximately the same, based on the detection range information, and wherein the adjustment device is operable to control the camera of the camera terminal so that an amount of an overlap area of the detection range of the camera terminal and a detection range of an adjacent detection range of the camera terminal is smaller than a certain value, and the adjustment device is operable to adjust the position and the spatial resolution of the detection range of the camera terminal to a position and a spatial resolution which are obtained by repeating the following:

selecting the detection range which is adjacent to the detection range of the camera terminal, from detection ranges of the camera terminals;

calculating an overlap range differential amount which is a difference between a predetermined target amount and an overlap range amount of the selected adjacent detection range and the detection range of the camera terminal;

calculating a spatial resolution differential amount which is a difference between the spatial resolution of the selected detection range and the spatial resolution of the detection range of the camera terminal; and calculating the position and the spatial resolution of the detection range of the camera terminal, the position and the spatial resolution enabling the overlap range differential amount and the spatial resolution differential amount to be close to 0.

7. A detection range adjustment device comprising:

sensor terminals which are connected to each other via a communication line, wherein the detection range adjustment device is operable to enable the detecting of physical values in a target detection range by adjusting detection ranges in which the sensor terminals detect the physical values, each of the sensor terminals comprising:

a sensor operable to detect physical values in the detection range included in the target detection range, the sensor including a unit operable to change a position of the detection range and a spatial resolution of the detection range;

a communication unit operable to send, to another sensor terminal among the sensor terminals, detection range information including information for identifying the detection range and information for identifying the spatial resolution of the detection range, via the communication line, and operable to receive detection range information from the other sensor terminal; and an adjustment unit operable to adjust the position and the spatial resolution of the detection range by controlling the sensor of a sensor terminal so that 1) an undetectable range, which does not belong to any detection ranges of the sensor terminals, is not included in the detection range and 2) spatial resolutions of the detection ranges of the sensor terminals become approximately the same, based on the detection range information of the sensor terminal and the detection range information of the other sensor terminal received by the communication unit, wherein the adjustment unit is operable to control a sensor of the sensor terminal so that an amount of an overlap area of the detection range of the sensor terminal and a detection range of an adjacent detection range of the sensor terminal is smaller than a certain value, and the adjustment unit is operable to adjust the position and the spatial resolution of the detection range of the sensor terminal to a position and a spatial resolution which are obtained by repeating the following:

selecting the detection range which is adjacent to the detection range of the sensor terminal, from detection ranges of the sensor terminals;

calculating an overlap range differential amount which is a difference between a predetermined target amount and an overlap range amount of the selected adjacent detection range and the detection range of the sensor terminal;

calculating a spatial resolution differential amount which is a difference between the spatial resolution of the selected detection range and the spatial resolution of the detection range of the sensor terminal; and calculating the position and the spatial resolution of the detection range of the sensor terminal, the position and the spatial resolution enabling the overlap range differential amount and the spatial resolution differential amount to be close to 0.

8. A detection range adjustment method used in a camera system including camera terminals, each of which including a camera having a detection range, which is an imaging range, whose position and spatial resolution of the detection range are changeable, and a communication unit operable to send and receive detection range information of the camera and another camera of a camera terminal among the camera terminals, the detection range information including information for indicating the detection range of each camera and information for identifying the spatial resolution of the detection range, the detection range adjustment method enabling capturing of an image of a target detection range by adjusting detection ranges, the detection range adjustment method comprising:

adjusting positions of the detection ranges and spatial resolutions of the detection ranges by controlling the camera of each camera terminal so that, an undetectable range, which does not belong to any of the detection ranges of the camera terminals, is not included in the detection ranges and the spatial resolutions of the detection ranges of the camera terminals become approximately the same, based on the detection range information of a camera terminal and the detection range information of the other camera terminal received by the communication unit, wherein the adjusting step controls the camera of the camera terminal so that an amount of an overlap area of the detection range of the camera terminal and a detection range of an adjacent detection range of the camera terminal is smaller than a certain value, and the adjustment step adjusts the position and the spatial resolution of the detection range of the camera terminal to a position and a spatial resolution which are obtained by repeating the following:

selecting the detection range which is adjacent to the detection range of the camera terminal, from detection ranges of the camera terminals;

calculating an overlap range differential amount which is a difference between a predetermined target amount and an overlap range amount of the selected adjacent detection range and the detection range of the camera terminal;

calculating a spatial resolution differential amount which is a difference between the spatial resolution of the selected detection range and the spatial resolution of the detection range of the camera terminal; and calculating the position and the spatial resolution of the detection range of the camera terminal, the position and the spatial resolution enabling the overlap range differential amount and the spatial resolution differential amount to be close to 0.

9. A non-transitory computer-readable recording medium storing a program which is used in a camera system which includes camera terminals, each of which including a camera having a detection range, which is an imaging range, which are changeable, and a communication unit which sends and receives detection range information indicating the detection range of the camera and another camera of a camera terminal among the camera terminals, the program being intended for camera terminals which enable capturing of an image of the target detection range by adjusting detection ranges, the program causing a computer to execute adjusting included in the detection range adjustment method according to claim 8.

* * * * *